United States Patent
Yang et al.

(10) Patent No.: US 7,321,879 B2
(45) Date of Patent: Jan. 22, 2008

(54) USING NEURAL NETWORKS FOR DATA MINING

(75) Inventors: Qian Yang, Broadview Heights, OH (US); Charles Garofalo, Framingham, MA (US); Yogesh Gupta, Setauker, NY (US); Ronald Cass, Cleveland Heights, OH (US); Kirk Wilson, Sugar Hill, NH (US); Igor Sedukhin, Smithtown, NY (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 10/760,511

(22) Filed: Jan. 20, 2004

(65) Prior Publication Data

US 2004/0220900 A1    Nov. 4, 2004

Related U.S. Application Data

(63) Continuation of application No. 10/418,671, filed on Apr. 18, 2003, now abandoned.

(60) Provisional application No. 60/374,020, filed on Apr. 19, 2002, provisional application No. 60/374,024, filed on Apr. 19, 2002, provisional application No. 60/374,041, filed on Apr. 19, 2002, provisional application No. 60/373,977, filed on Apr. 19, 2002, provisional application No. 60/373,780, filed on Apr. 19, 2002, provisional application No. 60/374,064, filed on Apr. 19, 2002.

(51) Int. Cl.
    *G06N 5/00*    (2006.01)

(52) U.S. Cl. .......................... 706/12; 706/47; 706/16; 717/121

(58) Field of Classification Search ................. 706/12, 706/16, 15, 45, 47; 702/14; 422/82.02; 717/121

See application file for complete search history.

(56) References Cited

U.S. PATENT DOCUMENTS

| | | | |
|---|---|---|---|
| 4,193,115 | A | 3/1980 | Albus |
| 4,215,396 | A | 7/1980 | Henry et al. |
| 4,438,497 | A | 3/1984 | Willis et al. |
| 4,649,515 | A | 3/1987 | Thompson et al. |
| 4,663,703 | A | 5/1987 | Axelby et al. |
| 4,670,848 | A | 6/1987 | Schramm |
| 4,740,886 | A | 4/1988 | Tanifuji et al. |
| 4,754,410 | A | 6/1988 | Leech et al. |
| 4,858,147 | A | 8/1989 | Conwell |
| 4,928,484 | A | 5/1990 | Peczkowski |
| 4,972,363 | A | 11/1990 | Nguyen et al. |
| 4,979,126 | A | 12/1990 | Pao et al. |

(Continued)

OTHER PUBLICATIONS

Neugents Are on The Loose, The E-Business Adviser, Apr./May 2000, at 1.*

(Continued)

*Primary Examiner*—Wilbert L Starks, Jr.
(74) *Attorney, Agent, or Firm*—Baker Botts L.L.P.

(57) ABSTRACT

A data mining system and method are provided. The system includes at least one client and a service broker configured to include an interface to receive a consultation request from the client. The service broker forwards the consultation request to a Neugent to invoke a consultation of the Neugent, and forwards to the client a result object returned by the Neugent.

39 Claims, 55 Drawing Sheets

40

U.S. PATENT DOCUMENTS

| | | | |
|---|---|---|---|
| 4,994,982 | A | 2/1991 | Duranton et al. |
| 5,023,045 | A | 6/1991 | Watanabe et al. |
| 5,052,043 | A | 9/1991 | Gaborski |
| 5,111,531 | A | 5/1992 | Grayson et al. |
| 5,113,483 | A | 5/1992 | Keeler et al. |
| 5,119,648 | A | 6/1992 | Bertucci et al. |
| 5,140,523 | A | 8/1992 | Frankel et al. |
| 5,142,612 | A | 8/1992 | Skeirik |
| 5,175,678 | A | 12/1992 | Frerichs et al. |
| 5,175,797 | A | 12/1992 | Funabashi et al. |
| 5,247,445 | A | 9/1993 | Miyano et al. |
| 5,311,421 | A | 5/1994 | Nomura et al. |
| 5,335,291 | A | 8/1994 | Kramer et al. |
| 5,349,541 | A | 9/1994 | Alexandro et al. |
| 5,485,390 | A | 1/1996 | LeClair et al. |
| 5,734,796 | A | 3/1998 | Pao |
| 5,848,402 | A | 12/1998 | Pao et al. |
| 6,134,537 | A | 10/2000 | Pao et al. |
| 6,236,942 | B1 * | 5/2001 | Bush ............................ 702/14 |
| 6,327,550 | B1 | 12/2001 | Vinberg et al. |
| 6,496,812 | B1 * | 12/2002 | Campaigne et al. .......... 706/16 |
| 6,697,791 | B2 * | 2/2004 | Hellerstein et al. ............ 706/47 |
| 6,759,010 | B2 * | 7/2004 | Lewis et al. ............. 422/82.02 |
| 7,103,874 | B2 * | 9/2006 | McCollum et al. ......... 717/121 |

OTHER PUBLICATIONS

Raisinghani, et al, An Automated Executive and Managerial Performance Monitoring, Measurement and Reporting System, Journal of Electronic Commerce Research, vol. 2, No. 1, 2001, pp. 23-31.*
Computer Associates, Office of the CTO, White Paper: Comprehensive eBusiness Intelligence, Nov. 26, 2001, pp. 1-10.*
Surajit Chaudhuri, Usama Fayyad and Jeff Bernhardt, "Scalable Classification over SQL Databases", Proceedings of the 15th International Conference on Data Engineering, Mar. 23-26, 1999, Sidney, Australia, pp. 470-479.
Dennis T. Lee, Yoh-Han Pao and Dejan J. Sobajic "Dynamic System Control Using Neural Networks", pp. 25-30.
Yoh-Han Pao "Neural Net Computing For Patter Recognition" *Handbook of Pattern Recognition, and Computer Vision*, pp. 125-162 (edited by C.H. Chen, L.F. Pau and P.S.P. Wang).
Bernard Widrow, Narendra K. Gupta, and Sidhartha Maitra (Sep. 1973) "Punish/Reward: Learning With a Critic in Adaptive Threshold Systems", *IEEE Trans. Systems, Man and Cybernetics*, vol. SMC-3, No. 5, pp. 455-465.
John A. Hartigan, (1975) "Interpretation and Evaluation of Clusters", *Clustering Algorithms*, pp. 12-14.
Yoh-Han Pao and Dejan J. Sobajic (1987) "Metric Synthesis and Concept Discovery With Connectionist Networks", *1987 IEEE*, pp. 390-395.
Bernard Widrow and Rodney Winter (Mar. 1988) "Neural Nets for Adaptive Filtering and Adaptive Pattern Recognition", *IEEE Computer*, pp. 25-39.
Bernard Widrow, Rodney G. Winter, and Robert A. Baxter (Jul. 1988) "Layered Neural Nets for Pattern Recognition", *IEEE Trans. Acoustics, Speech, and Signal Processing*, vol. 36, No. 7, pp. 1109-1118.
Yoh-Han Pao, (1989) *Adaptive Pattern Recognition and Neural Networks*.
Andrew G. Barto (1990) "Connectionist Learning for Control", *Neural Networks for Control*, pp. 5-58 (edited by W. Thomas Miller, III, Richard S. Sutton and Paul J. Werbos).
R.D. Coyne and A.G. Postmus (1990) "Spatial Applications of Neural Networks in Computer-aided Design", *Artificial Intelligence in Engineering*, 5(1):9-22.
Kumpati S. Narendra and Kannan Parthasarathy (Mar. 1990) "Identification and Control of Dynamical Systems Using Neural Networks", *IEEE Trans. Neural Networks*, vol. 1, No. 1, pp. 4-27.
Maryhelen Stevenson, Rodney Winter, and Bernard Widrow (Mar. 1990) "Sensitivity of Feedforward Neural Networks to Weight Errors", *IEEE Trans. Neural Networks*, vol. 1, No. 1, pp. 71-80.
Esther Levin, Naftali Tishby, and Sara A. Solla (Oct. 1990) "A Statistical Approach to Learning and Generalization in Layered Neural Networks", *Proc. IEEE*, vol. 78, No. 10, pp. 1568-1574.
Les Atlas, Jerome Connor and Mark Damborg (1991) "Comparisons of Conventional Techniques and Neural Network in Computer-aided Design", Artificial Intelligence in Engineering, 5(1):9-22.
Miodrag Djukanov, Borivoje Babic, Dijan J. Sobajic and Yoh-Han Pao (1991) "Unsupervised/Supervised Learning Concept for 24-Hour Load Forecasting", *Artificial Intelligence in Engineering*, pp. 819-827.
M.M. Gupta and J. Qi (1991) "Fusion of Fuzzy Logic and Neural Networks with Applications to Decision and Control Problems", *Proceedings of the 1991 American Control Conference*, pp. 1:30-31.
Jocelyn Sietsma and Robert J. F. Dow (1991) "Creating Artificial Neural Networks That Generalize", *Neural Networks*, vol. 4, pp. 67-79.
Petros A. Ioannou and Aniruddha Datta (Dec. 1991) "Robust Adaptive Control: A Unified Approach", *Proc. IEEE*, vol. 79, No. 12, pp. 1736-1768.
S.A. Billings, H.B. Jamaluddin and S. Chen (1992) "Properties of neural networks with applications to modeling non-linear dynamical systems", *Int. J. Control*, pp. 55(1):193-224.
John Doleac, Jeff Getchius, Judy Franklin and Chuck Anderson (1992) "Nadaline Connectionist Learning vs. Linear Regression at a Lamp Manufacturing Plant", *Proceedings of The First IEEE Conference on Control Applications*, pp. 552-558.
William Finnoff, Ferdinand Hergert, and Hans Georg Zimmerman (1993) "Improving Model Selection by Nonconvergent Methods", *Neural Networks*, vol. 6, pp. 771-783.
Andreas Ikonomopoulos, Lefteri H. Tsoukalas and Robert E. Uhrig (1993) "A Hybrid Neural Networ-Fuzzy Arithmetic Methodology For Performing Virtual Measurements in a Complex System", *Proceedings of the Thirty-Sixth Power Instrumentation Symposium*, pp. 205-212.
Michael Nikolaou (1993) "Neural Network Modeling of Nonlinear Dynamical Systems", *Proceeding of the 1993 American Control Conference*, pp. 1460-1464.
Stevan V. Odri, Dusan P. Petrovacki, and Gorana A. Krstonosic (1993) "Evolutional Development of a Multilevel Neural Network", *Neural Networks*, vol. 6, pp. 583-595.
Yoh-Han Pao and Gwang-Hoon Park (1993) "Neural-Net Computing for Machine Recognition of Handwritten English Language text", *Fundamentals of Handwriting Recognition*, pp. 335-351.
Mujeeb M. Ahmed (1994) "An Integrated Approach to Distributed Intelligent Control", *Proceeding of the Thirty-Seventh Power Instrumentation Symposium*, pp. 1-15.
Timothy J. Graettinger, Naveen V. Bhat and Jeffrey S. Buck (1994) Adaptive Control with NeuCOP, The Neural Control and Optimization Package, *IEEE*, pp. 2389-2393.
Yoh-Han Pao (1994) "Process Monitoring and Optimization for Power Systems Applications", *IEEE International Conference on Neural Networks*, pp. 3697-3702.
Percy P.C. Yip and Yoh-Han Pao (1994) "A Guided Evolutionary Computation Tehnique as Function Optimizer", *Proceeding of First IEEE Conference on Evolutionary Computation*, pp. 628-633.
Stuart J. Russell and Peter Norvig, (1995) "Learning From Observations", *Artificial Intelligence: A Modern Approach*, pp. 525-562.
Mattias Nyberg and Yoh-Han Pao (1995) "Automatic Optimal Design of Fuzzy Systems Based on Universal Approximation and Evolutionary Programming", *Fuzzy Logic And Intelligent Systems*, pp. 311-366 (edited by H.L. Hua and M. Gupta).
Percy P.C. Yip and Yoh-Han pao (1995) "Combinatorial Optimization with Use of Guided Evolutionary Simulated Annealing", *IEEE Transaction on Neural Networks*, 6(2):290-295.
Yoh-Han Pao (1996) "Dimension Reduction Feature Extraction and Interpretation of Data With Network Computing", *International Journal of Patter Recognition and Artificial Intelligence*, pp. 10(5)521-253.
Yoh-Han Pao and Zhou Meng (1996) "A Perspective on Funtional-Link Computing, Dimension Reduction and Signal/Image Understanding", *Proceedings of 1996 IEEE Signal Processing Society Worshop*, pp. 213-222.

Michael J. A. Berry and Gordon Linoff, (1997) *Data Mining Techniques For Marketing, Sales and Customer Support*, Chapters 2, 5 and 12, pp. 17-35, 63-93 and 243-285.

Floriana Esposito, Donato Malerba and Giovanni Semeraro, (may 1997) "A Comparative Analysis Of Methods For Pruning Decision Trees", *IEEE Transaction on Pattern Analysis and Machine Intelligence*, 19(5):476-491.

Byung Hwan Jun, Chang Soo Kim, Hong-Yeop Song and Haihie Kim, (Dec. 1997) "A New Criterion in Selection and Discretization of Attributes for the Generation of Decision Trees", *IEEE Transaction on Pattern Analysis and Machine Intelligence*, 19(12):1371-1375.

Yoh-Han Pao and Chang-Yun Shen (1997) "Visualization of Pattern Data Through Learning of Non-linear Variance-Conserving Dimension-Reduction Mapping", *Pattern Recognition*, 30(10):1705-1717.

Paul S. Bradley, Usama M. Fayyad and Cory A. Reina, (Jun. 1998) "Scaling Clustering Algorithms to Large Databases", Proc. 4th Int'l Conf. Knowledge Discovery & Data Mining, pp. 9-15.

Yoh-Han Pao and Zhou Meng (1998) "Visualization and the understanding of multidimensional data", *Engineering Applications of Artificial Intelligence*, 11:659-667.

Sholom M. Weiss and Nitin Indurkhya (1998) *Predictive Data Mining: A Practical Guide*, pp. 119-123 and 136-142.

Michael J. A. Berry and Gordon Linoff, (2000) *Mastering Data Mining The Art and Science of Customer Relationship Management*, pp. 59-64 and 111-121.

Timo Koskela (2000) "Decision Trees", http://www.hut.fi/~timoko/treeprogs.html.

Zhou Meng and Yoh-Han Pao (2000) "Visualization and Self-Organization of Multidimensional Data through Equalized orthogonal mapping", IEEE Transaction on Neural Networks, pp. 11(4):1031-1038.

* cited by examiner

| EventPredictNeugent |
|---|
| EventPredictNeugent |
| inputFldNameList: Array of String<br>labelField: String<br>name: String<br>rules: Array of String<br>events: Array of String<br>timeBand: Integer<br>noOfDataGoingBack: Integer<br>noOfDataPredict: Integer |

FIG. 5C

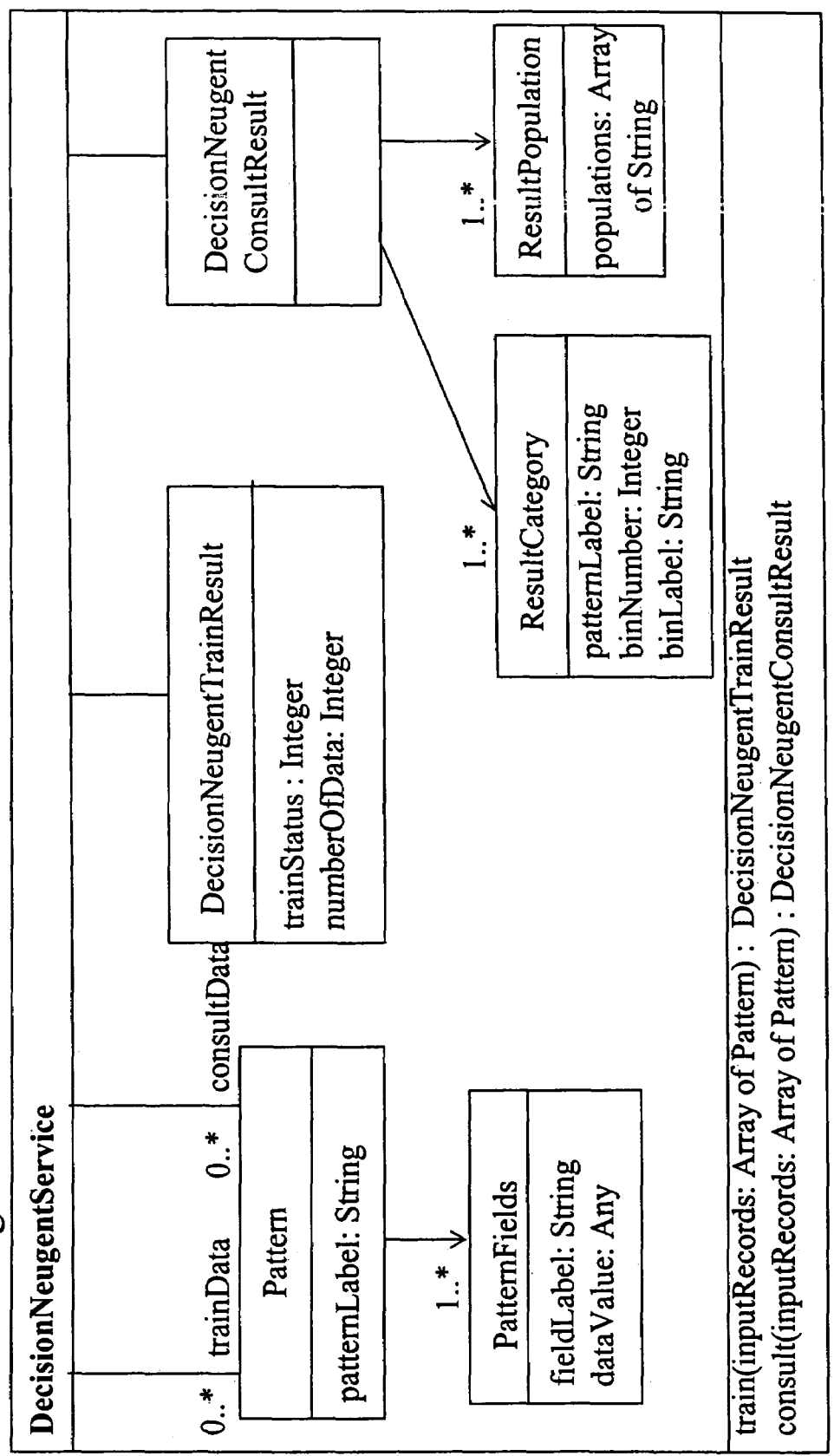

| EventPredictNeugent |
| --- |
| EventPredictNeugent |
| inputFldNameList: Array of String<br>labelField: String<br>name: String<br>rules: Array of String<br>events: Array of String<br>timeBand: Integer<br>noOfDataGoingBack: Integer<br>noOfDataPredict: Integer |

FIG. 6C

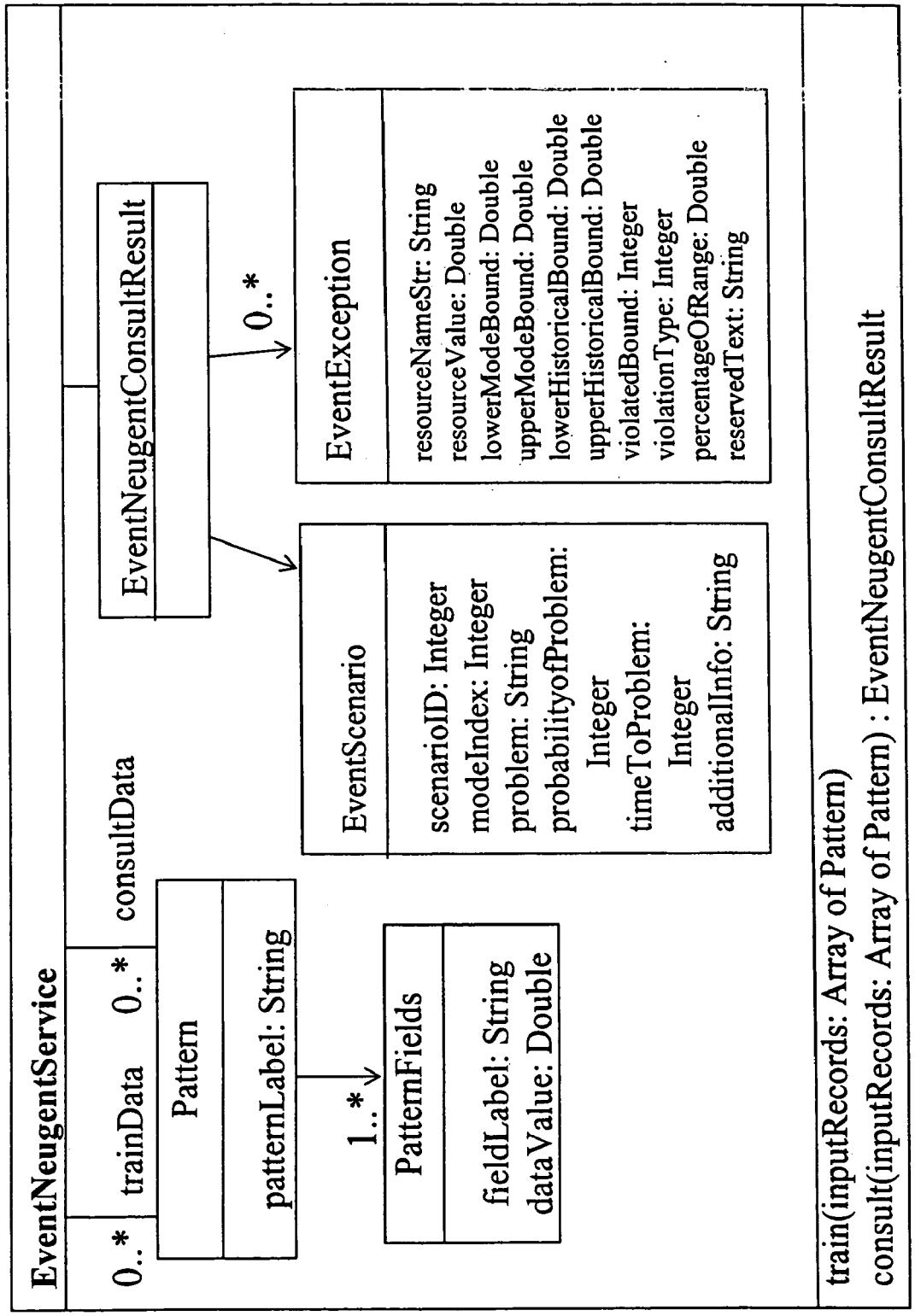
FIG. 7B Event Predict Neugent Web Service Interface

Value Predict Neugent Web Service Interface

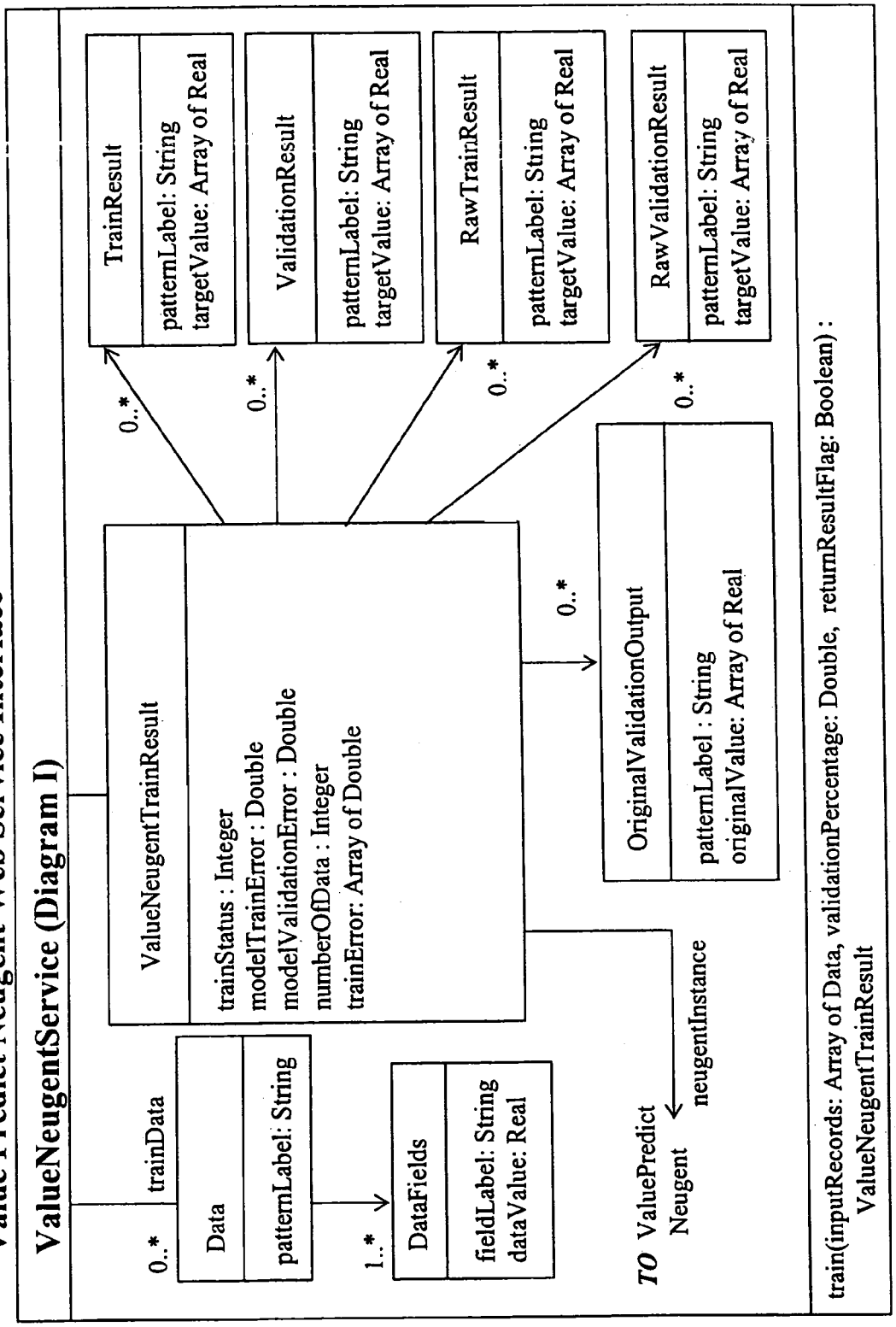

Event Predict Neugent

| EventPredictNeugent |
|---|
| inputFldNameList: Array of String |
| labelField: String |
| name: String |
| rules: Array of String |
| events: String |
| timeBand: Integer |
| noOfDataGoingBack: Integer |
| noOfDataPredict: Integer |

USING NEURAL NETWORKS FOR DATA MINING

CROSS-REFERENCE TO RELATED APPLICATIONS

This is a continuation application Ser. No. 10/418,671 filed Apr. 18, 2003 now abandoned which claims the benefit of Provisional application Ser. Nos. 60/374,064, 60/374,020, 60/374,024, 60/374,041 60/373,977 and 60/373,780 filed in the United States on Apr. 19, 2002.

TECHNICAL FIELD

This application relates to data mining. In particular, the application relates to using neural nets and other artificial intelligence techniques for data mining.

DESCRIPTION OF RELATED ART

As use of computers and other information and communication appliances proliferate in the current information age, data, numeric as well as non-numeric (for example, textual), frequently is collected from numerous sources, such as the Internet. Further, large amounts of data exist in many databases. Much of the data is collected for archiving purposes only and therefore, in many instances, are stored without organization. Sifting through the morass of data to extract useful information for a specific purpose may be a substantial challenge.

For example, business concerns are finding an increasing need, in order to remain competitive in their business market, to effectively analyze and extract useful information from data they and/or others have collected and use the extracted information to improve operation of the business. This, however, often may be a daunting task.

Data mining is the analysis of large quantities of data in order to extract useful information from the data, such as for making predictions over new data (also called predictive analysis). A number of data mining products are available. However, current commercial products which allow data mining of the wealth of information on the web require the client application to maintain a predictive model, although a service broker may collect or store raw data and forward it to the client upon demand. Since the client must maintain the predictive model, the resources of the client machine may be overwhelmed when the application is executed.

SUMMARY

This application provides a data mining system. In one embodiment, the data mining system includes a client and a service broker configured to include an interface to receive a consultation request from the client. The service broker forwards the consultation request to a Neugent to invoke a consultation of the Neugent. After the Neugent is consulted, the service broker forwards to the client a result object returned by the Neugent.

The service broker also may include a training interface, and receives through the training interface a training request from the client, the training request including training data. The service broker forwards the training request including the training data to the Neugent to invoke training of the Neugent with the training data. The training request may include a parameter specifying a ratio to split the training data between training the Neugent and testing or validating the Neugent. The service broker may forward to the client a training result object returned by the Neugent after training of the Neugent.

The application also provides a method for providing to a remote client machine a service to consult a Neugent. In one embodiment, the method includes receiving a consultation request from the remote client machine, forwarding the consultation request to the Neugent to invoke a consultation of the Neugent, and forwarding to the remote client machine a result object returned by the Neugent.

The application also provides a method for providing to a remote client machine a service to train a Neugent. According to one embodiment, the method includes receiving a train request from the remote client machine, forwarding the train request to the Neugent to invoke training of the Neugent, and forwarding to the remote client machine a training result object returned by the Neugent.

BRIEF DESCRIPTION OF THE DRAWINGS

The features of the present application can be more readily understood from the following detailed description with reference to the accompanying drawings wherein:

FIGS. 5A, 5C, 5E, 5G and 5I show object schemas for assorted Neugents classes, according to another embodiment; and FIGS. 5B, 5D, 5F, 5H, 5J and 5K show class diagrams for the web service interface of the Neugents classes;

FIGS. 6A, 6C, 6E, 6G and 6I show object schemas for assorted Neugents classes, according to a third embodiment;

FIGS. 7A through 7F show class diagrams for web service interface of assorted Neugents classes, according to a fourth embodiment;

FIGS. 8A, 8D, 8F, 8H and 8J show object schemas for assorted Neugents classes, according to a fifth embodiment;

FIGS. 8B, 8C, 8E, 8G, 8I and 8K show class diagrams for the web service interface of the Neugents classes, according to the fifth embodiment;

DETAILED DESCRIPTION

This application provides tools (in the form of systems and methodologies) for data mining. For example, the tools may include one or more computer programs or software modules stored on a conventional program storage device or computer readable medium, and/or transmitted via a computer network or other transmission medium.

Figure 1A:
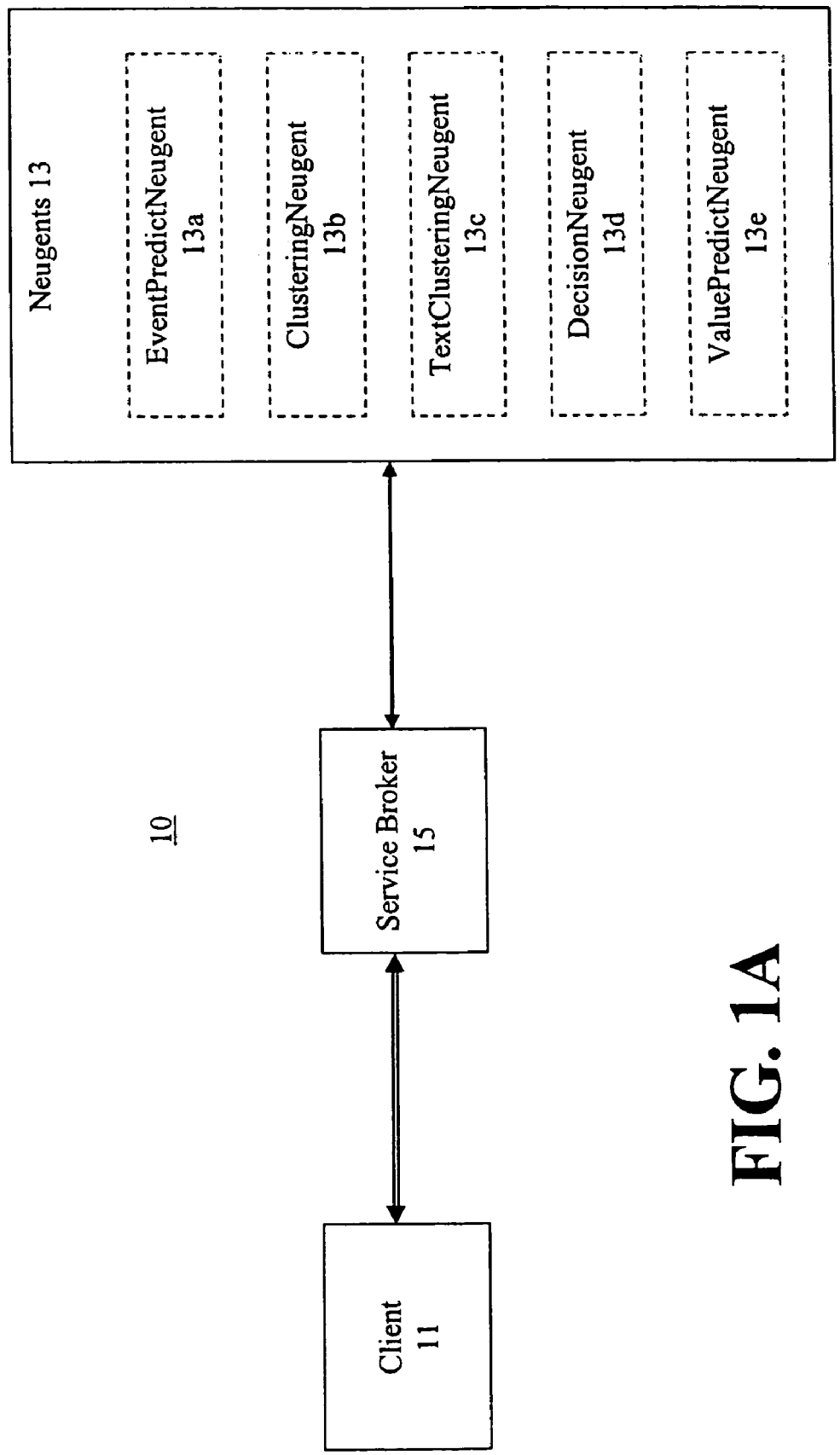
FIG. 1A shows a block diagram of a data mining system, according to one embodiment of the present disclosure.

A data mining system, according to a client-server paradigm, is explained below with reference to FIG. 1A. It should be understood, however, that the tools of the present application are not limited to a client-server programming model, and may be adapted for use in peer-to-peer systems, message passing systems, as well as other programming models.

A data mining system 10 includes a client 11, one or more Neugents 13, and a service broker 15. The service broker 15 may be configured as a server, and includes an interface to receive a consultation request from the client. The service broker may also receive a train request from the client, and typically is (although it need not be) a remote server. Neugents 13 are further described below.

Figure 2B:
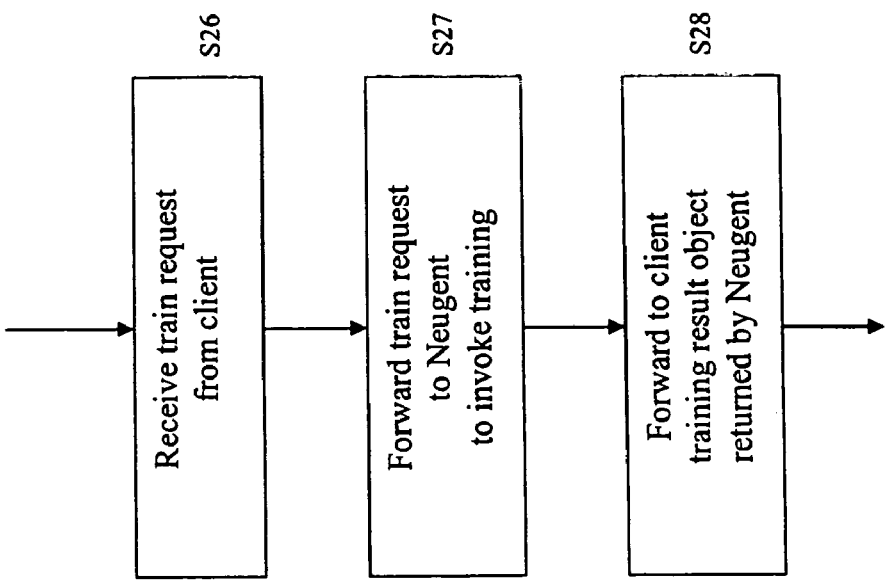
FIG. 2B shows a flow chart of a method for providing to a remote client machine a service to train a Neugent, according to one embodiment.
Figure 2A:
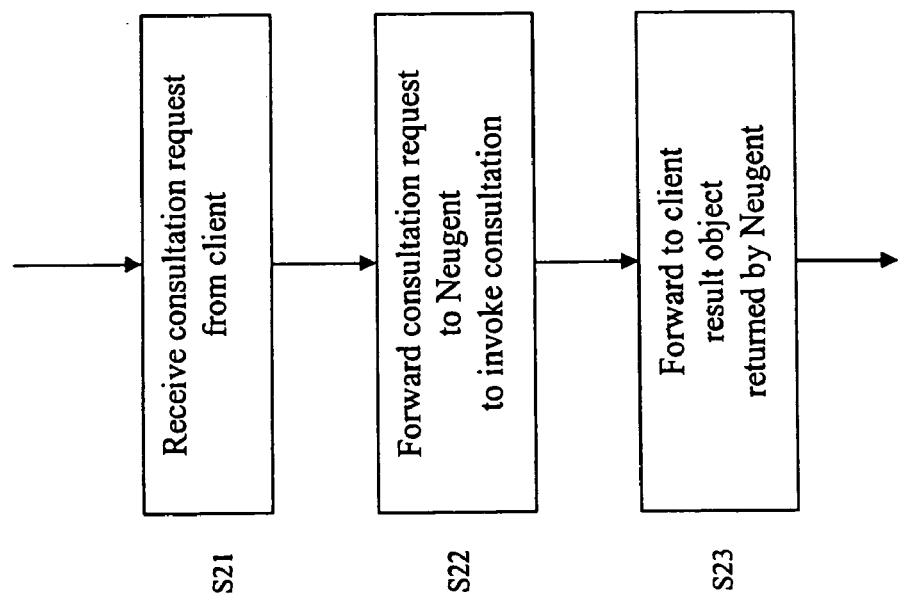
FIG. 2A shows a flow chart of a method for providing to a remote client machine a service to consult a Neugent, according to one embodiment.

A method for providing to a remote client machine a service to consult a Neugent, in accordance with one embodiment, is described with reference to FIGS. 1A and 2A. After the service broker 15 receives a consultation request from the remote client machine (step S21), the service broker forwards the consultation request to a Neugent 13 to invoke a consultation of the Neugent (step S22). After the Neugent 13 is consulted, the service broker 15 forwards to the client a result object returned by the Neugent (step S23).

The consultation request, according to one embodiment, includes data for consulting a Neugent 13. The Neugent 13 performs a predictive analysis of the data included in the consultation request.

According to another embodiment, the consultation request includes identification of a source of data for consulting a Neugent 13. The Neugent 13 performs a predictive analysis of input data obtained from the source identified in the consultation request.

According to another embodiment, the service broker 15 is a remote server. The consultation request from the client 11 to the remote server may include an Extensible Markup Language document. The Neugent may be server-side.

A method for providing to a remote client machine a service to train a Neugent, according to one embodiment, is described with reference to FIGS. 1A and 2B. After the service broker 15 receives a train request from the remote client machine (step S26), the service broker forwards the train request to a Neugent 15 to invoke training of the Neugent (step S27). After the Neugent is trained, the service broker forwards to the client a training result object returned by the Neugent (step S28).

A Neugent may group training data patterns into clusters, with each cluster corresponding to a group of similar data patterns, and predict a probability of membership of an input pattern to a selected group.

A Neugent may group training non-numeric (for example, textual) patterns into clusters, with each cluster corresponding to a group of similar non-numeric patterns, and predict a probability of membership of an input non-numeric pattern to a selected group.

A Neugent may form a cluster model by grouping training data patterns into a plurality of clusters, with each cluster corresponding to a group of similar data patterns, and determining for each cluster probabilities of transition from the cluster to each of the other clusters. The Neugent predicts a probability of an event occurring by applying an input pattern to the cluster model.

A Neugent may form an input-output, model associated with a set of training data patterns, and predict an output value by applying the model to an input pattern. The Neugent may include a functional-link net.

A Neugent may form rules associated with corresponding relationships in a set of training data patterns, and predict an outcome by applying the rules to an input pattern.

Neugents technologies include assorted methodologies for recognizing patterns in data and for using those patterns to make predictions on new data. New data is analyzed to determine the pattern into which it falls, thereby providing a prediction of future behavior based on the behavior that has characterized the pattern in the past.

One group of underlying methodologies is often referred as neural net technology. A neural net is a weighted network of interconnected input/output nodes. Neugent technology covers a broader range of pattern recognition methodologies, in addition to neural net models.

For example, Neugents may include ClusteringNeugent, DecisionNeugent, EventPredictNeugent, TextClusteringNeugent and ValuePredictNeugent model methodologies.

ClusteringNeugent uses a cluster model methodology which groups patterns that are alike, and predicts the probability of membership to a specific group.

DecisionNeugent uses a decision tree model methodology which uncovers rules and relationships in data, formulates rules to describe those relationships, and predicts outcomes based upon the discovered rules.

EventPredictNeugent uses a cluster model methodology with transition calculation to predict the probability of an event occurring. TextClusteringNeugent uses a cluster model methodology which groups training data patterns comprising textual (or non-numeric) material that are alike, and predicts a probability that specified textual (or non-numeric) data with which the model is consulted is a member of (or belongs to) a specific group.

ValuePredictNeugent uses a functional-link neural net model methodology to predict the value of a variable (or values for a set of variables).

Figure 3:
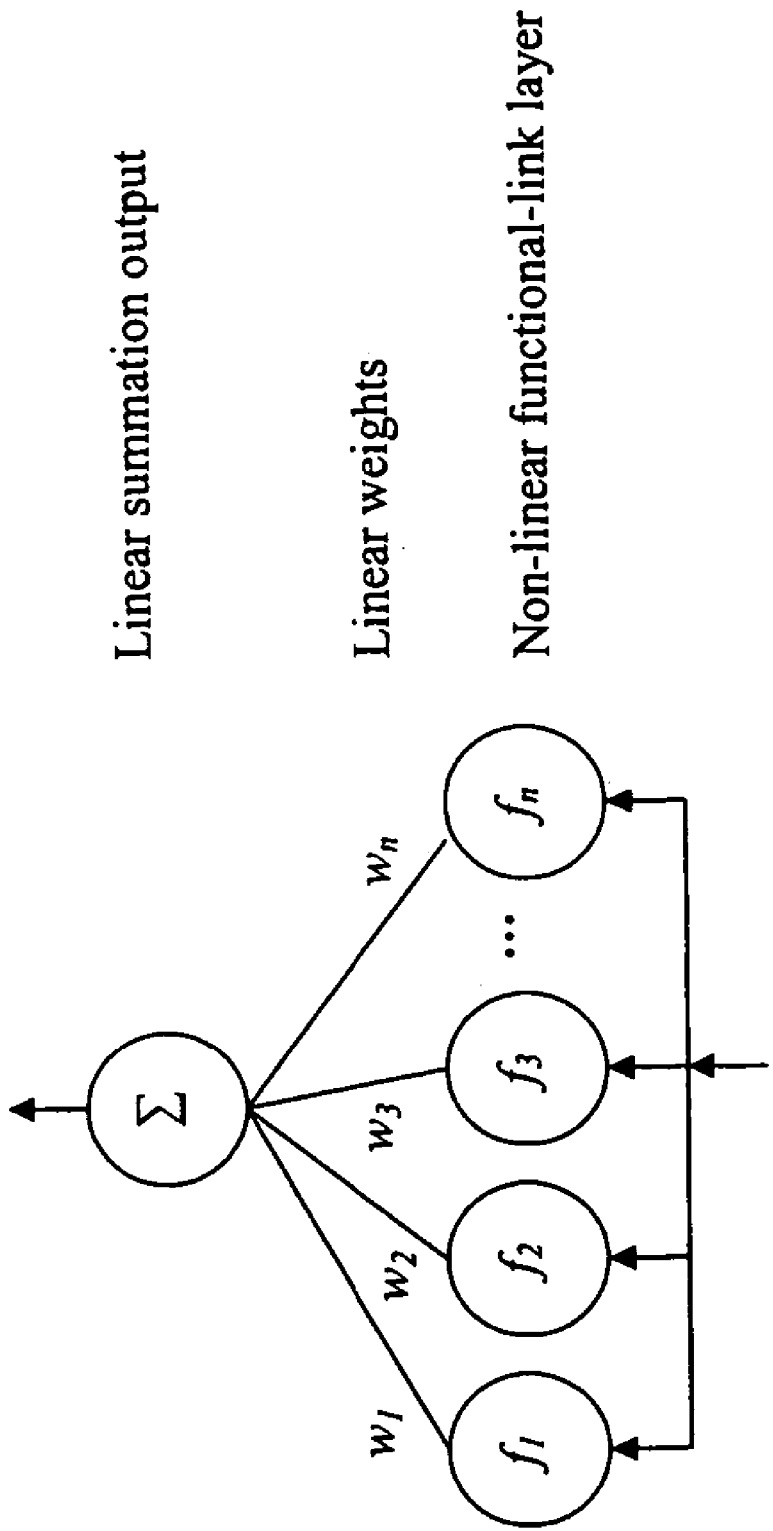
FIG. 3 shows a schematic view of a functional-link net structure.
Figure 4A:
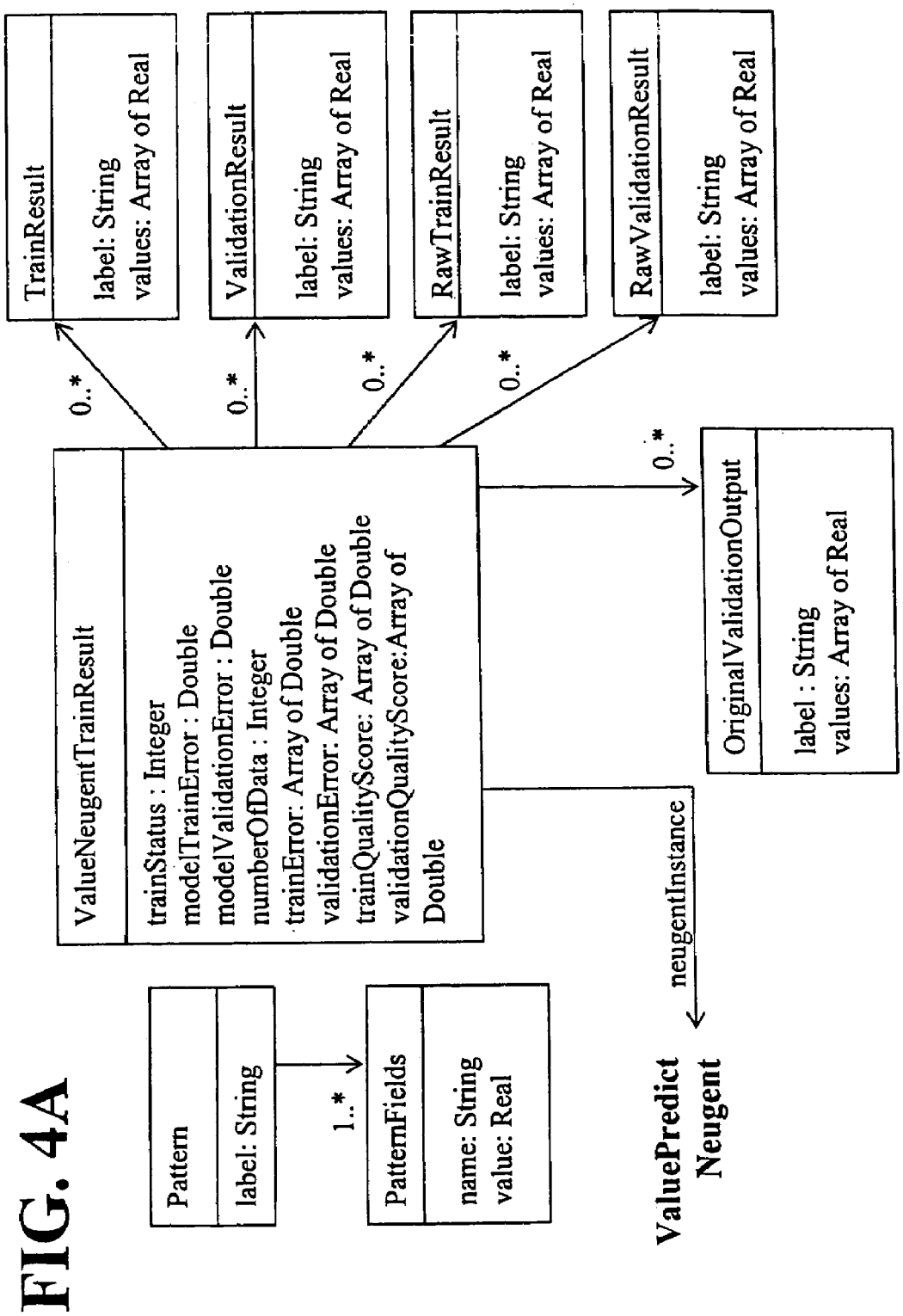
FIGS. 4A and 4B show class diagrams for web services interface methods of Value Predict Neugent, according to one embodiment.
Figure 4B:
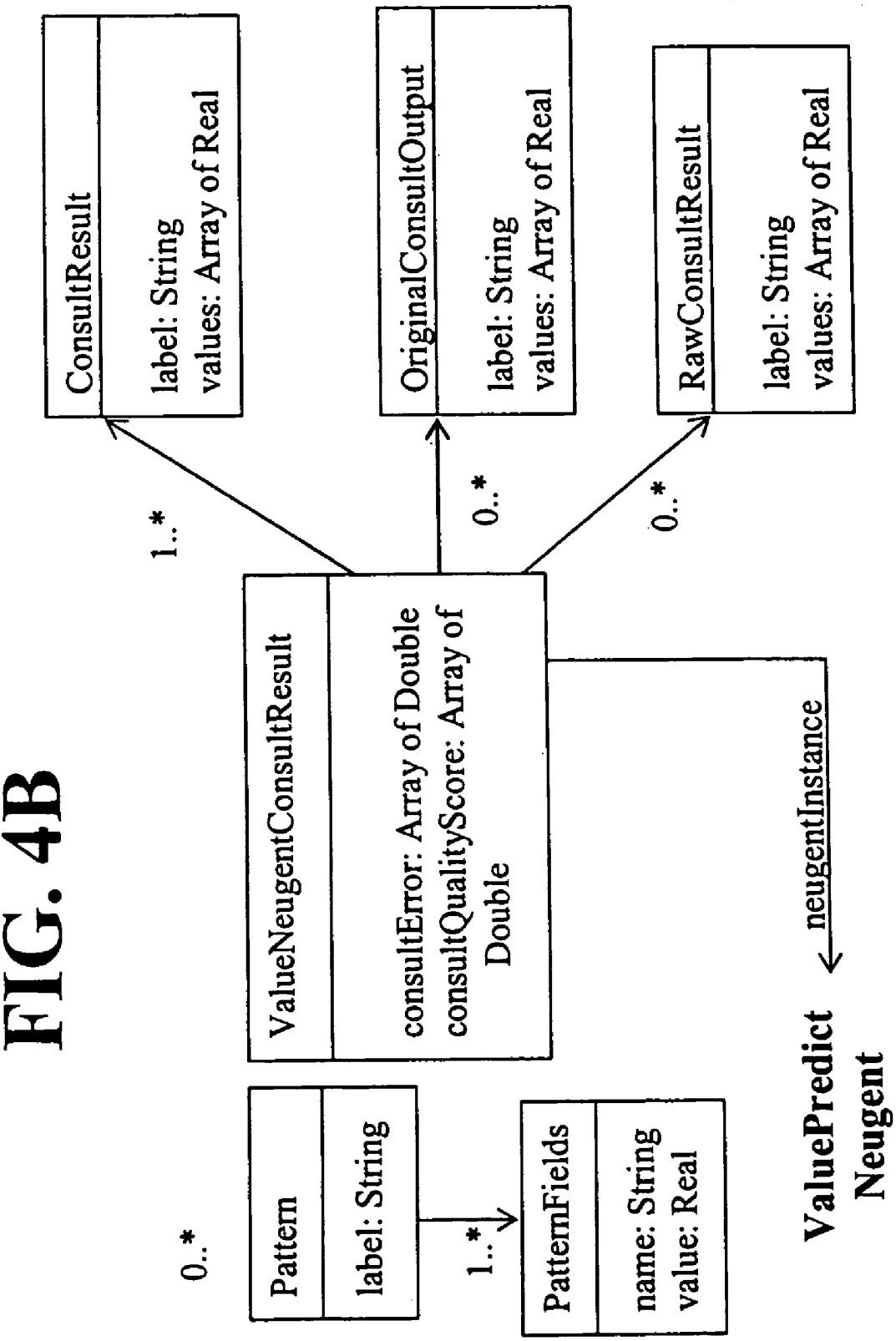
Figure 5A:
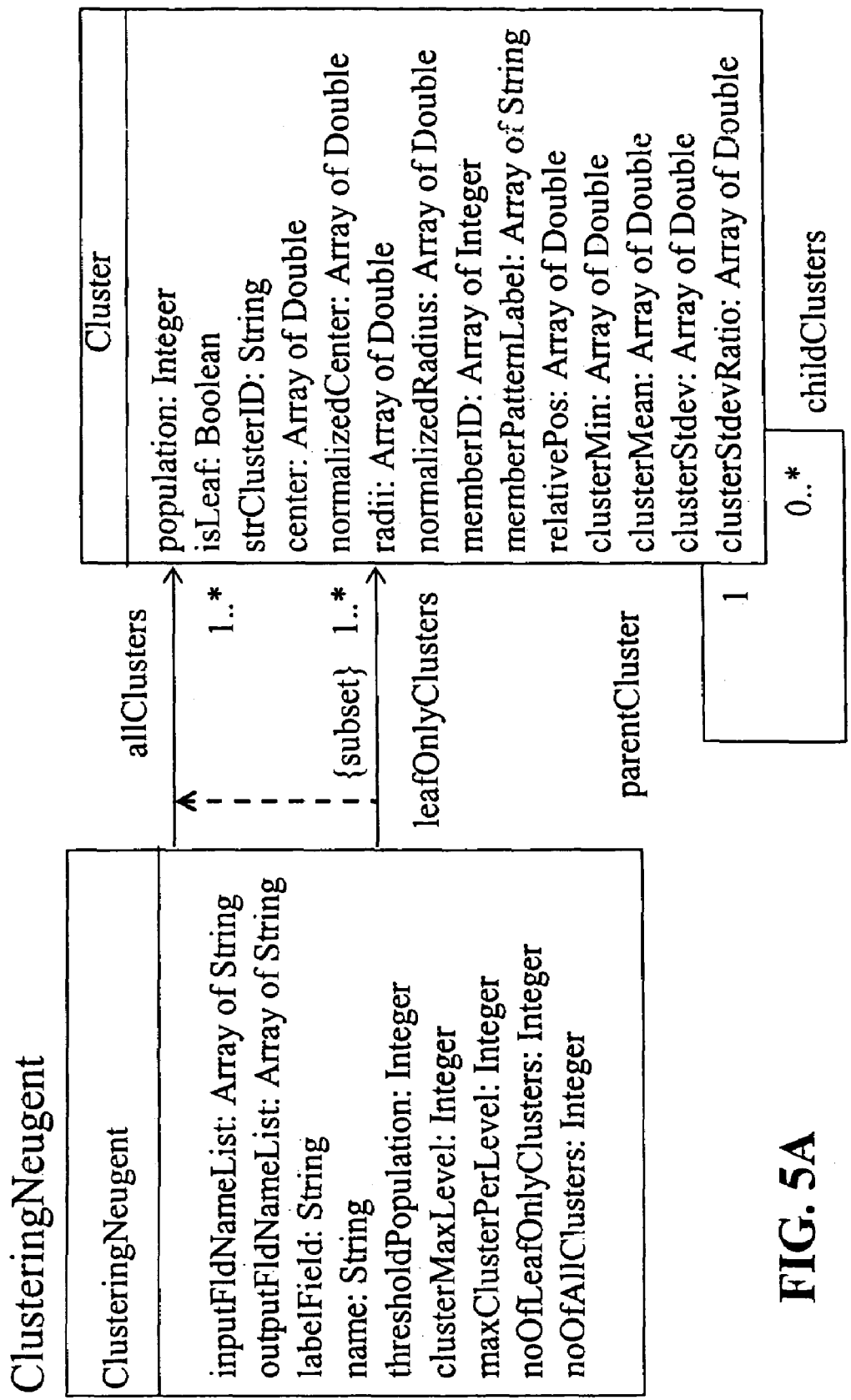
Figure 5B:
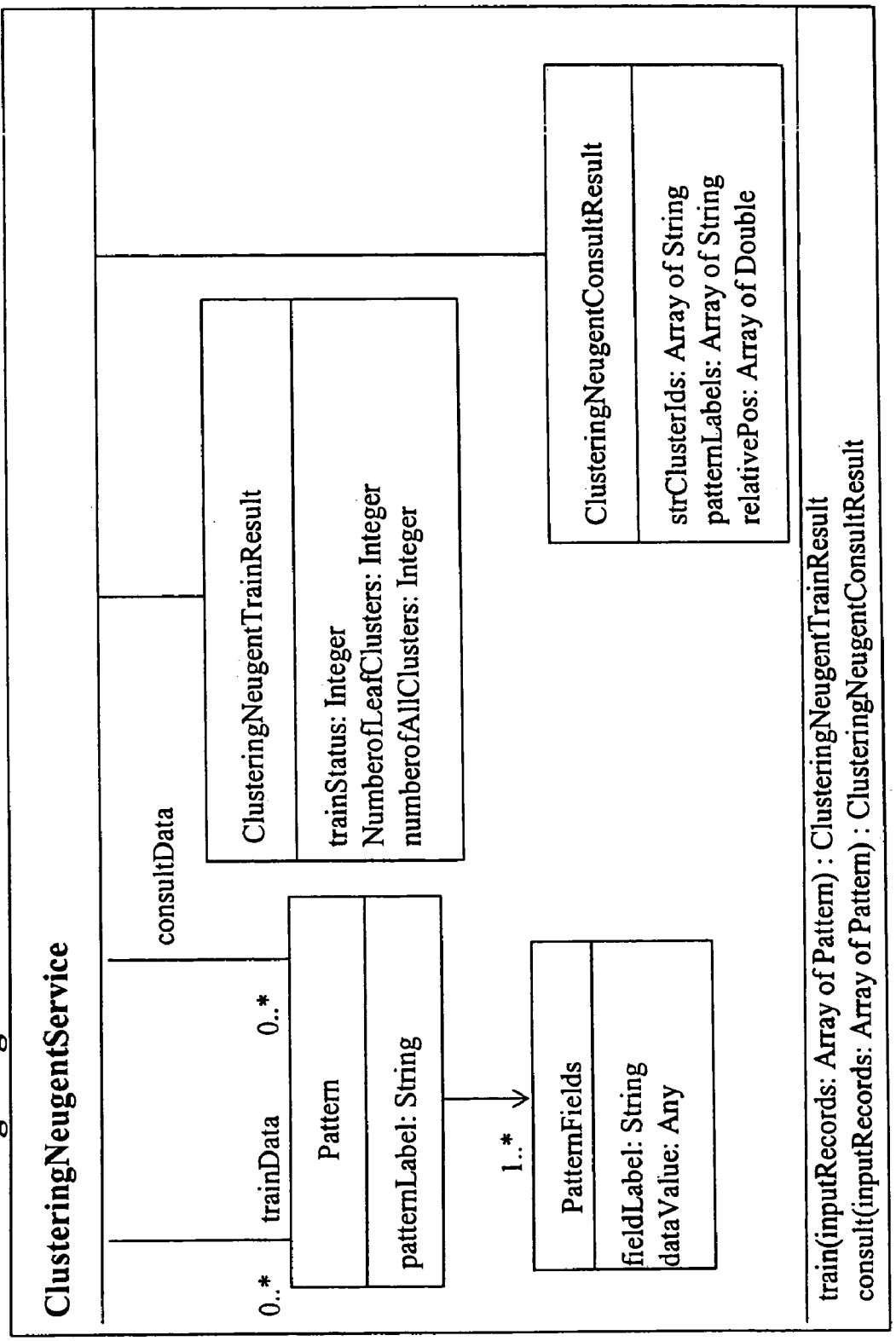
Figure 5D:
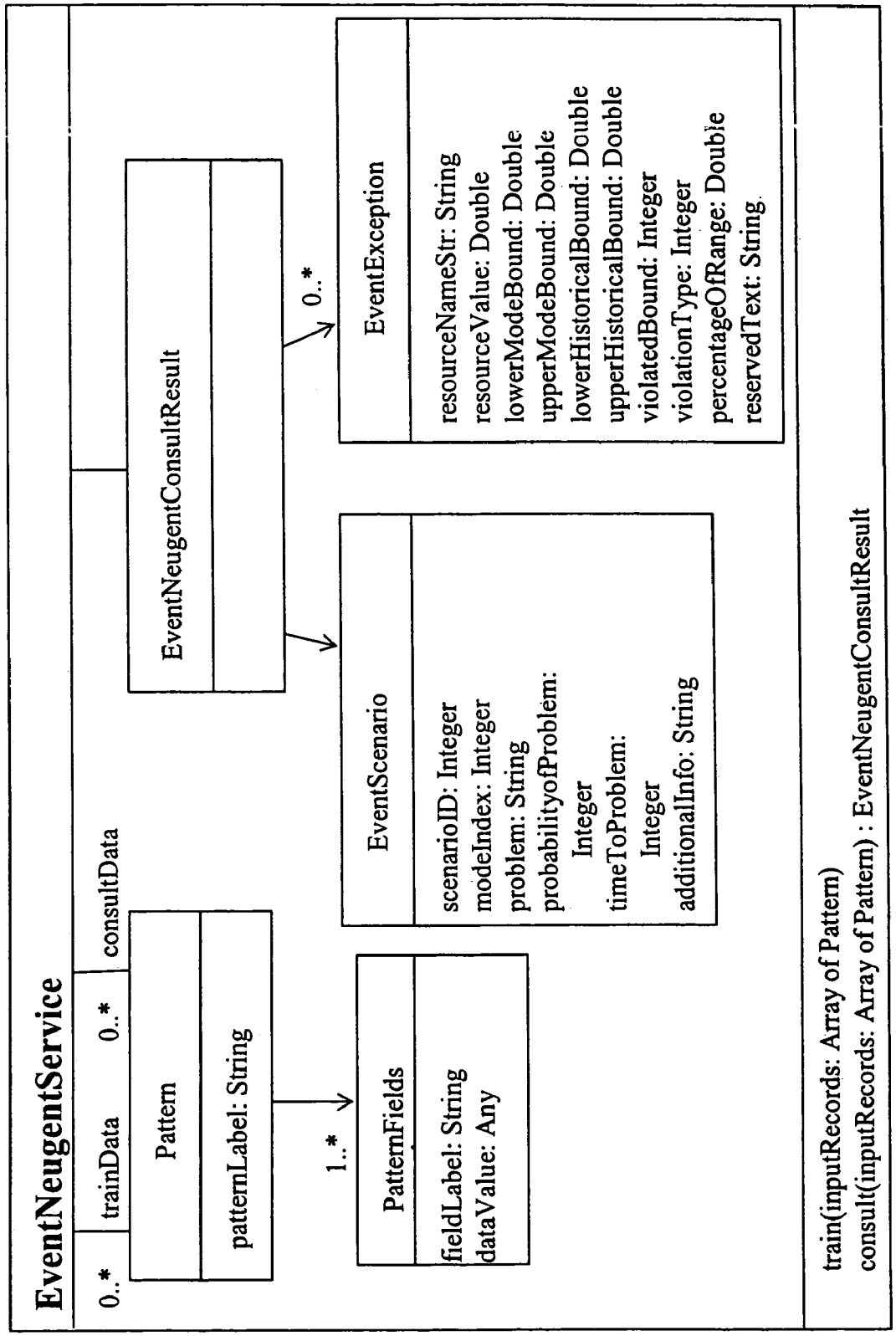
Figure 5E:
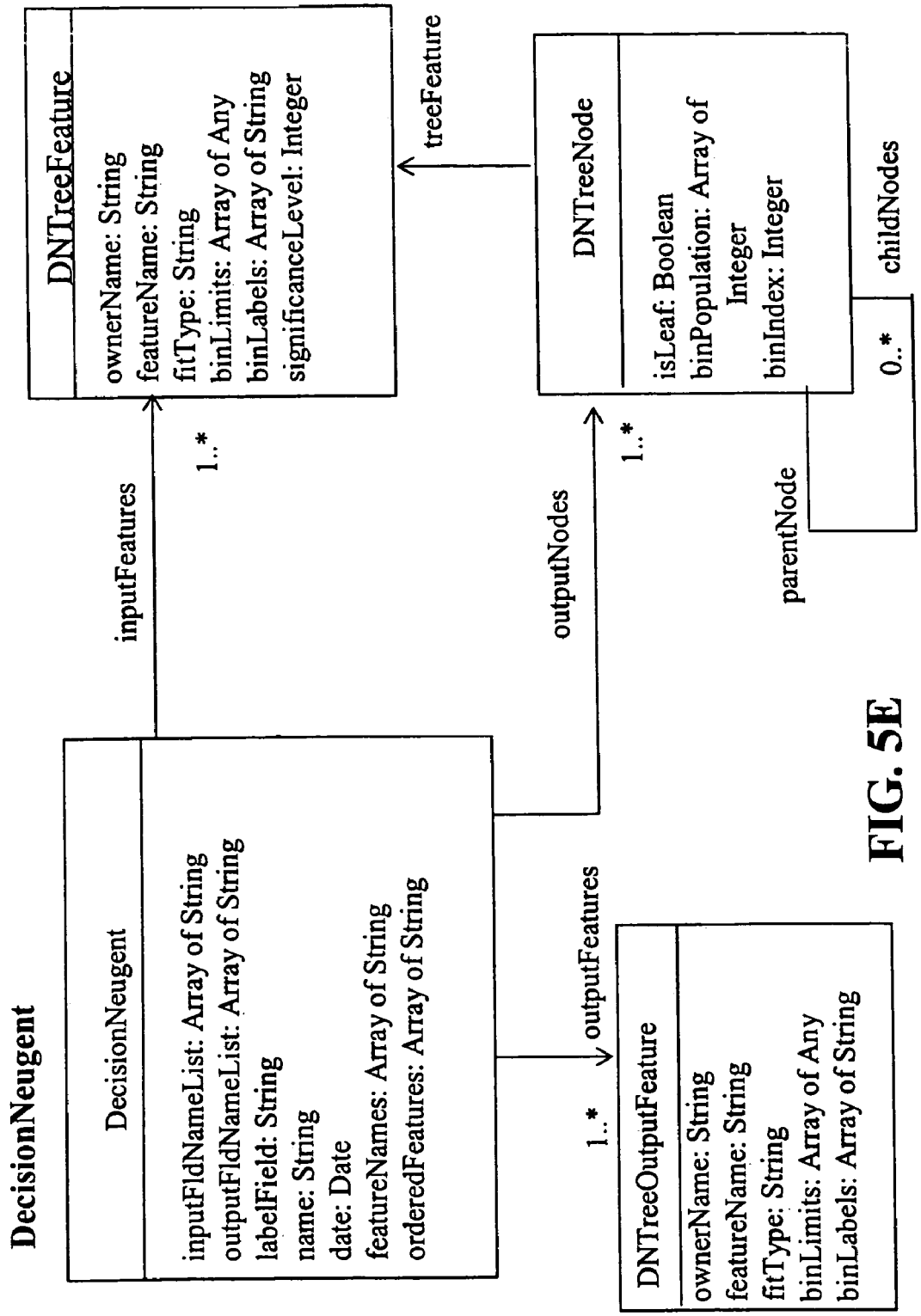
Figure 5G:
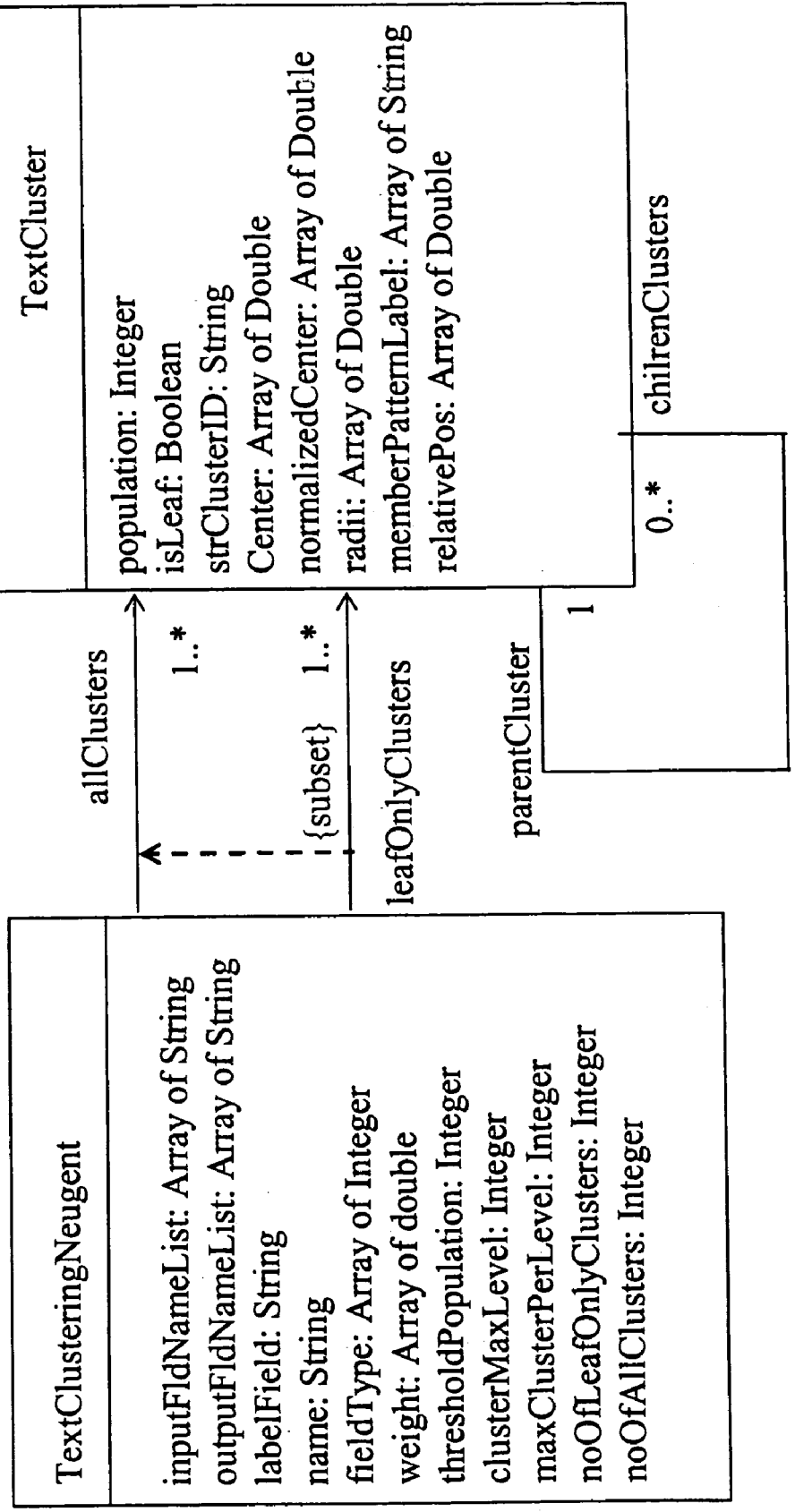
Figure 5H:
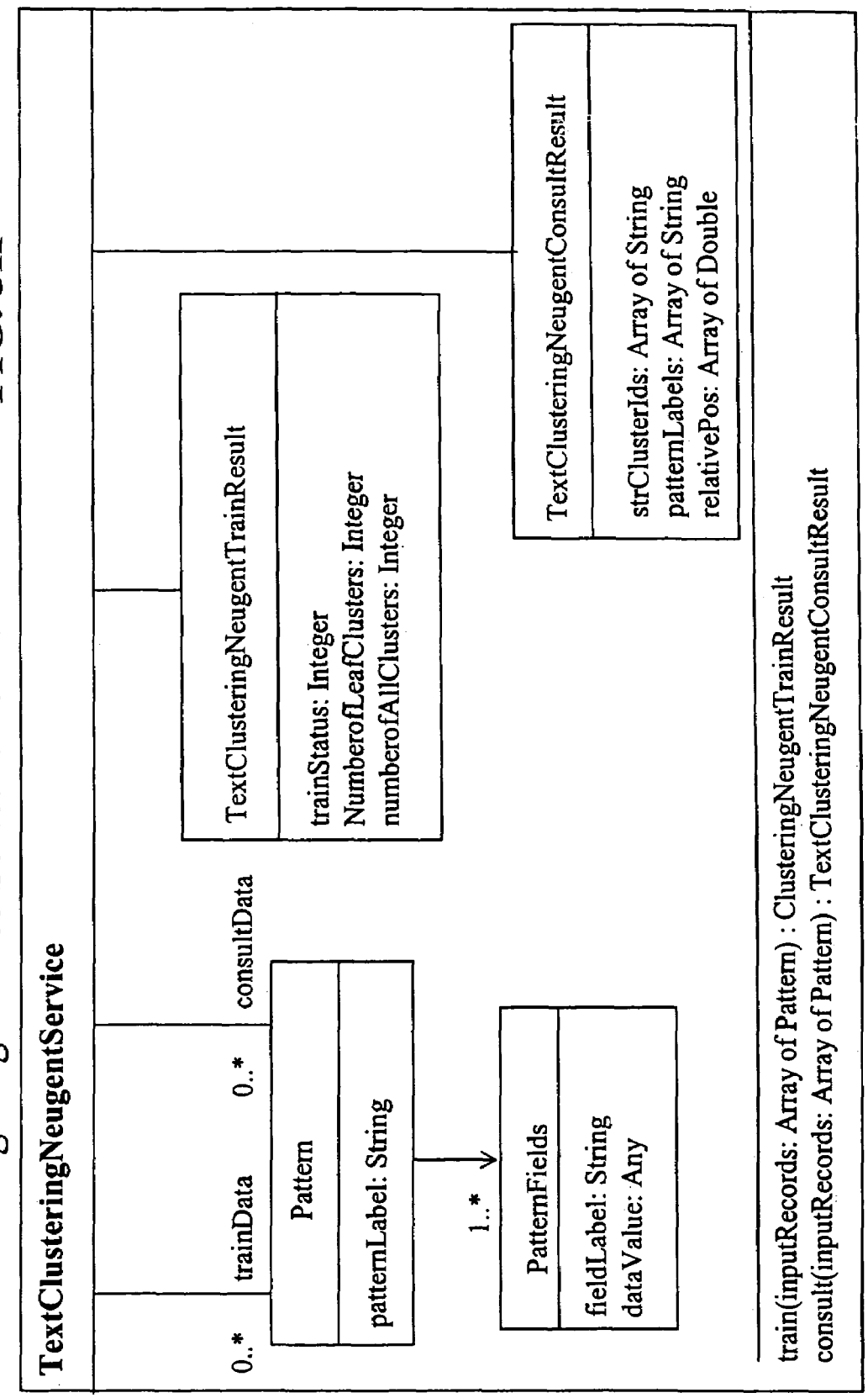
Figure 5I:
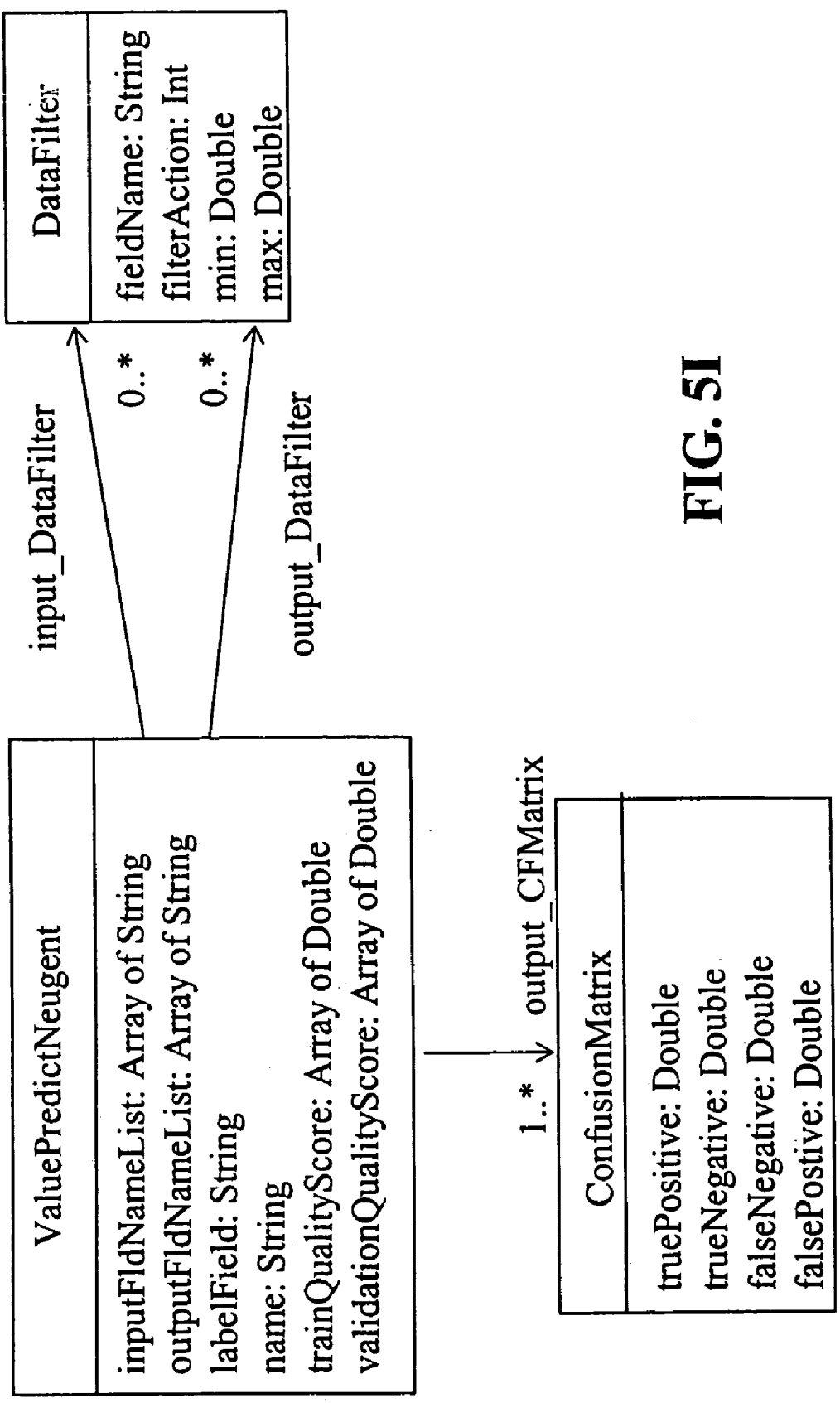
Figure 5J:
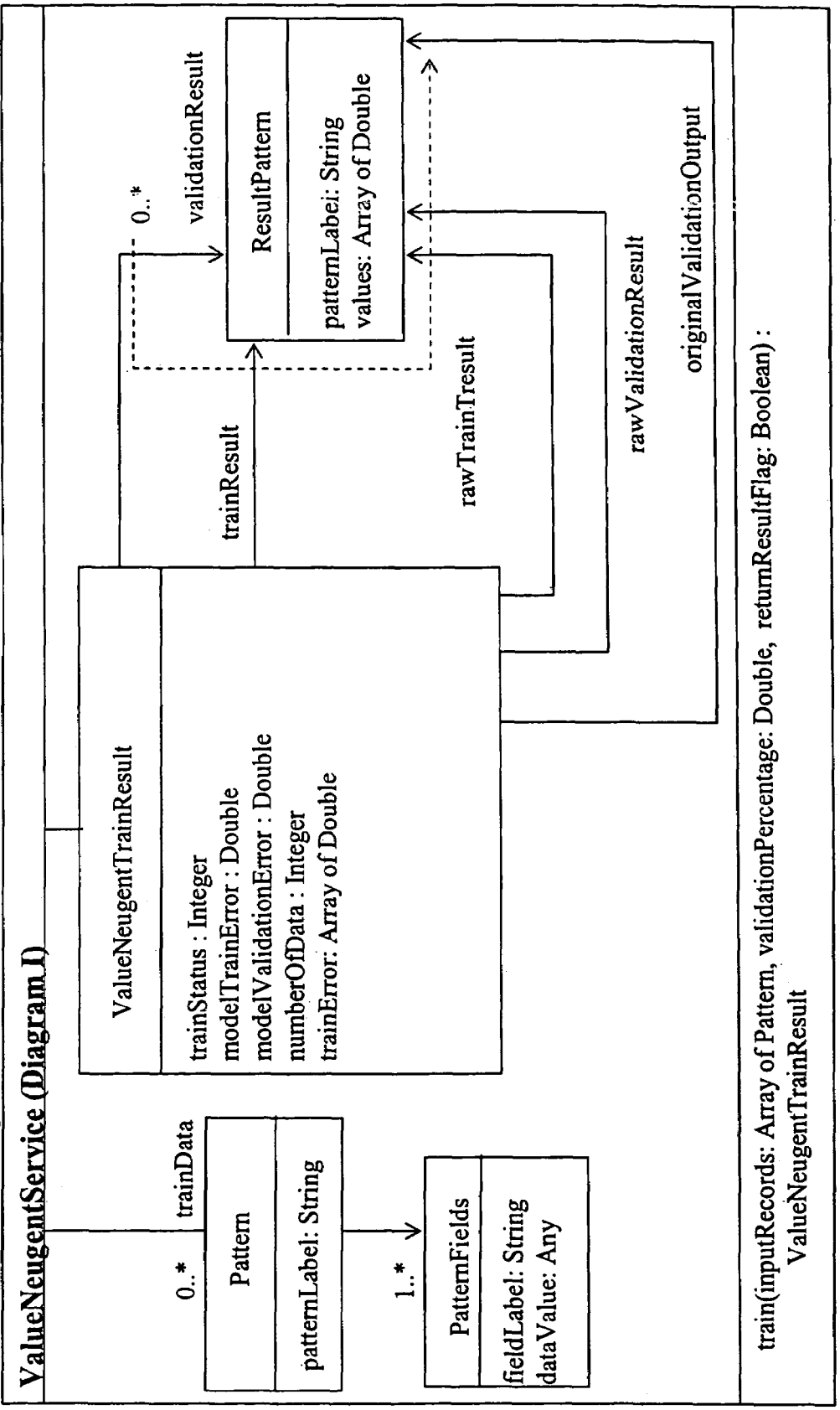
Figure 5K:
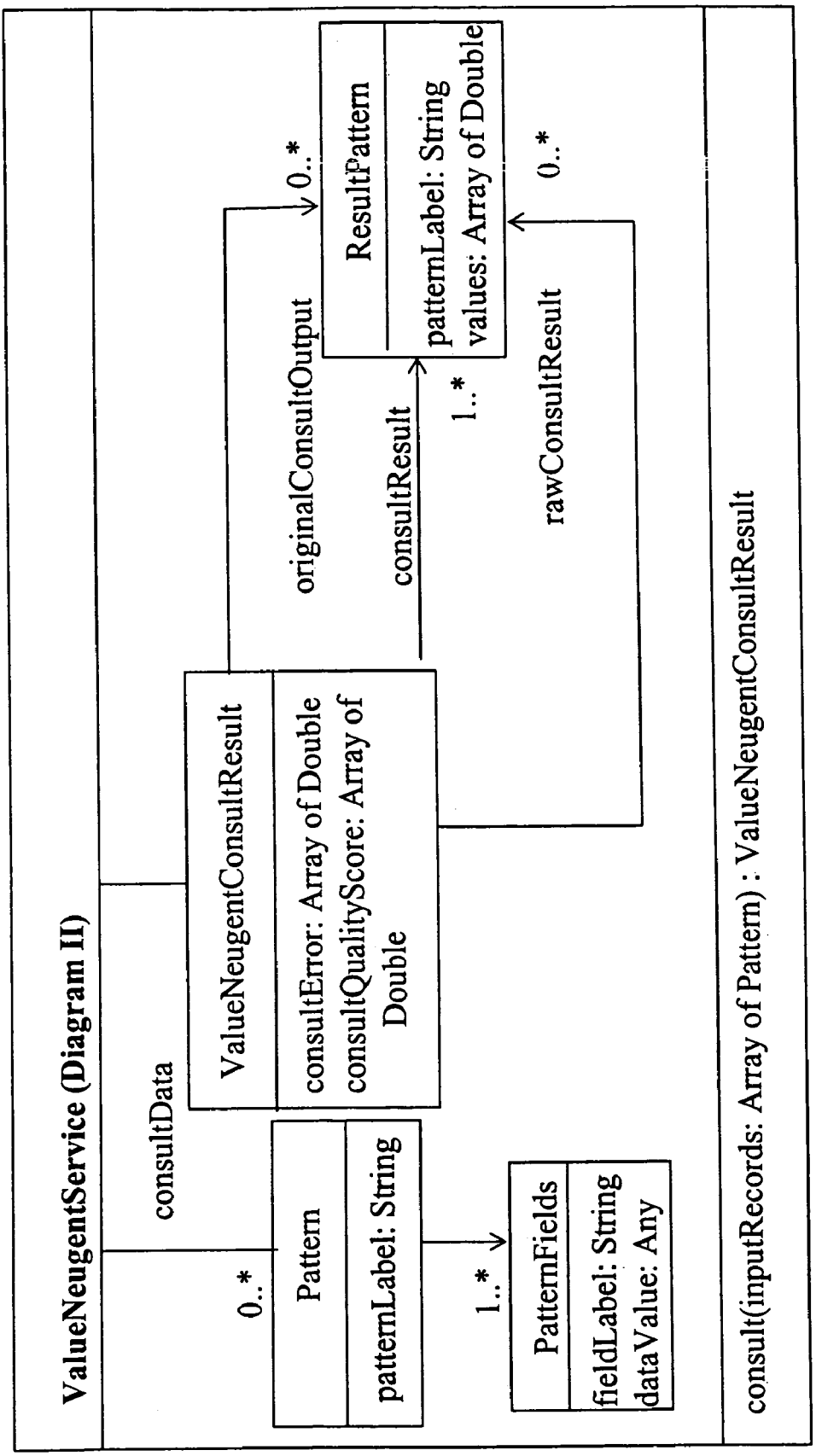
Figure 6A:
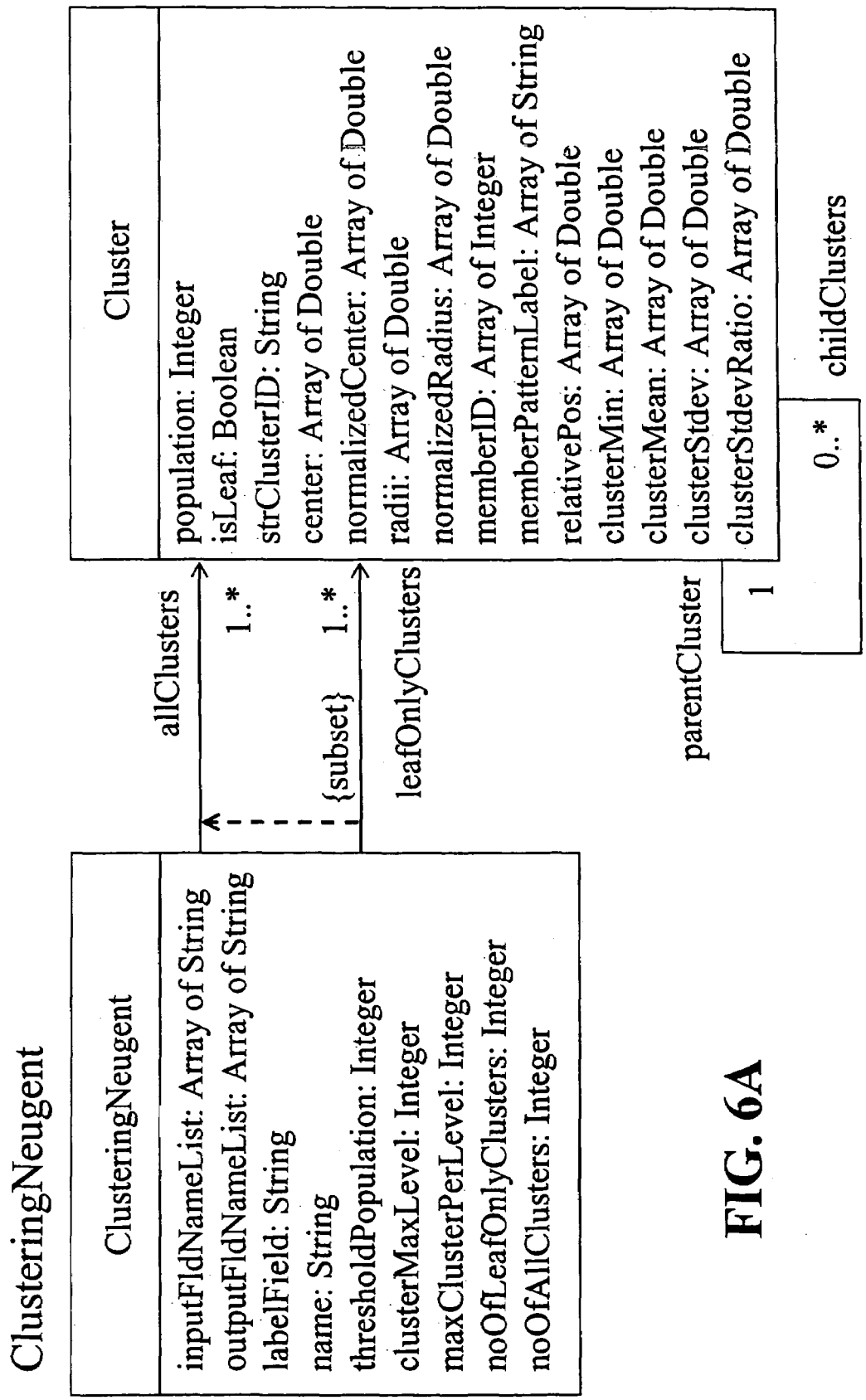
Figure 6B:
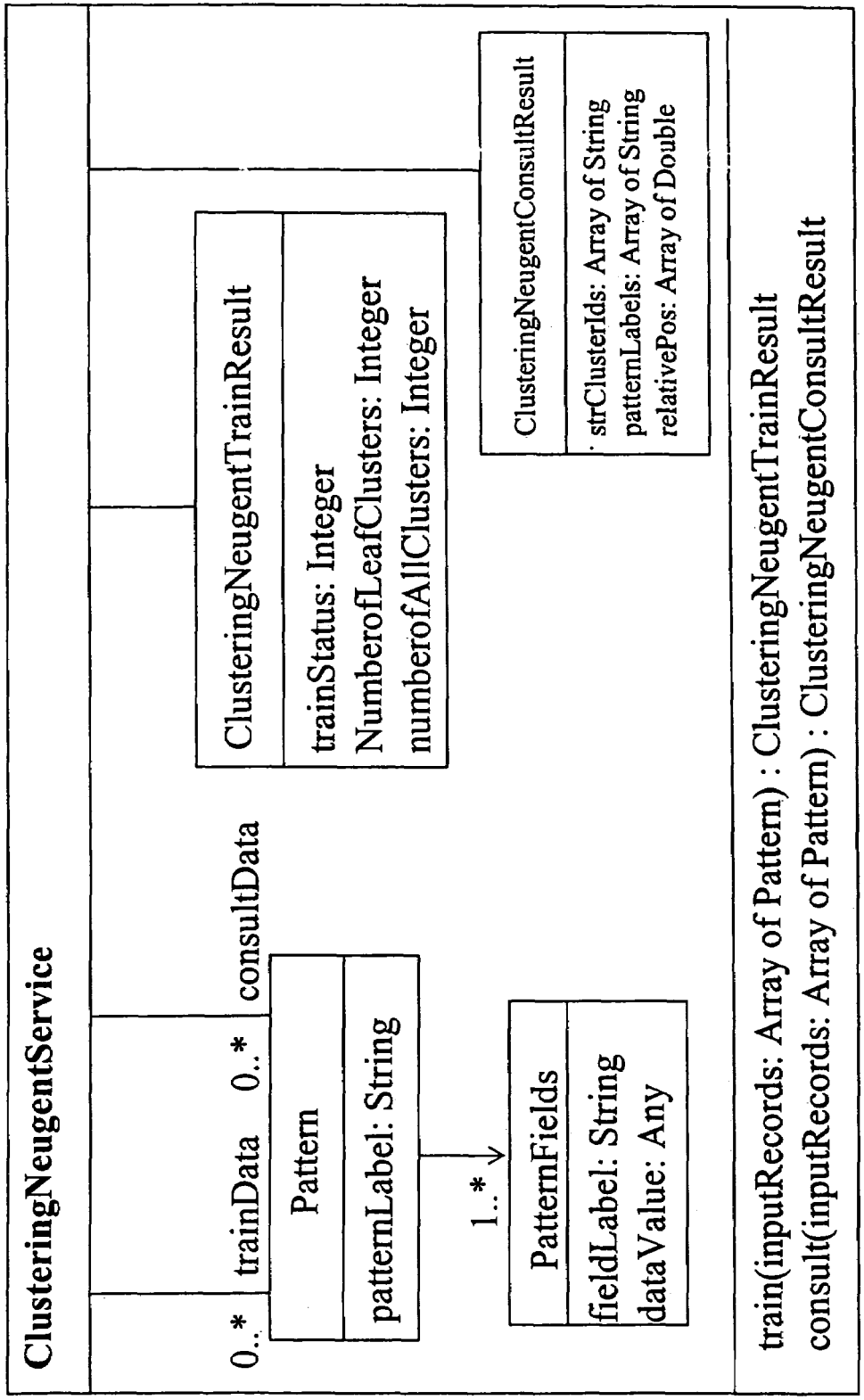
FIGS. 6B, 6D, 6F, 6H, 6J and 6K show class diagrams for the web service interface of the Neugents classes, according to the third embodiment.
Figure 6D:
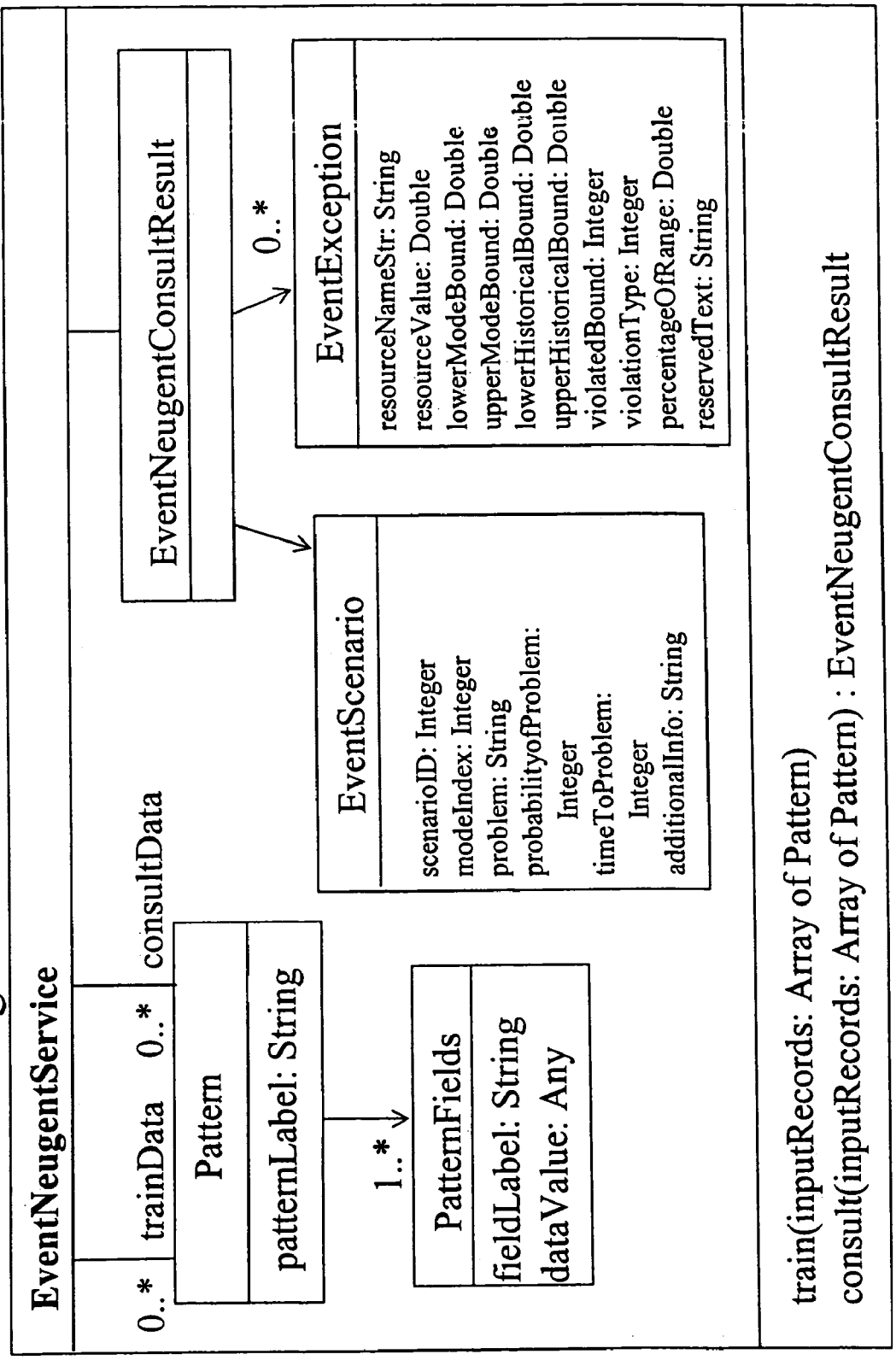
Figure 6E:
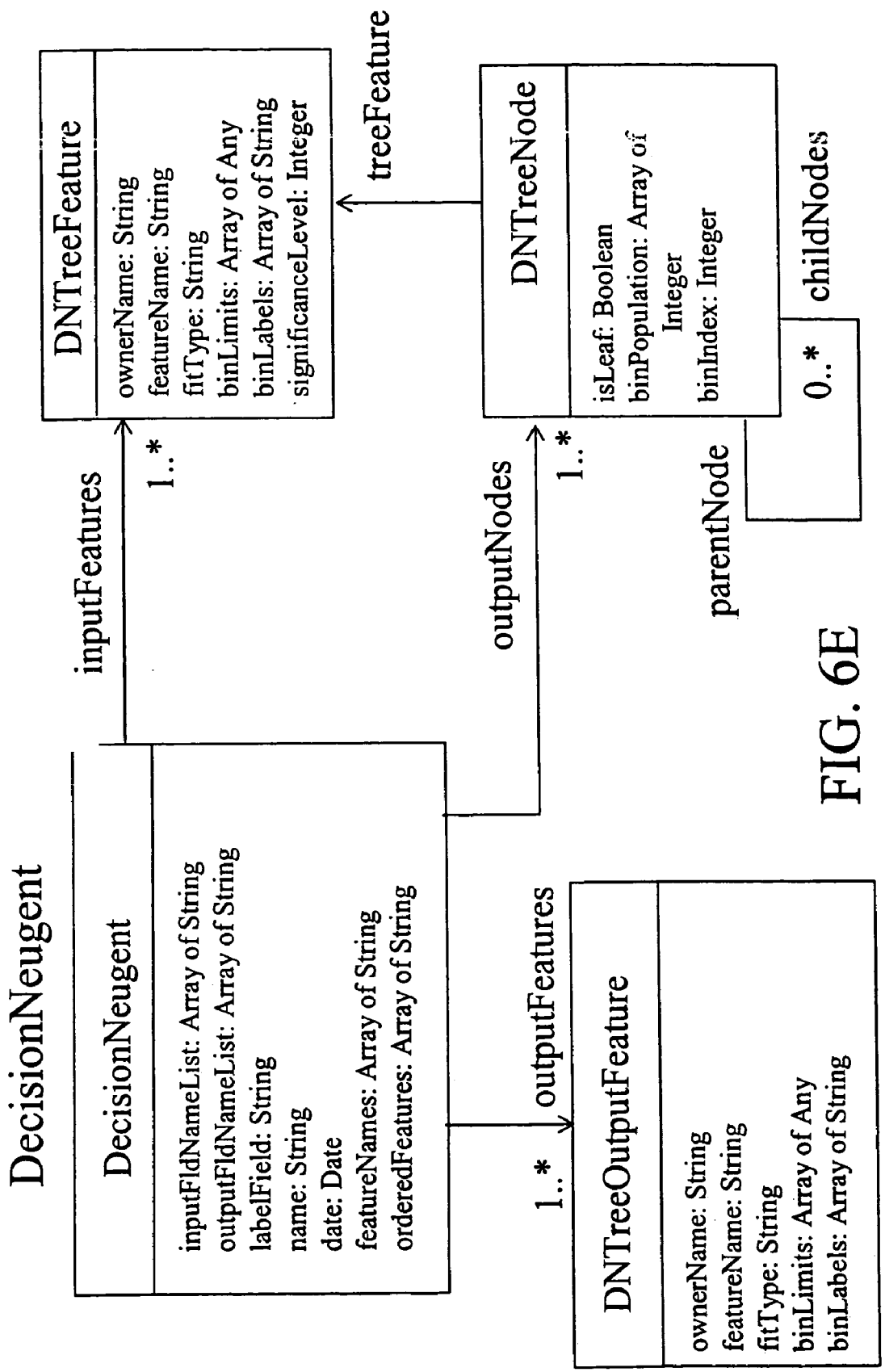
Figure 6F:
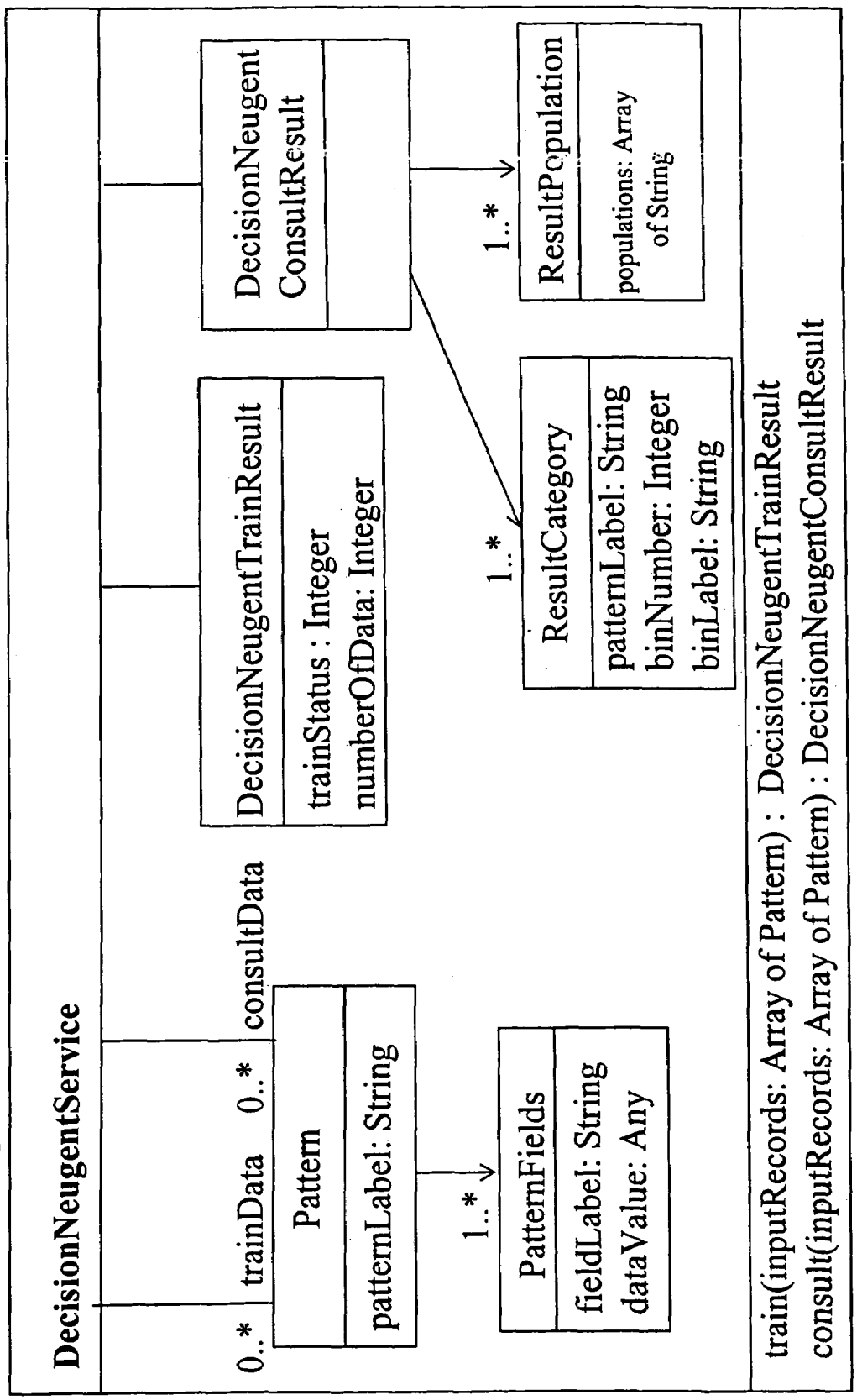
Figure 6G:
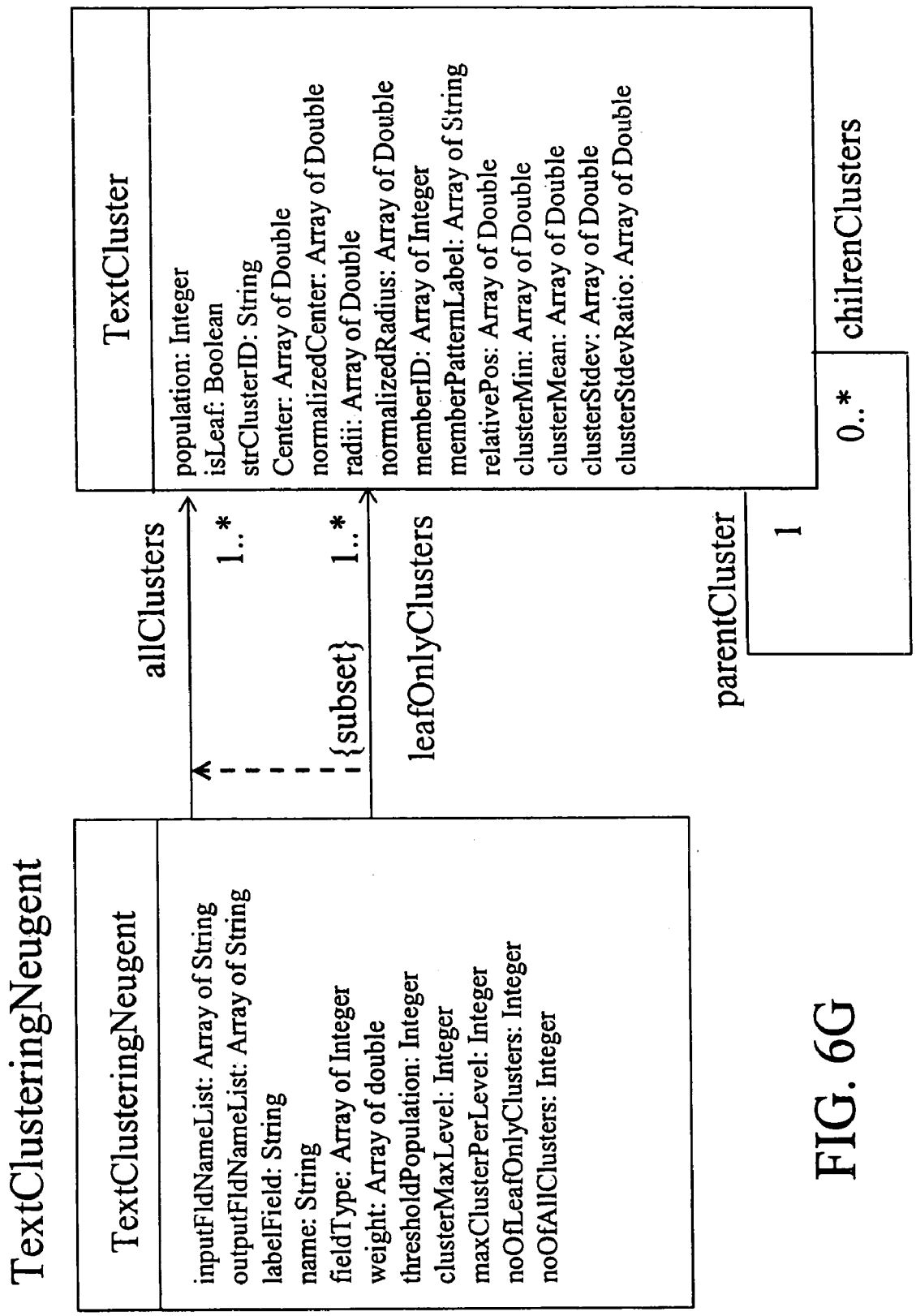
Figure 6H:
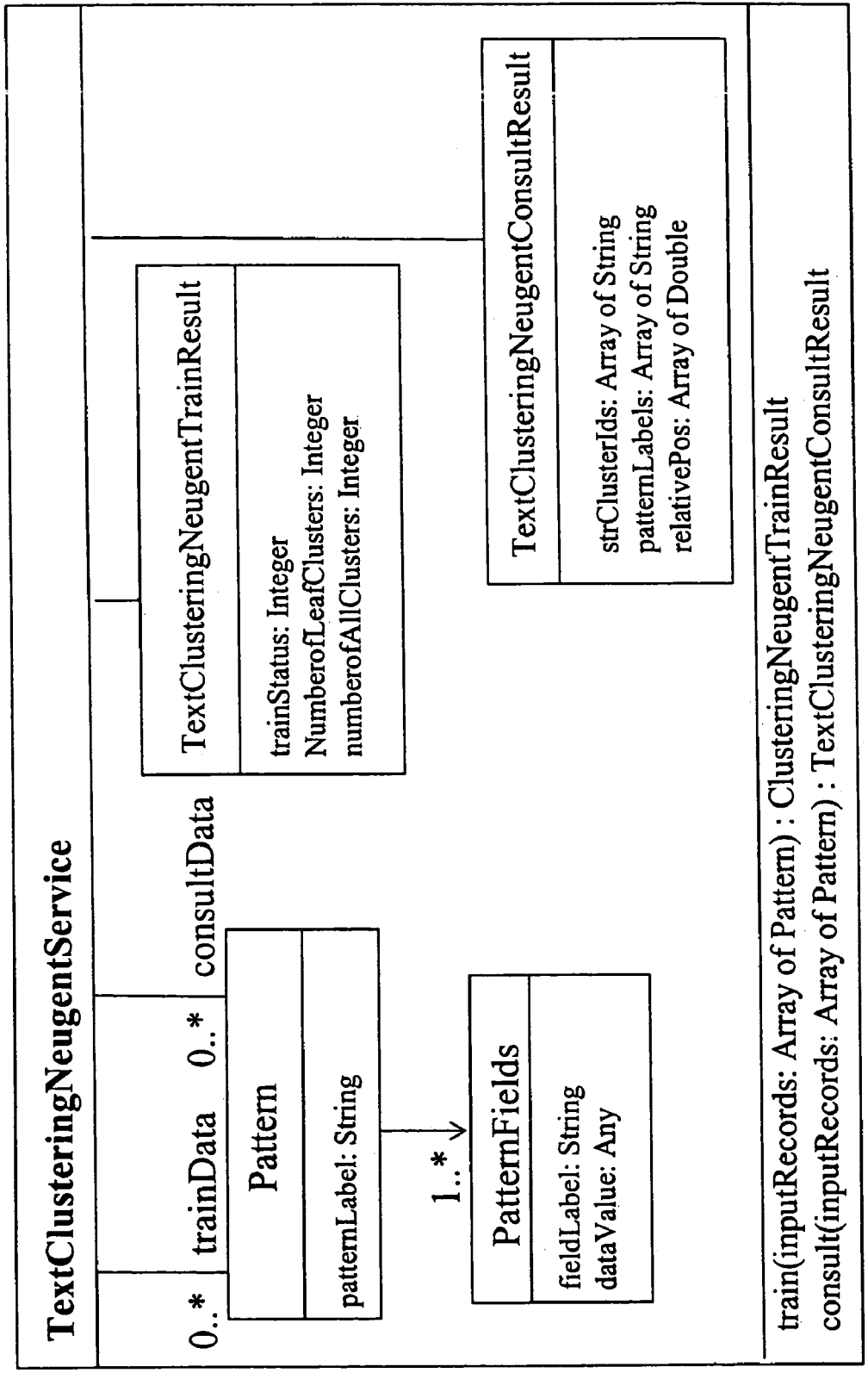
Figure 6I:
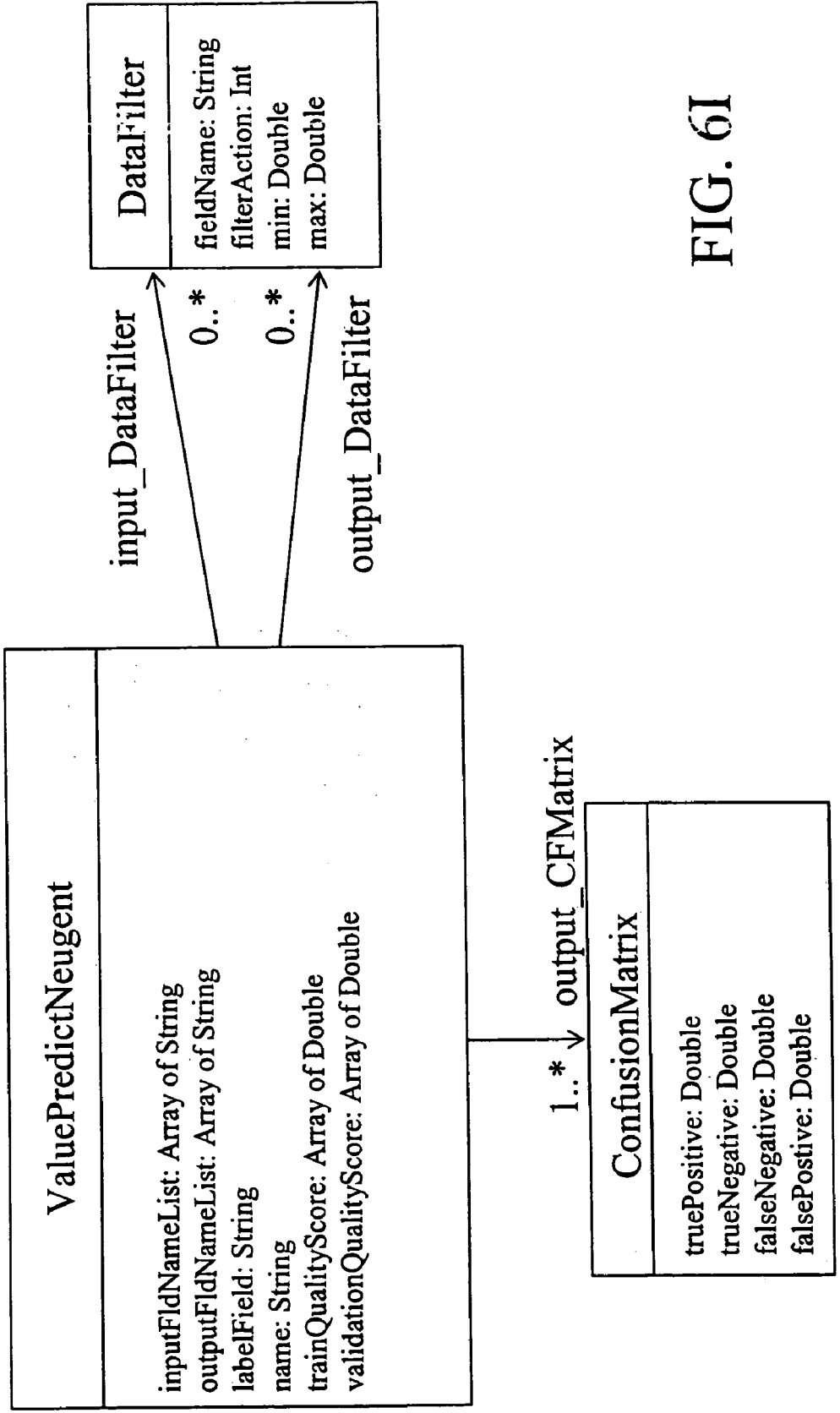
Figure 6J:
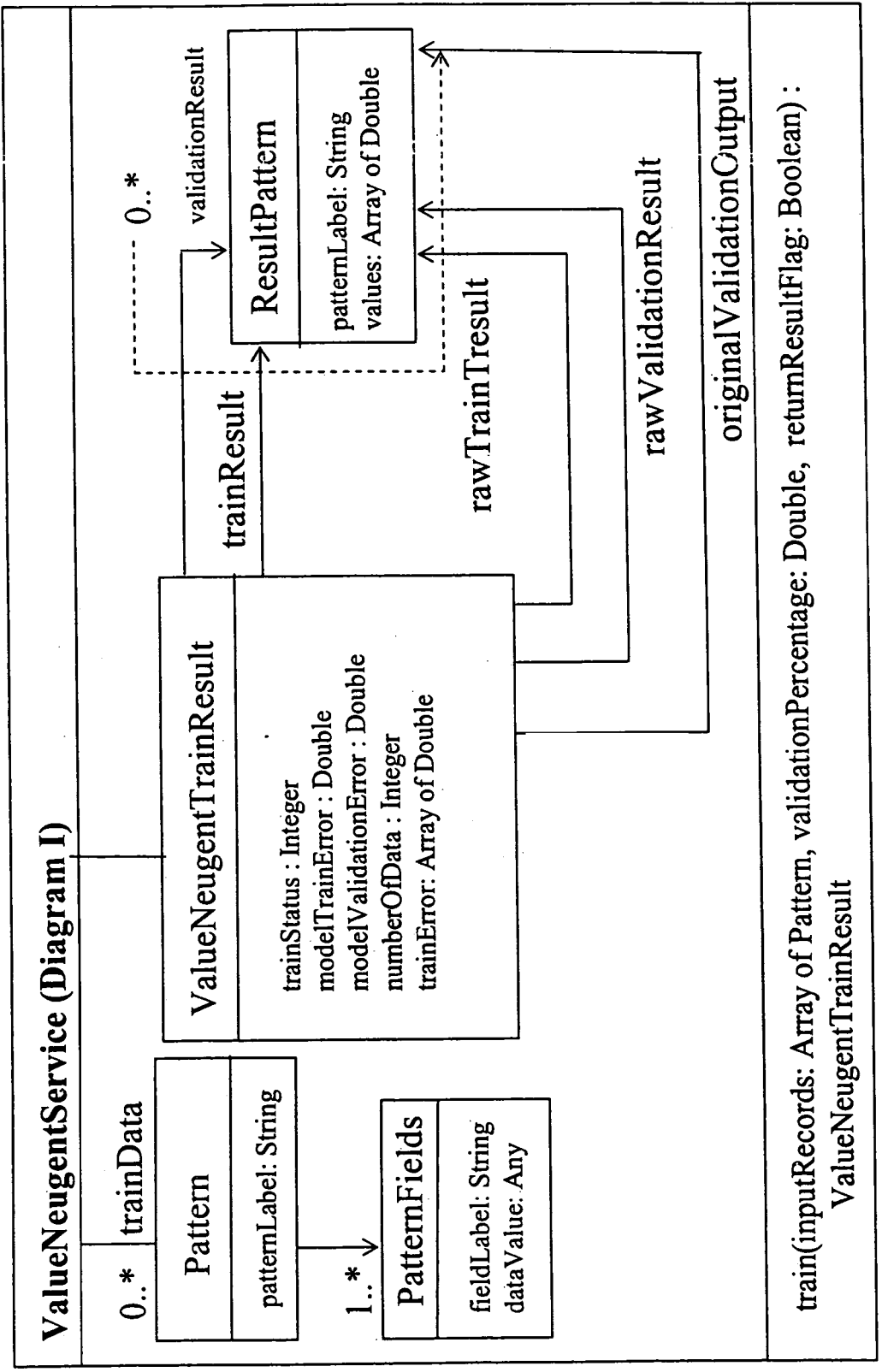
Figure 6K:
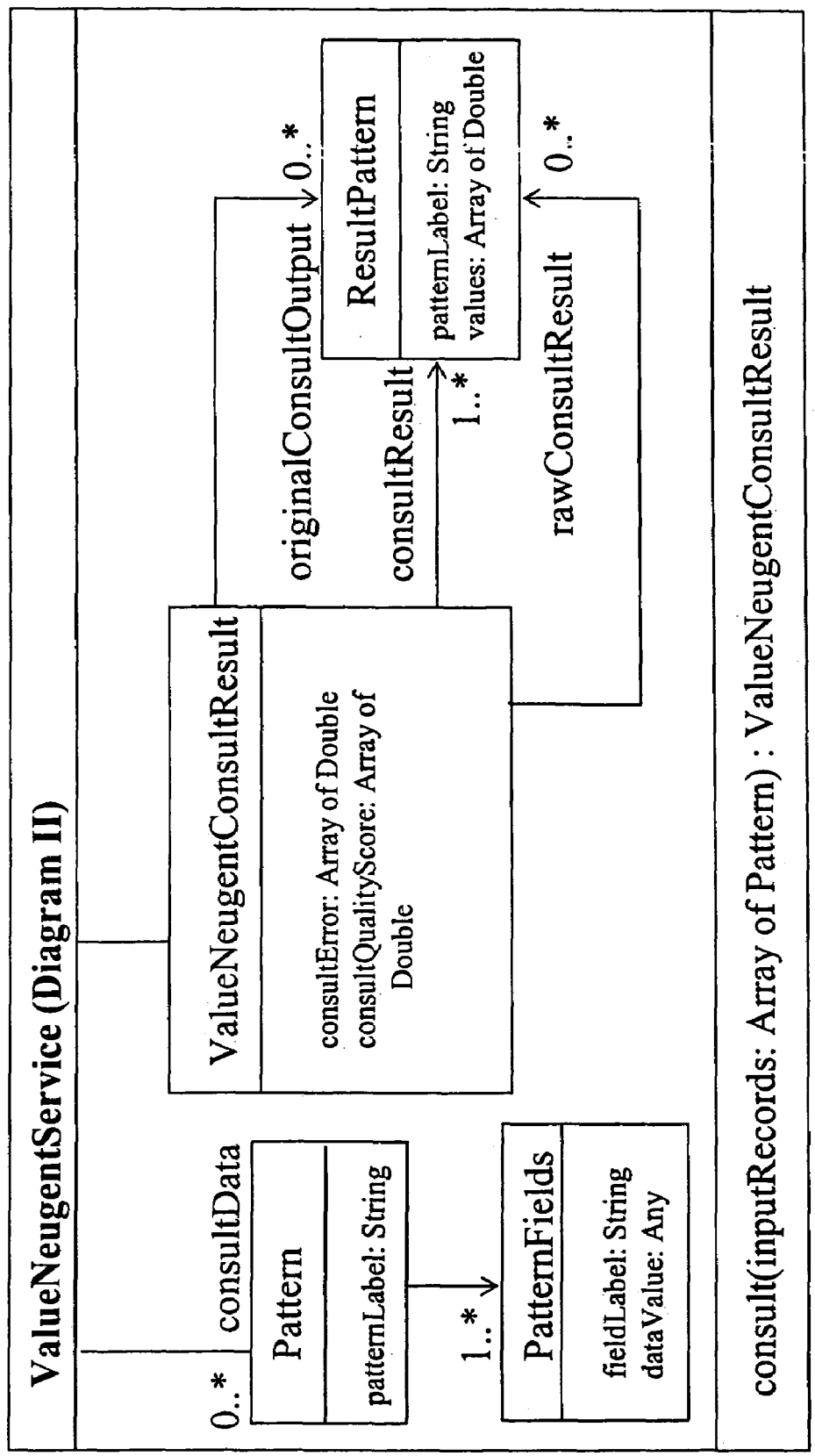
Figure 7A:
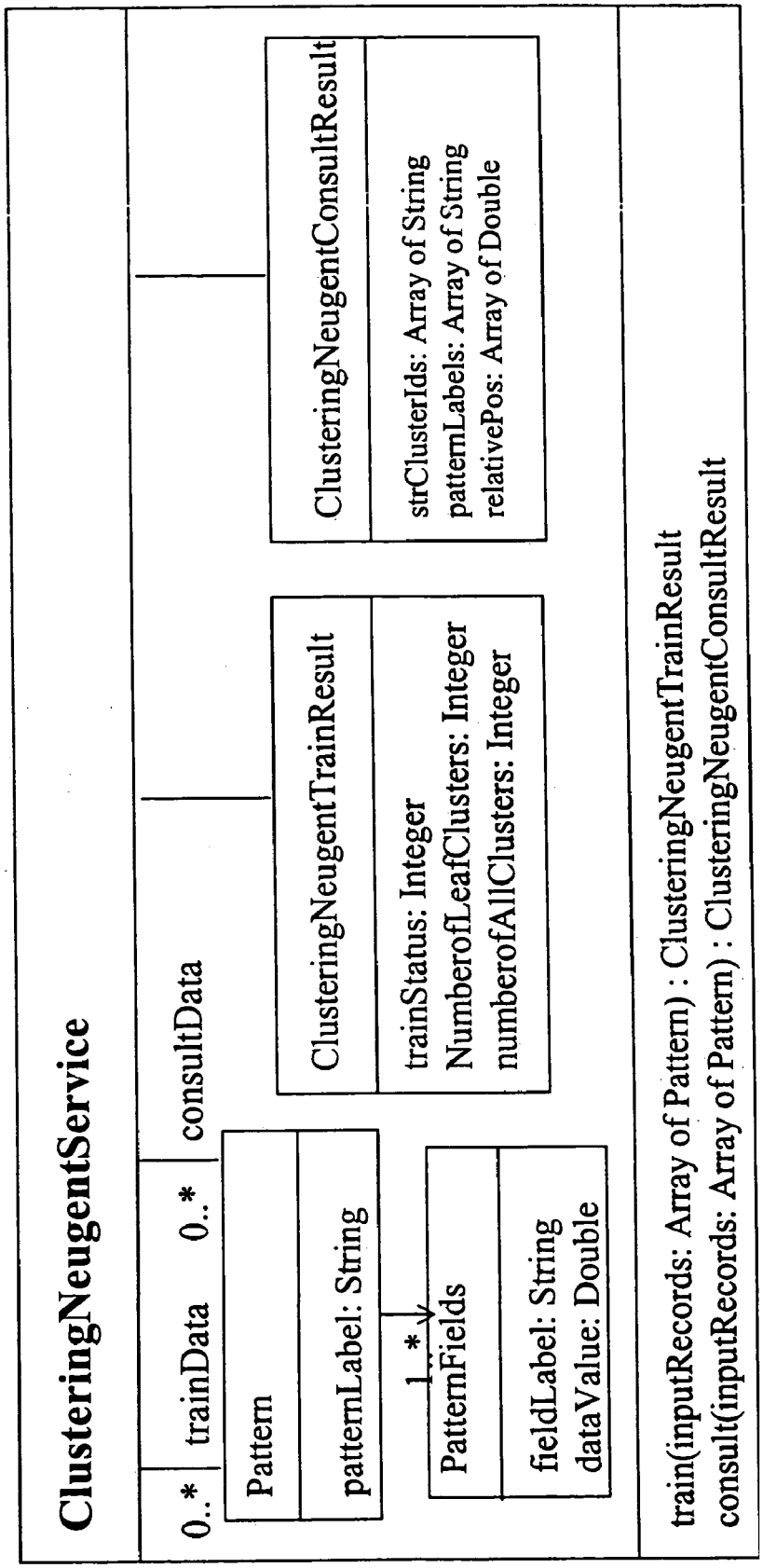
Figure 7C:
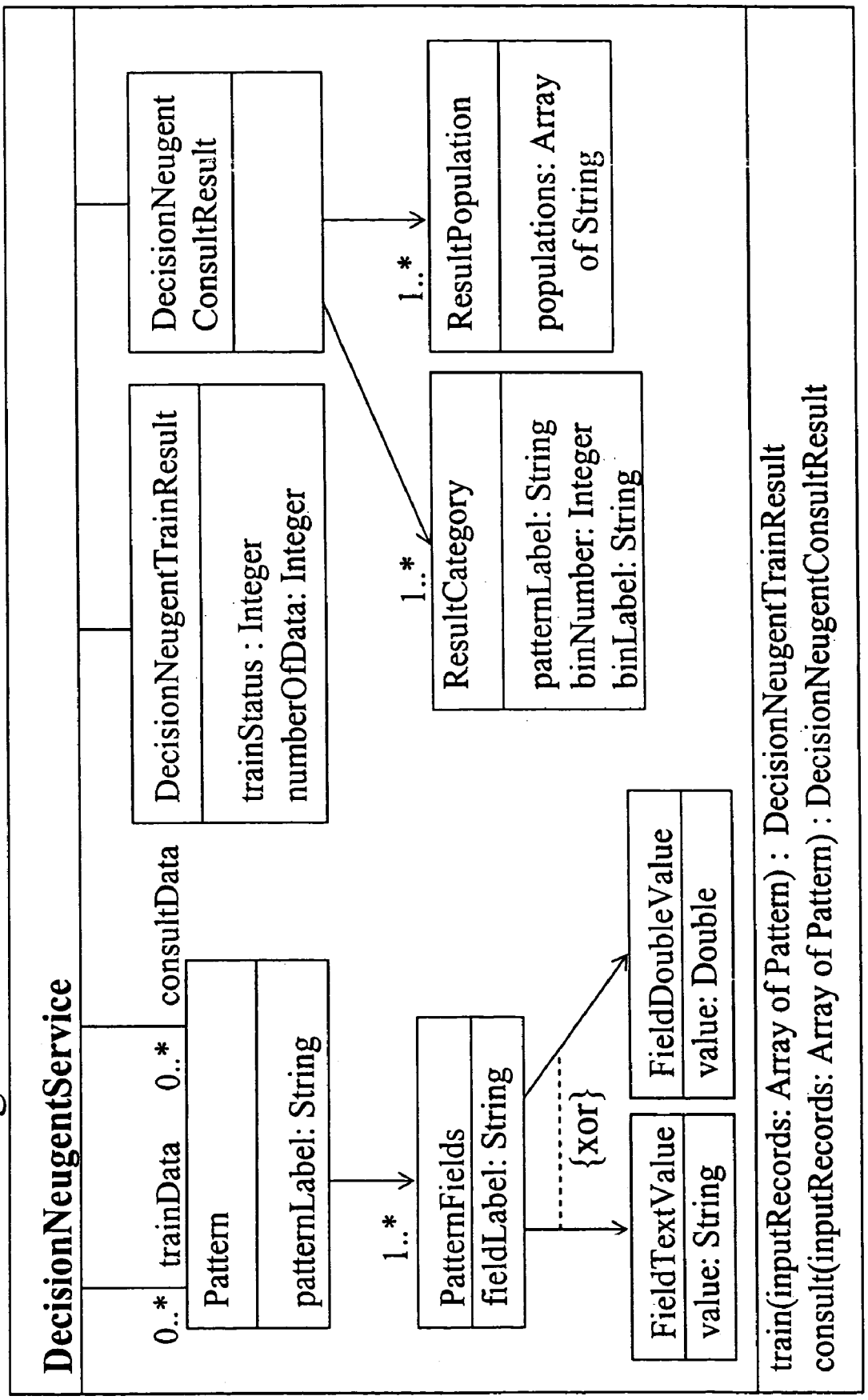
Figure 7D:
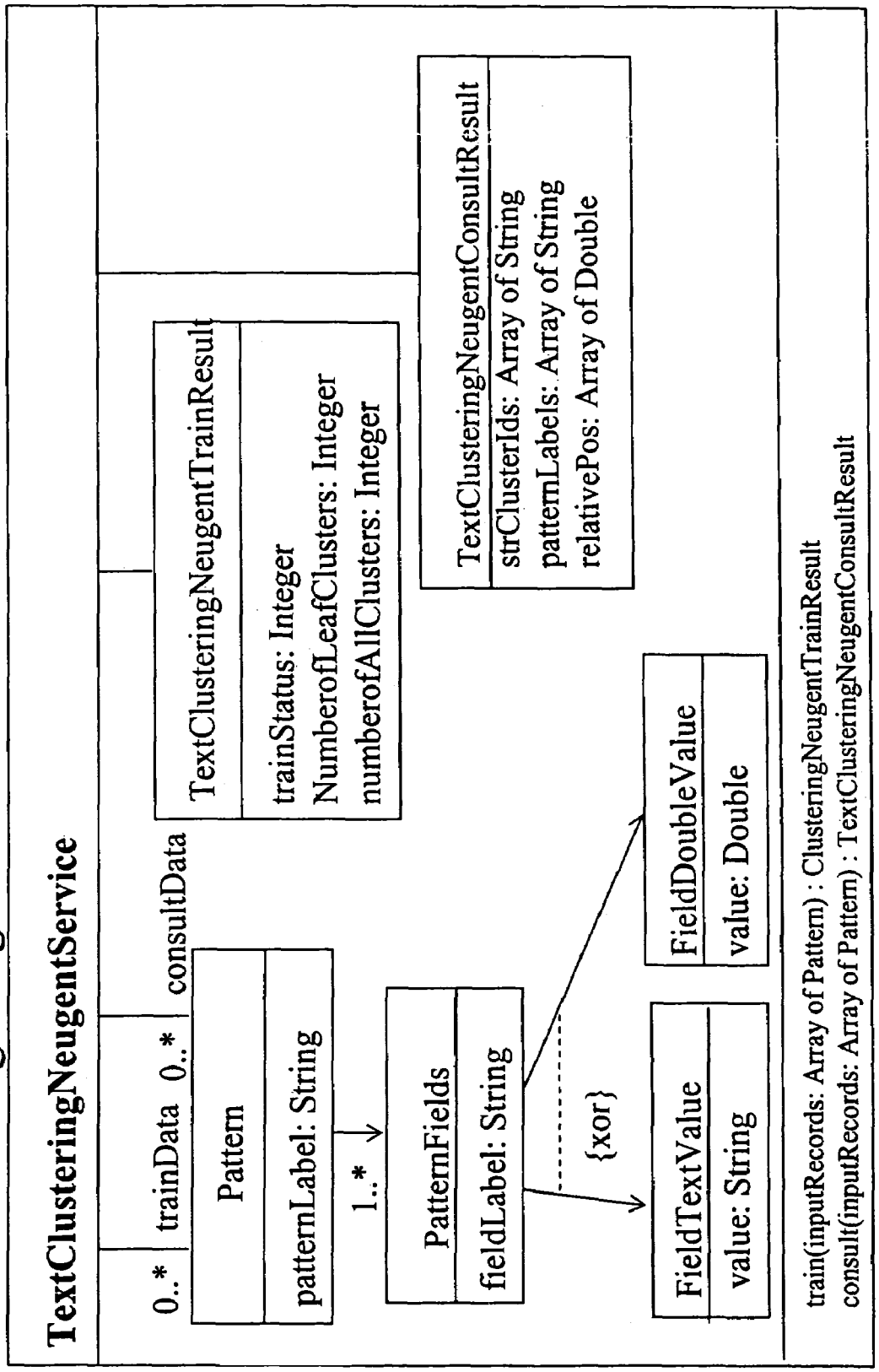
Figure 7E:
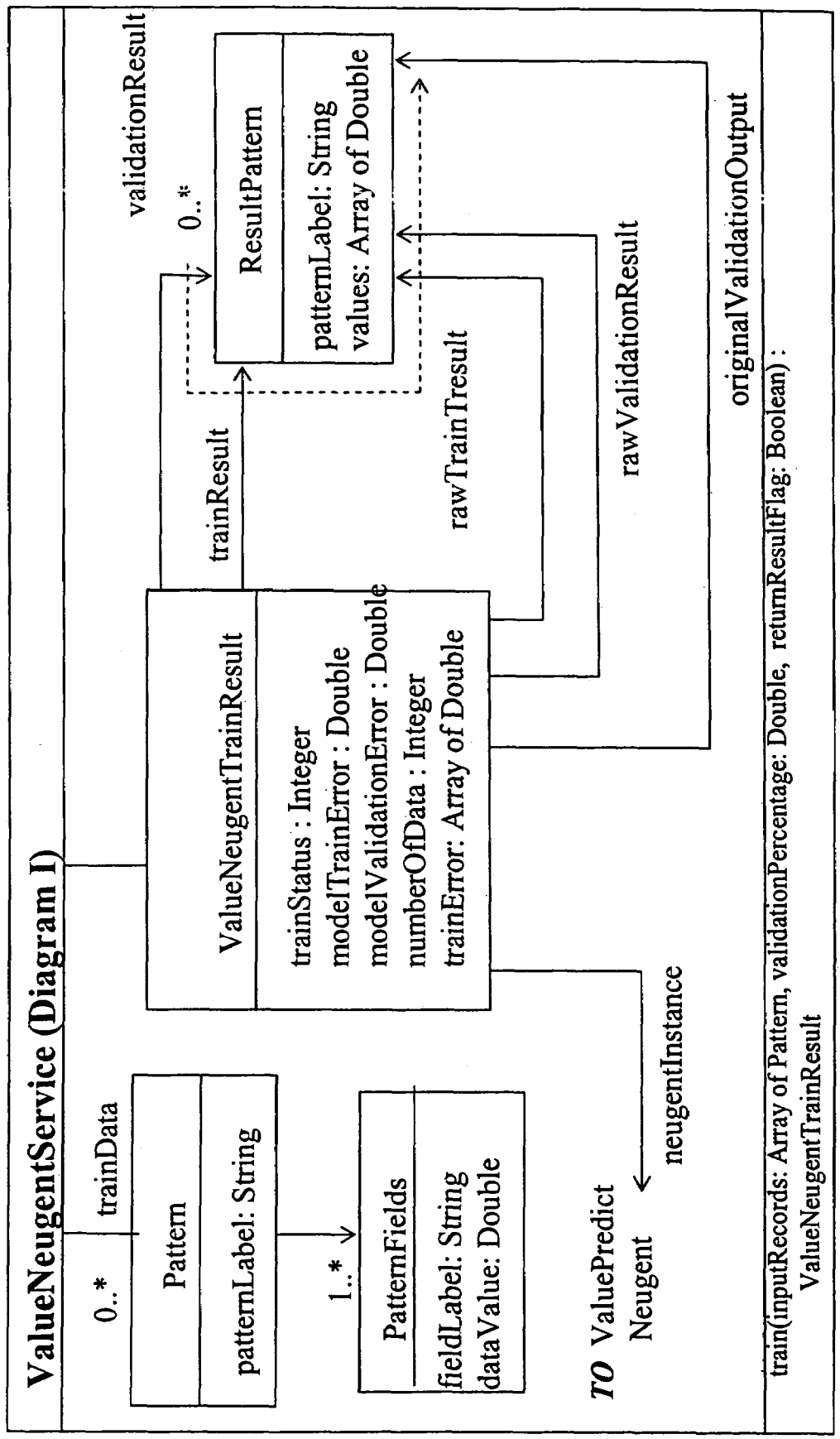
Figure 7F:
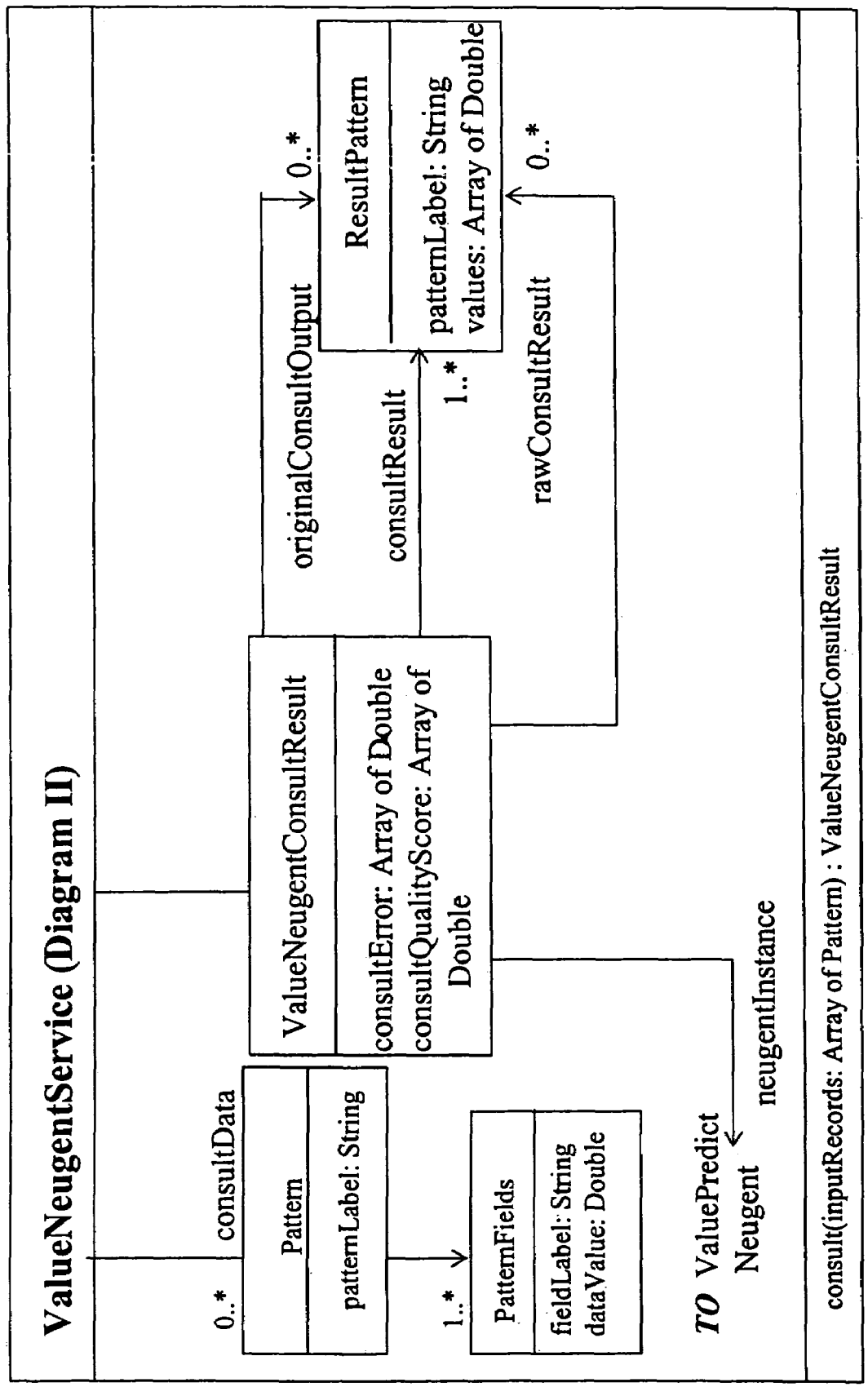
Figure 7G:
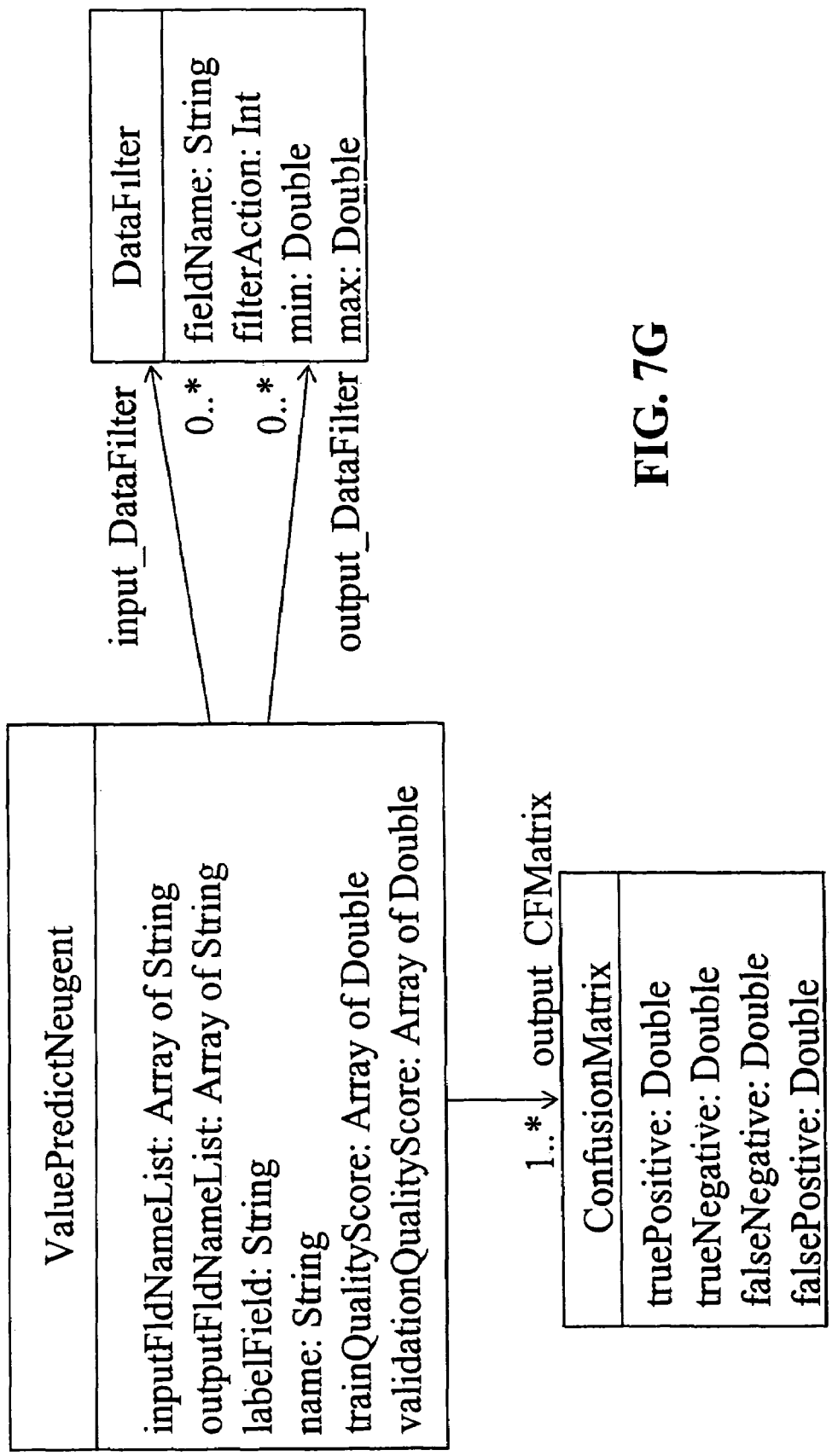
FIG. 7G shows an object schema for the Value Predict Neugent, according to the fourth embodiment.
Figure 8A:
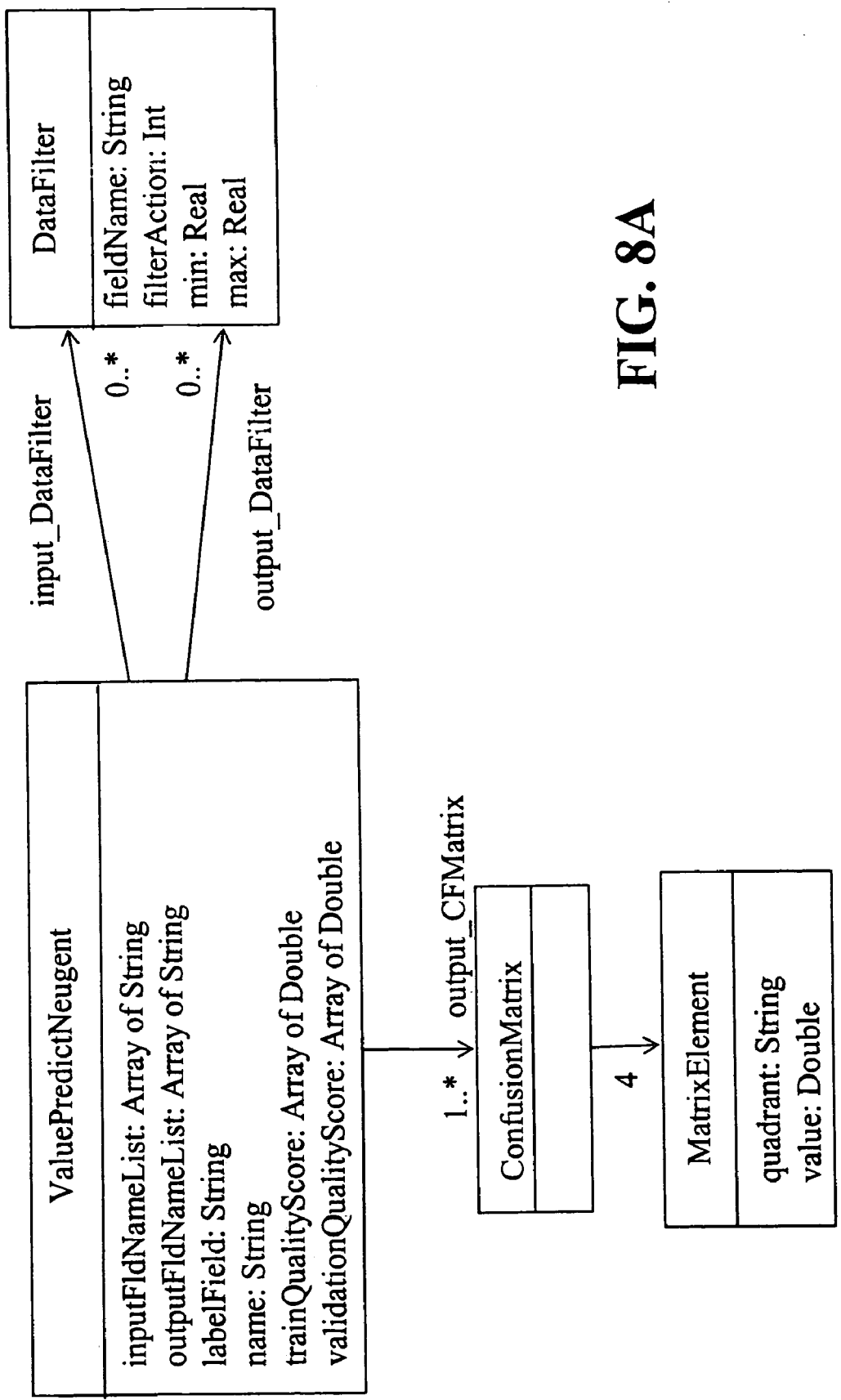
Figure 8C:
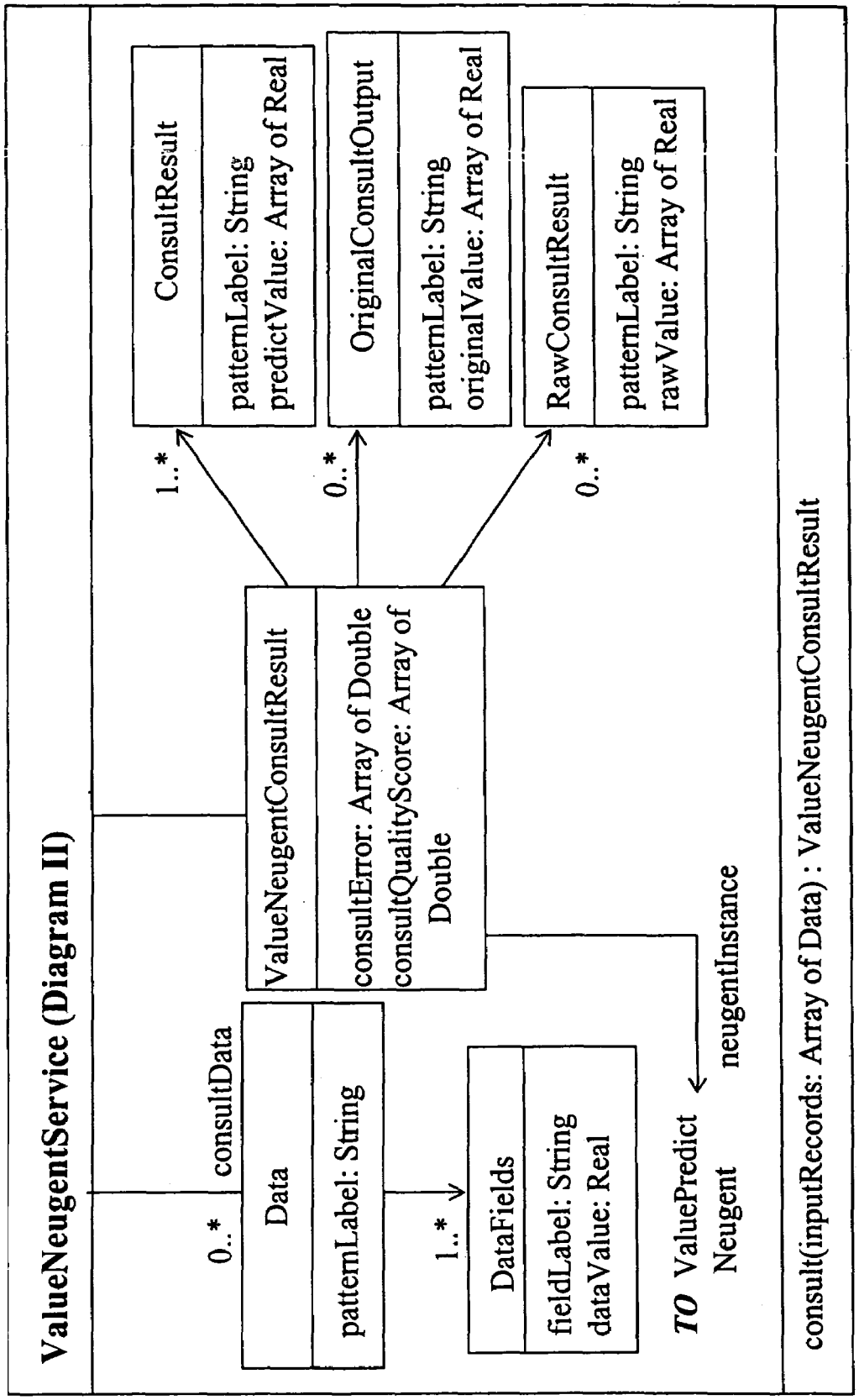
Figure 8E:
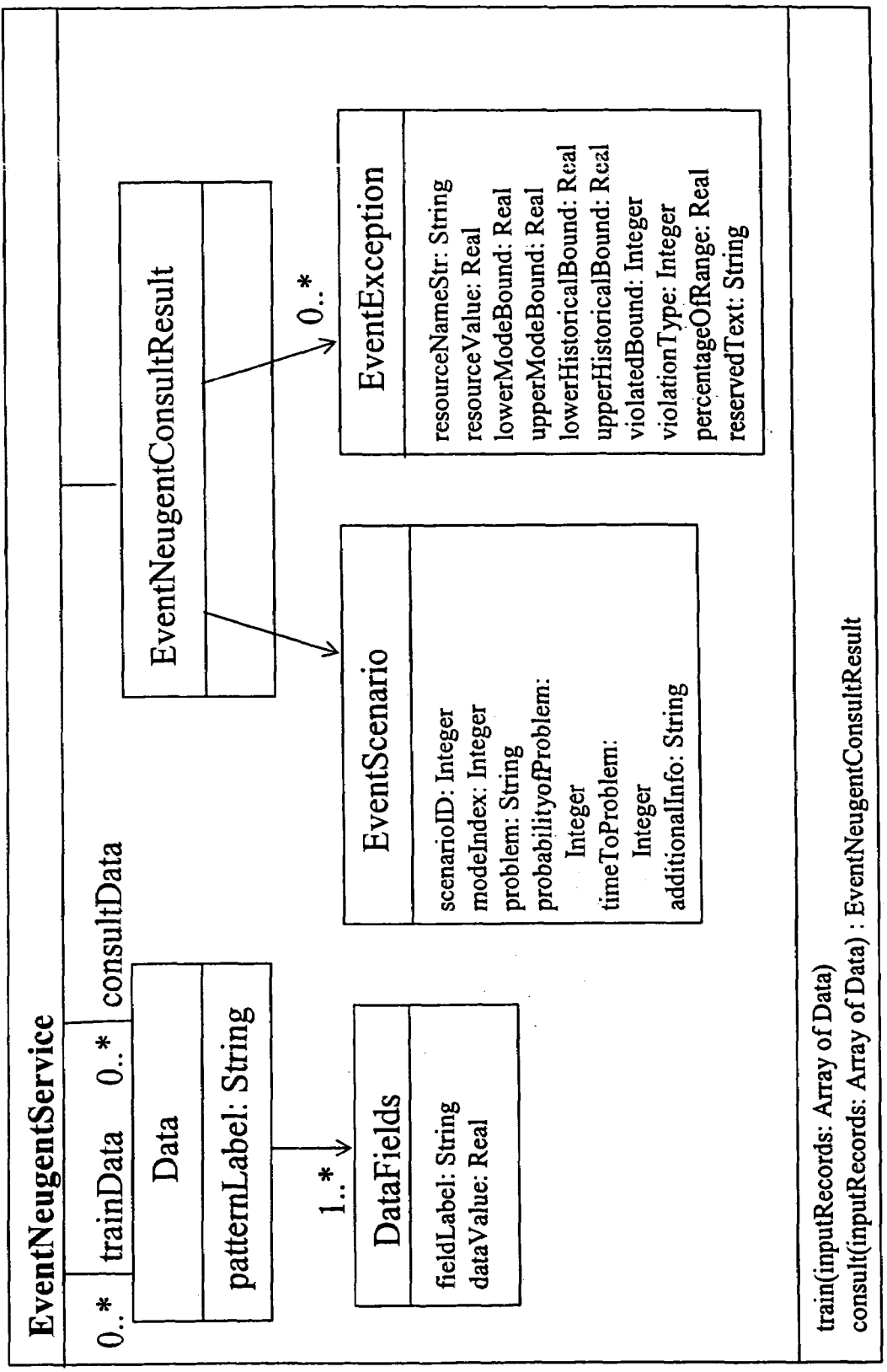
Figure 8F:
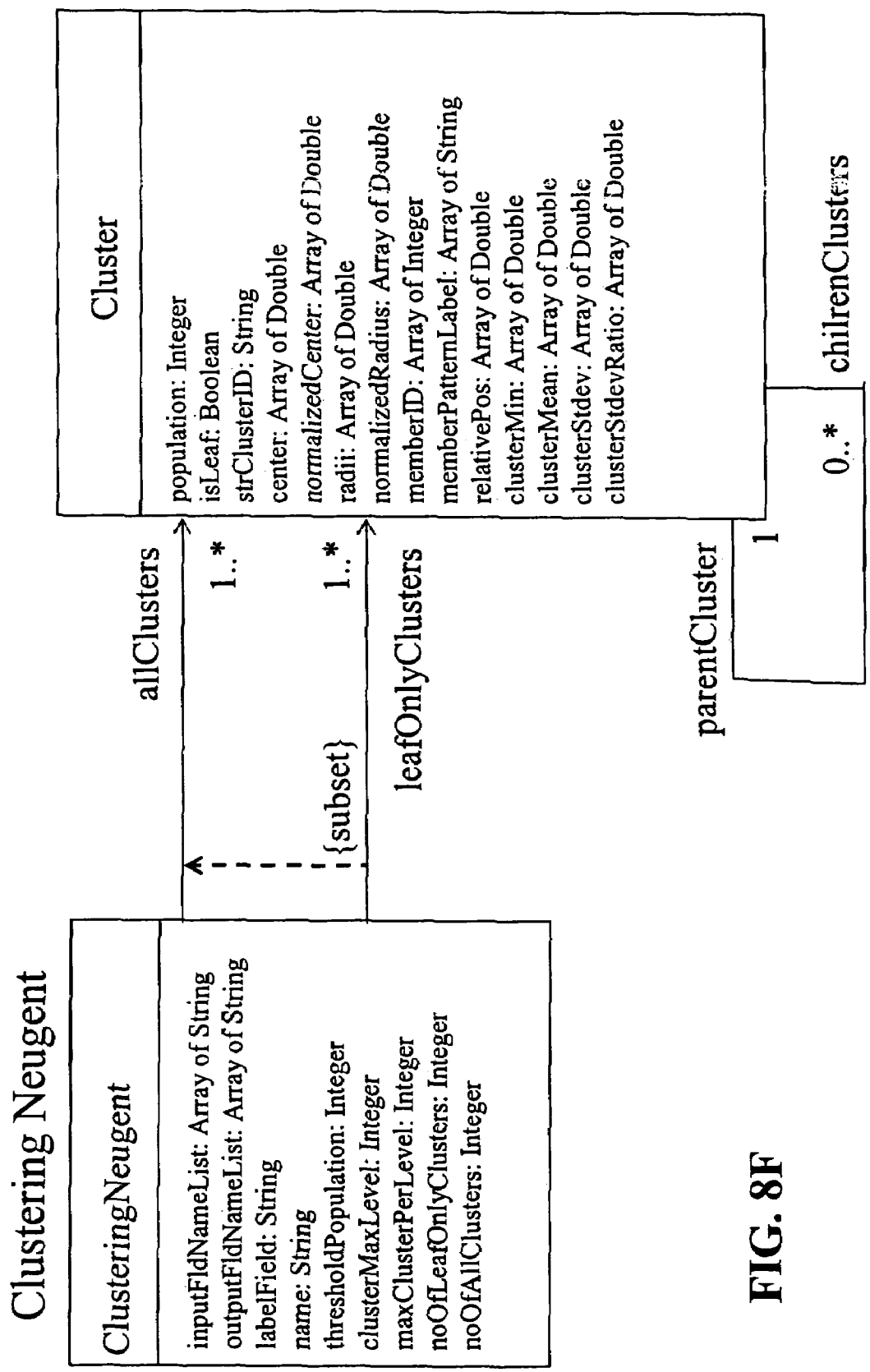
Figure 8G:
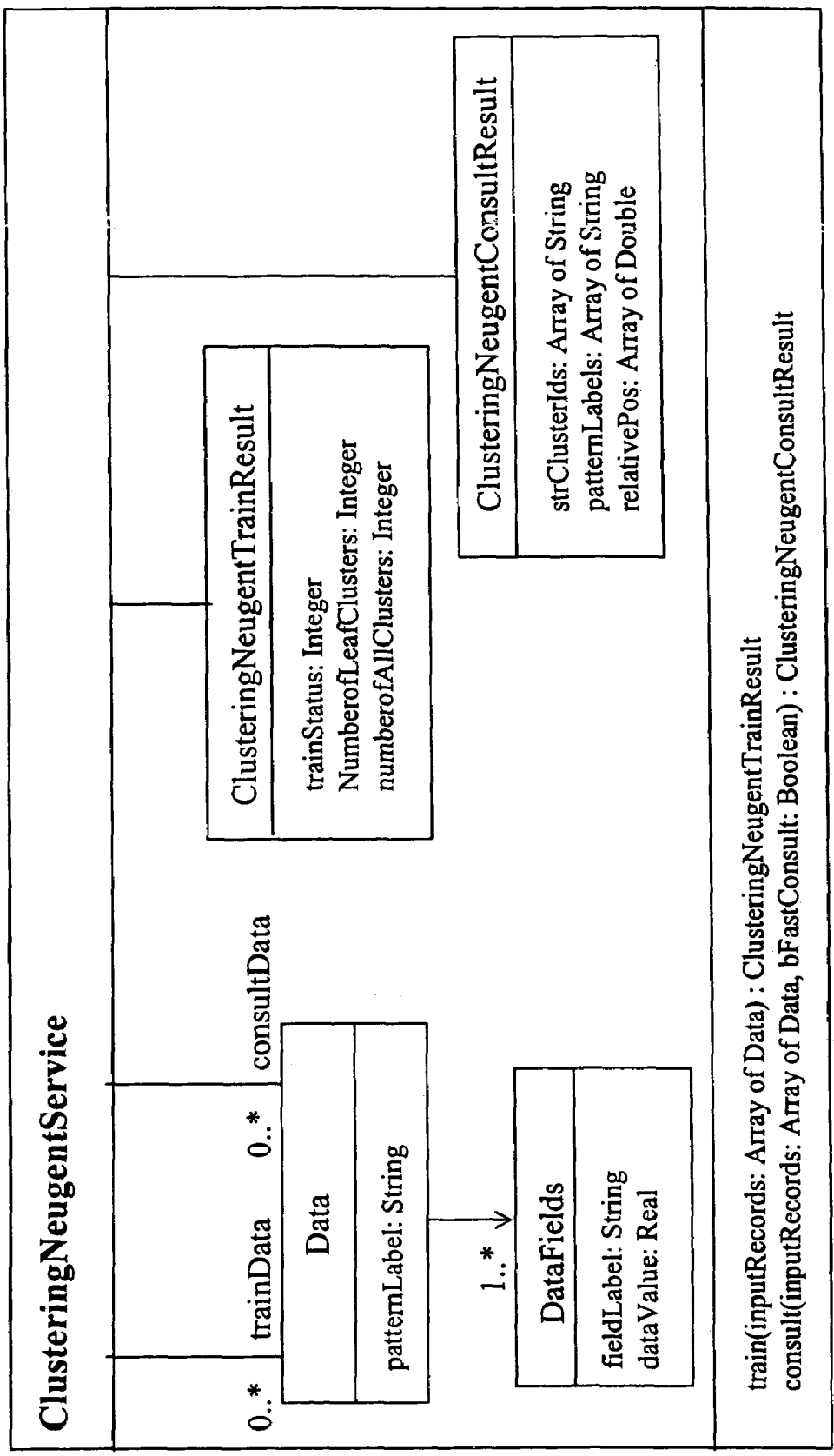
Figure 8H:
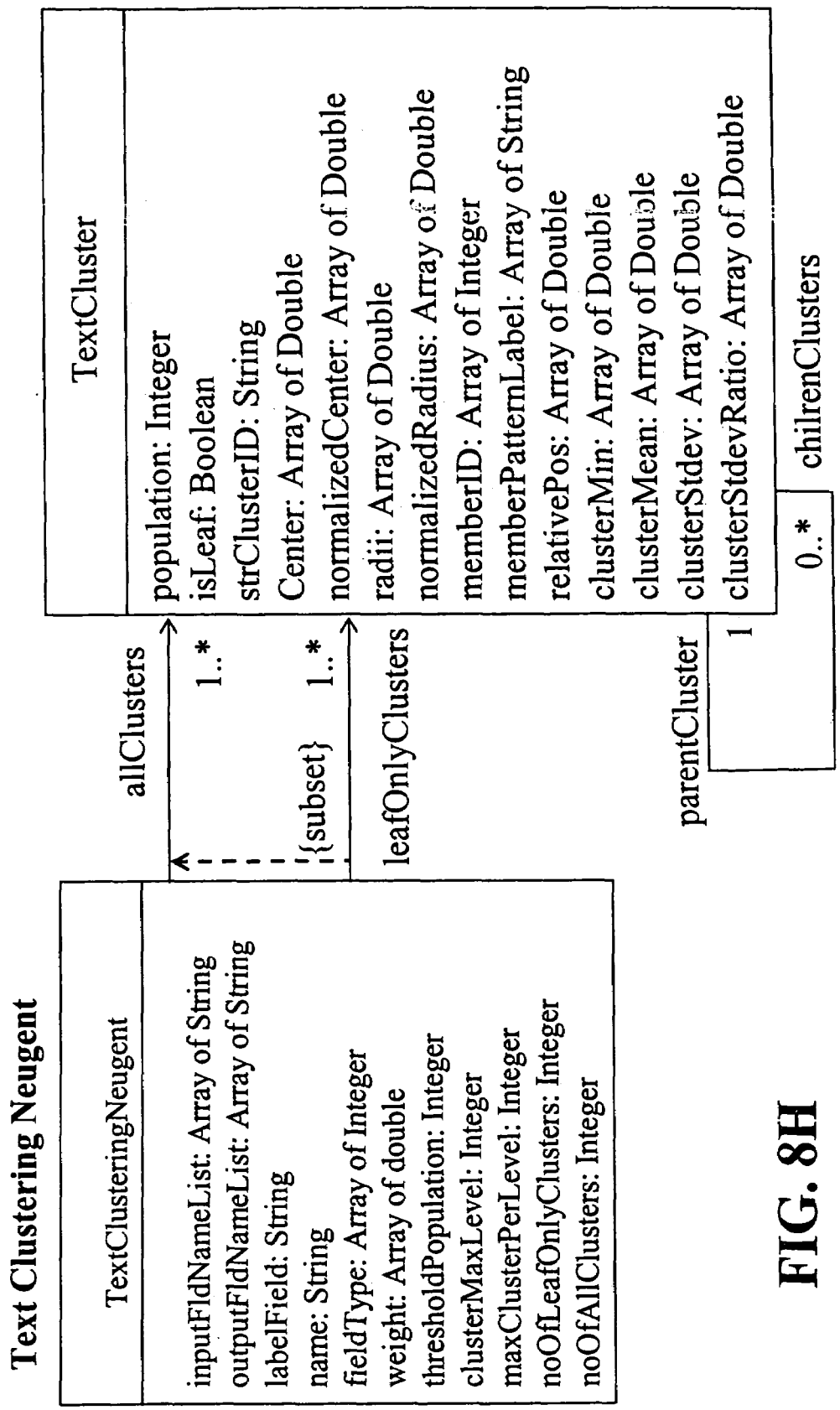
Figure 8I:
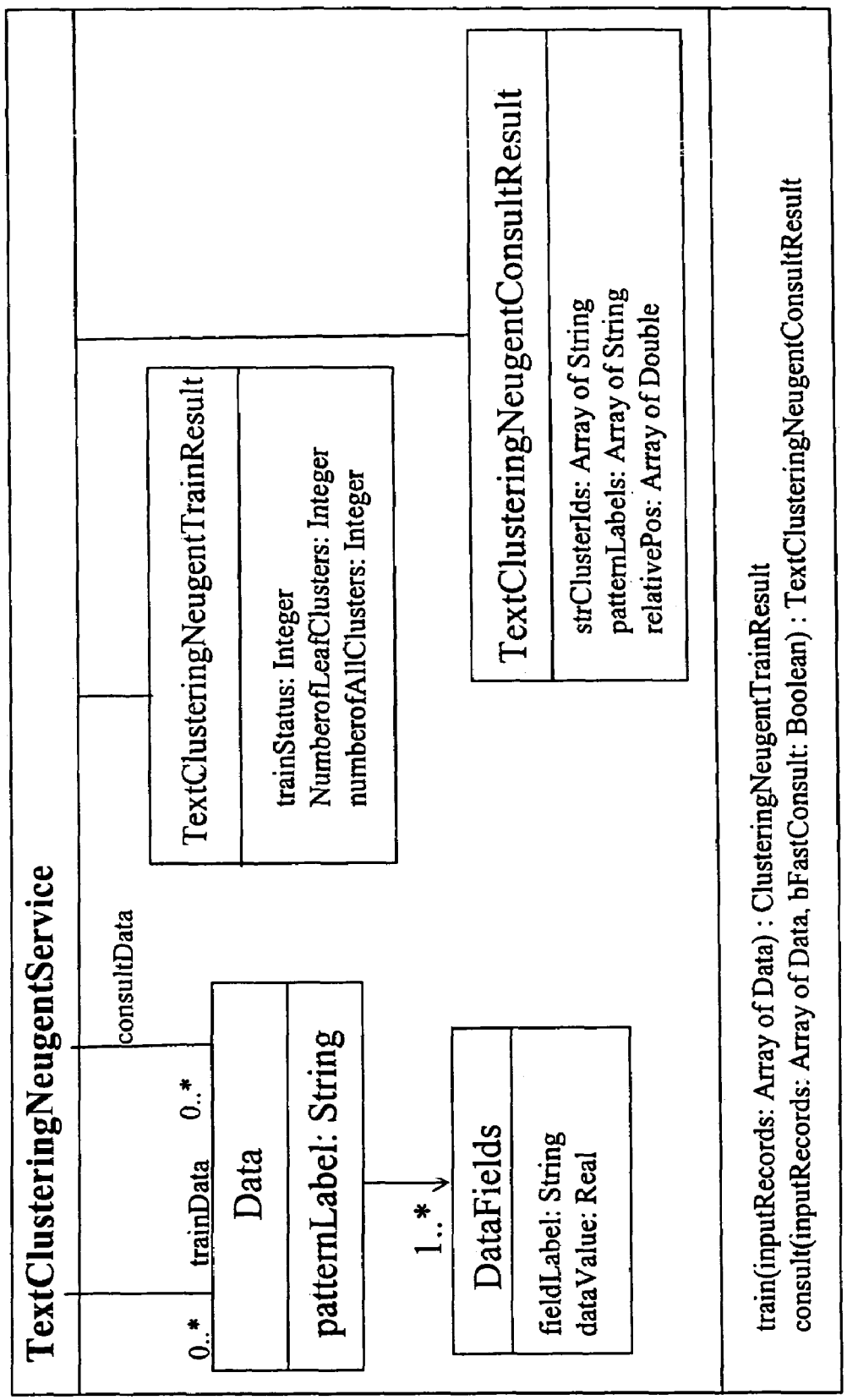
Figure 8J:
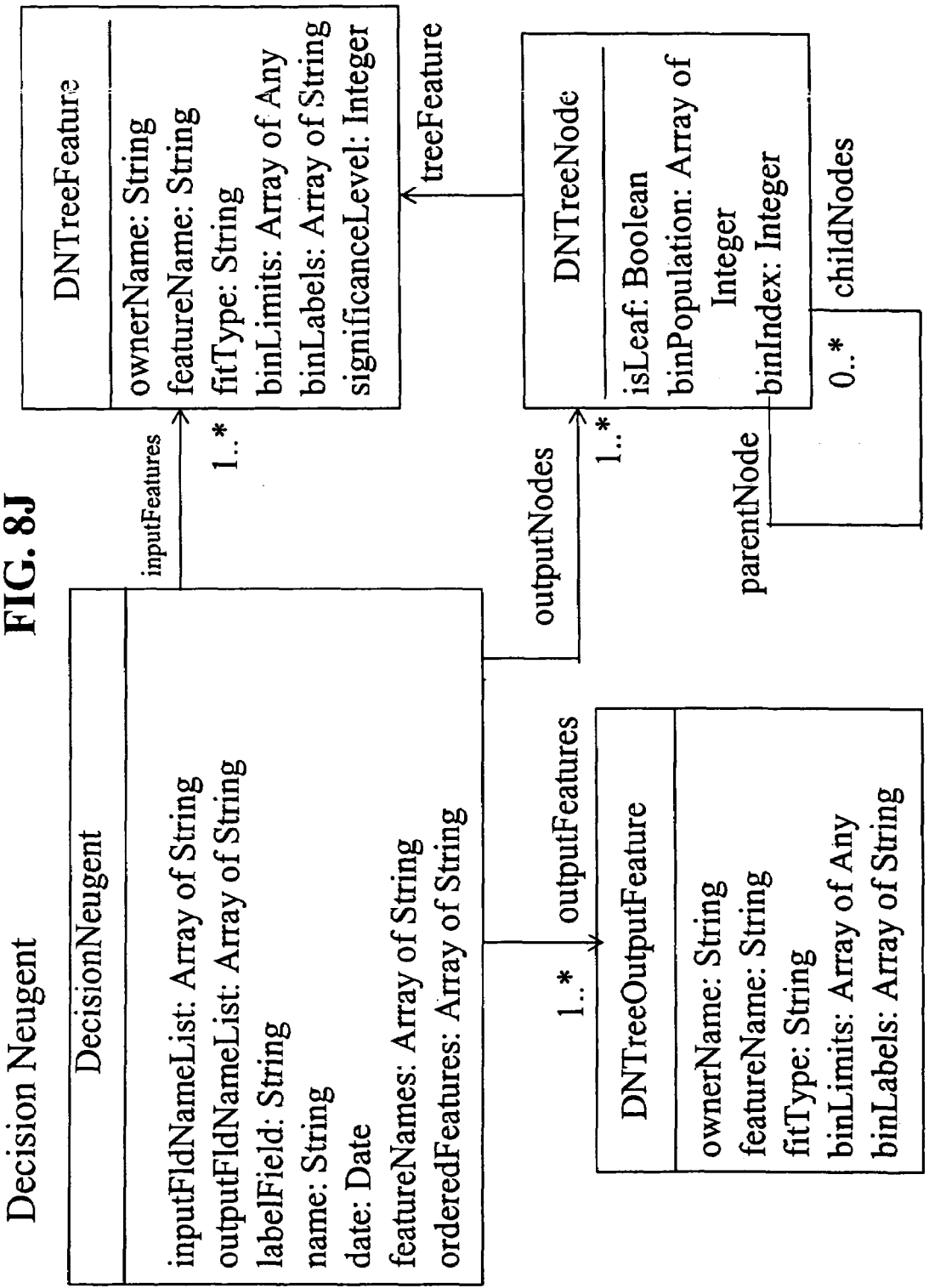
Figure 8K:
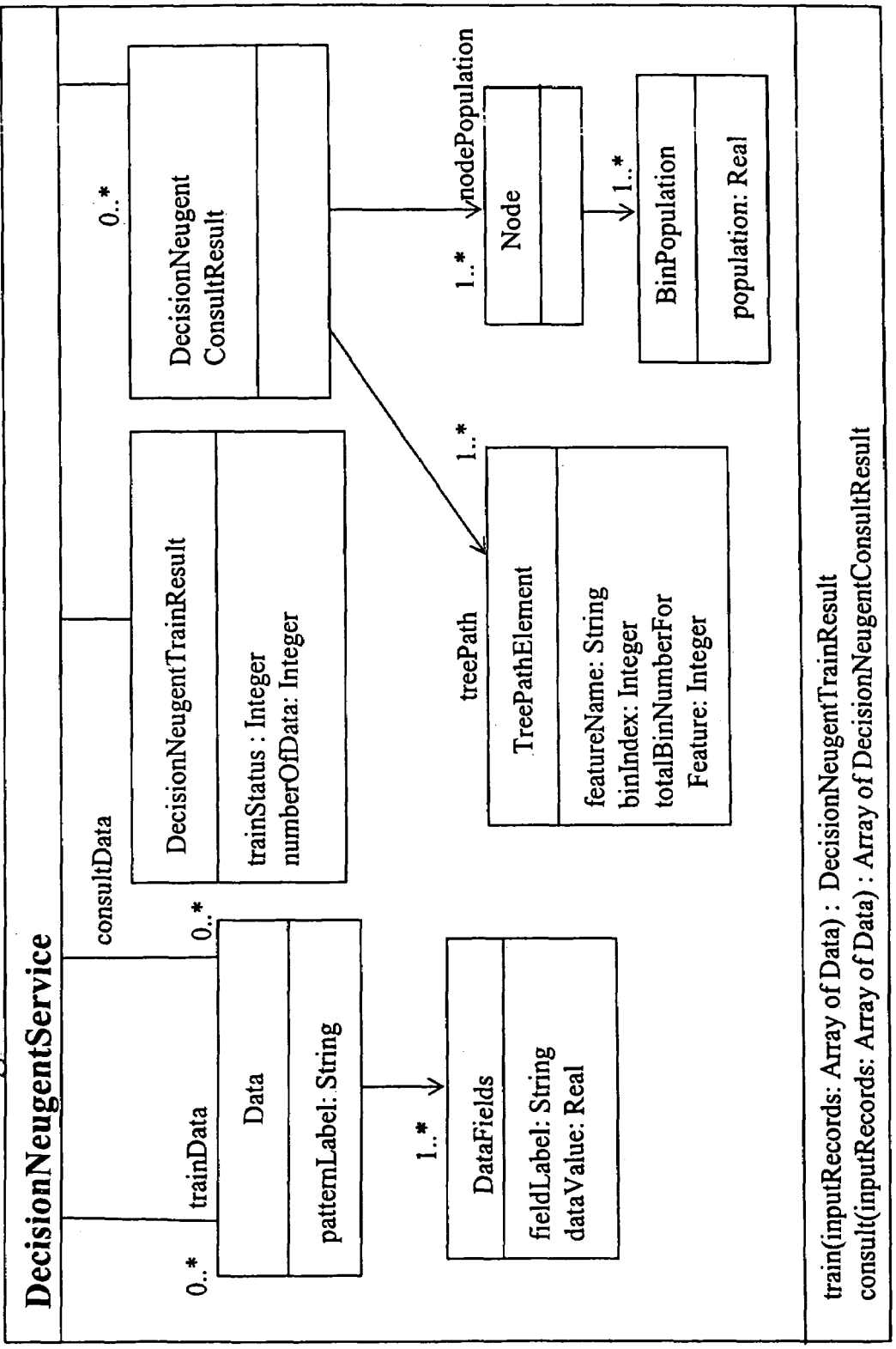
Figure 9A:
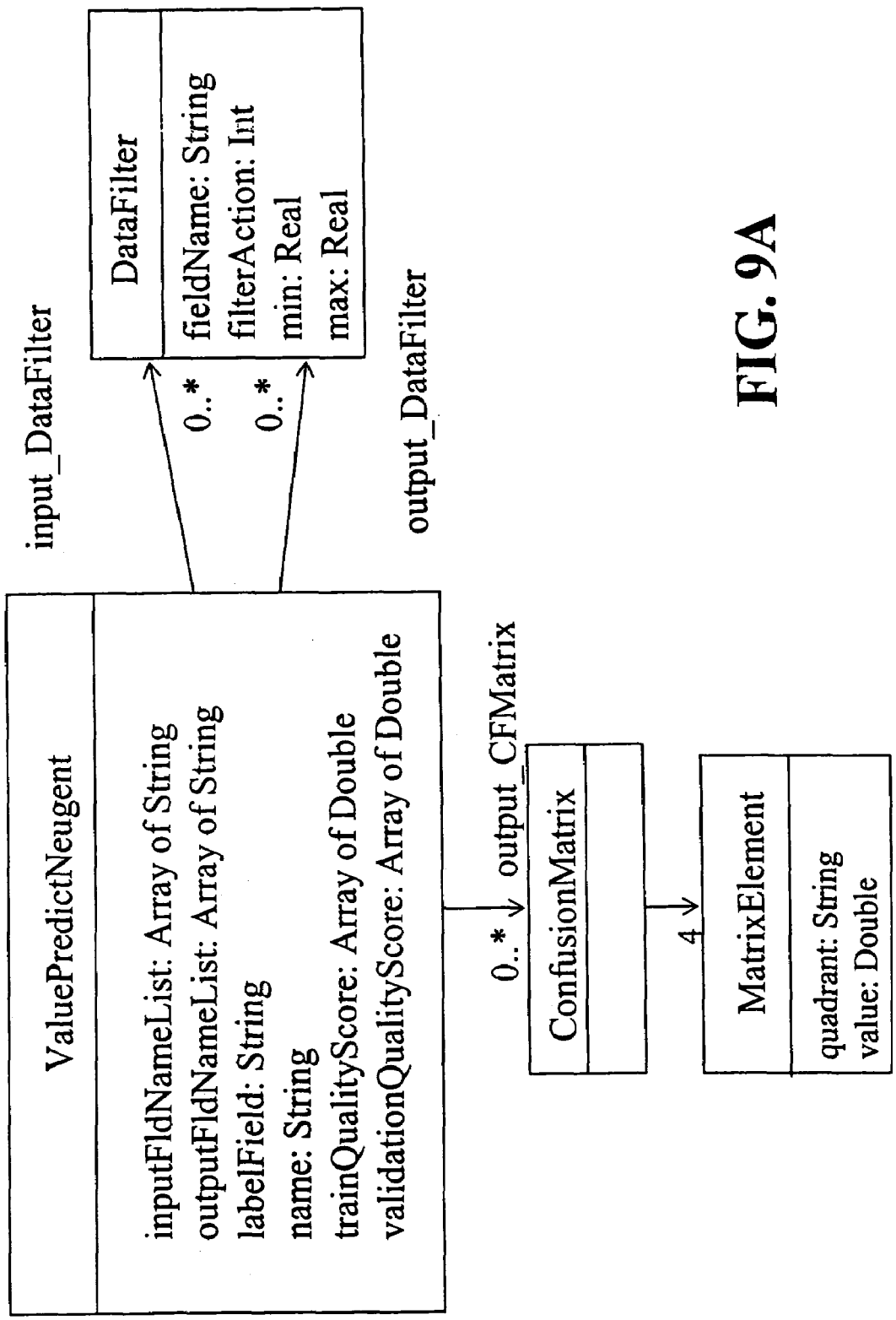
FIG. 9A shows an object schema for Value Predict Neugent, according to a sixth embodiment.
Figure 9B:
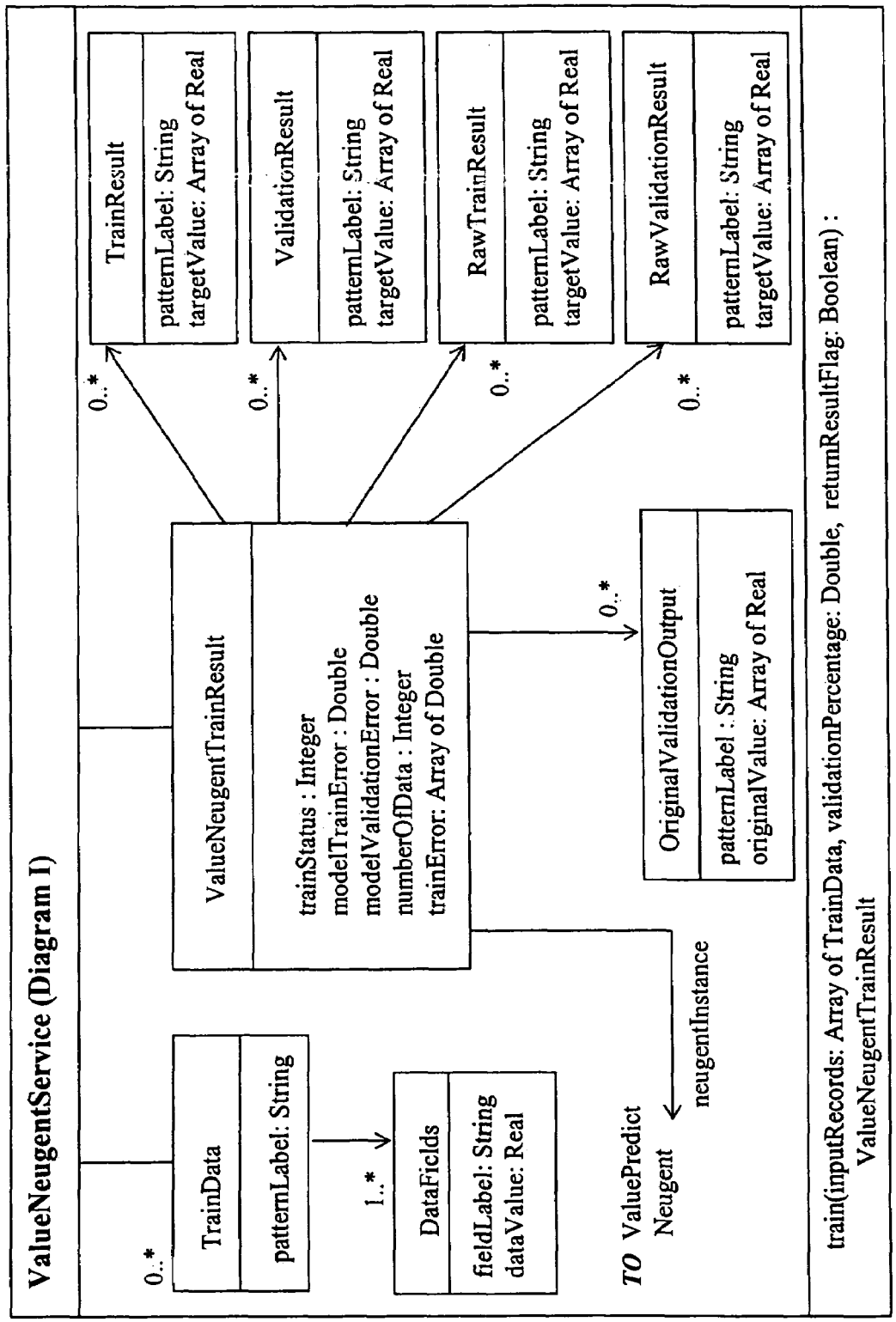
FIGS. 9B and 9C show class diagrams for the web service interface of the Value Predict Neugent, according to the sixth embodiment.
Figure 9C:
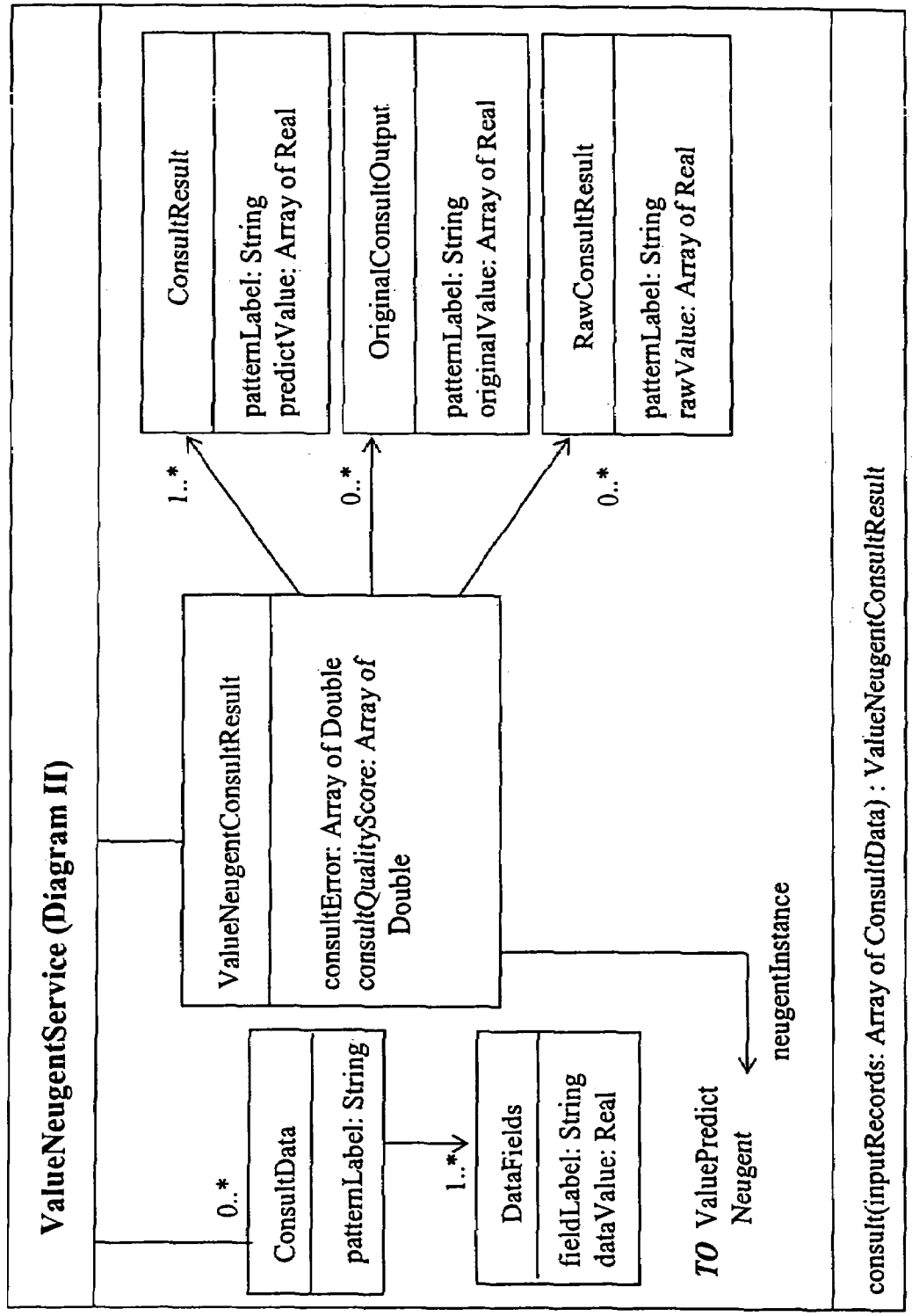
Figure 10A:
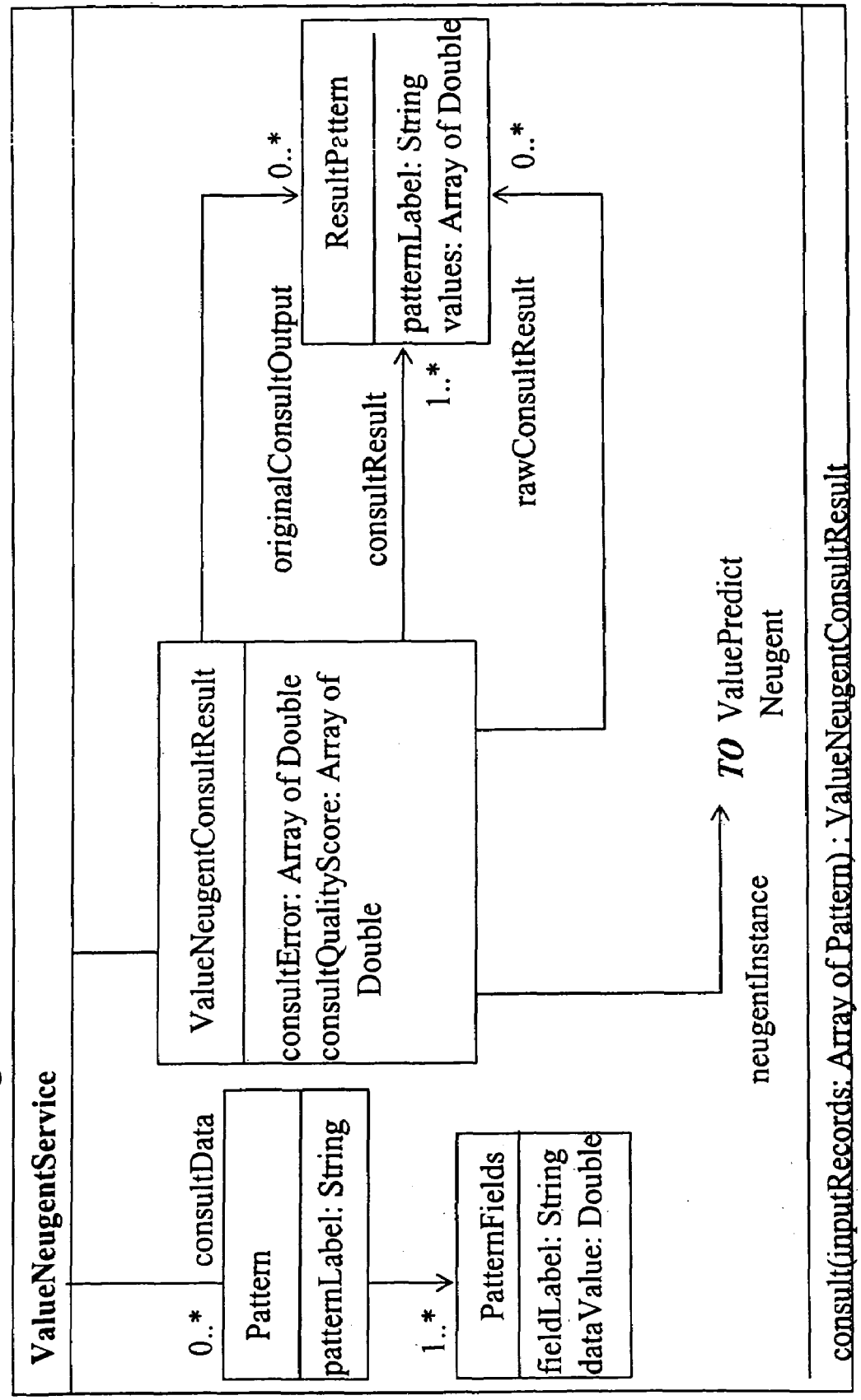
FIGS. 10A and 10C through 10F show class diagrams for the web service interface of assorted Neugents classes, according to a seventh embodiment.
Figure 10B:
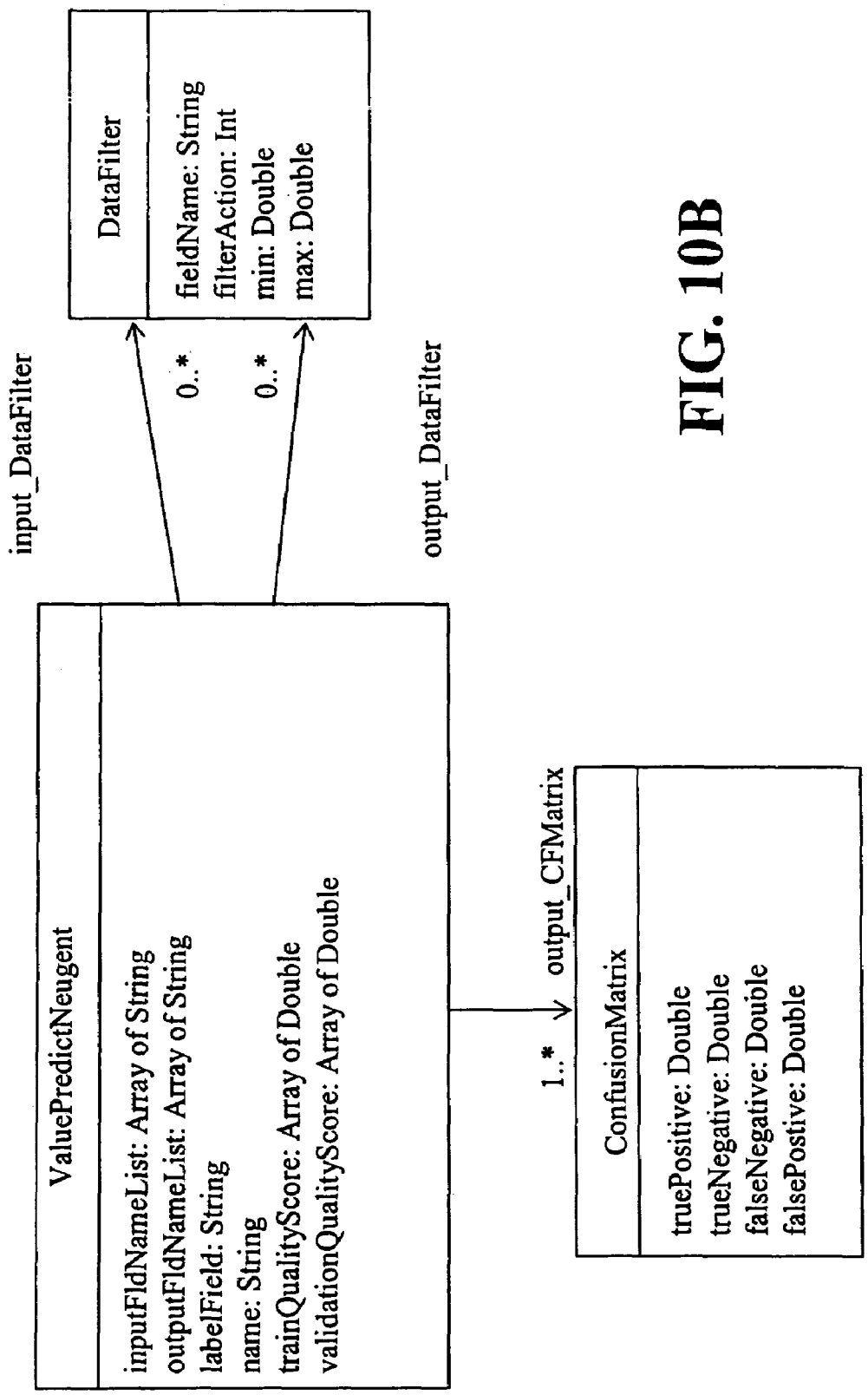
FIG. 10B shows an object schema for Value Predict Neugent, according to the seventh embodiment.
Figure 10C:
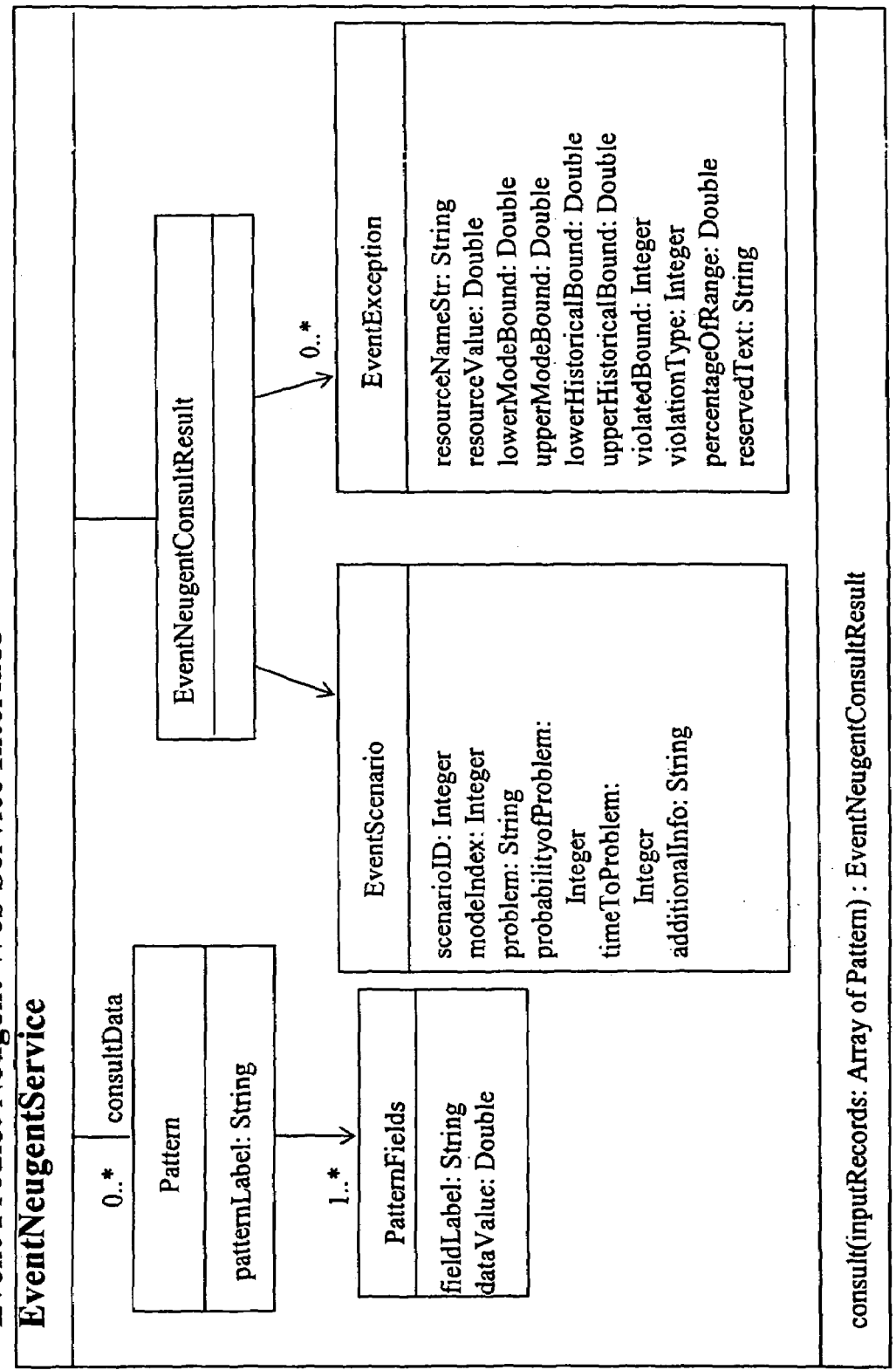
Figure 10D:
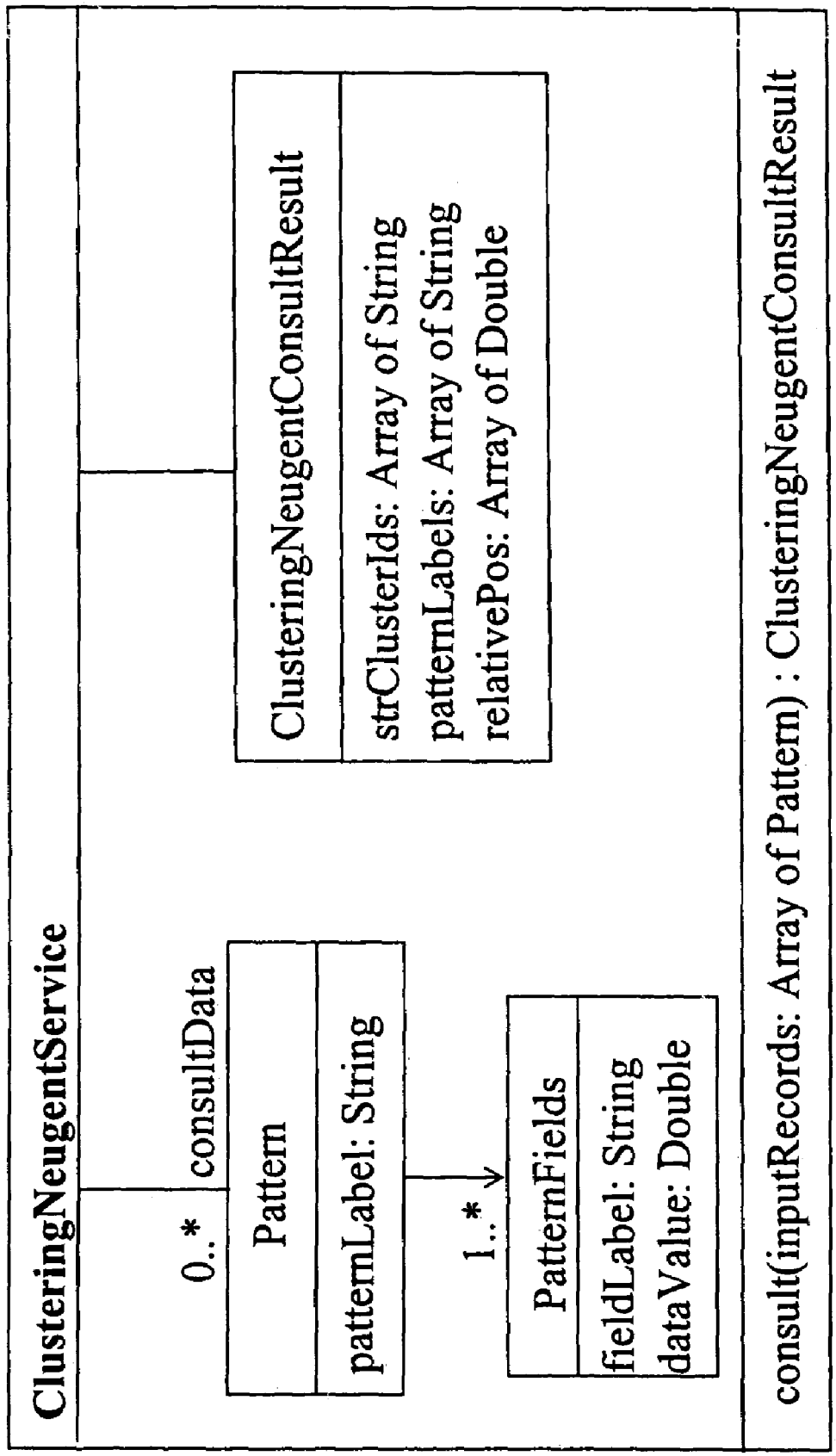
Figure 10E:
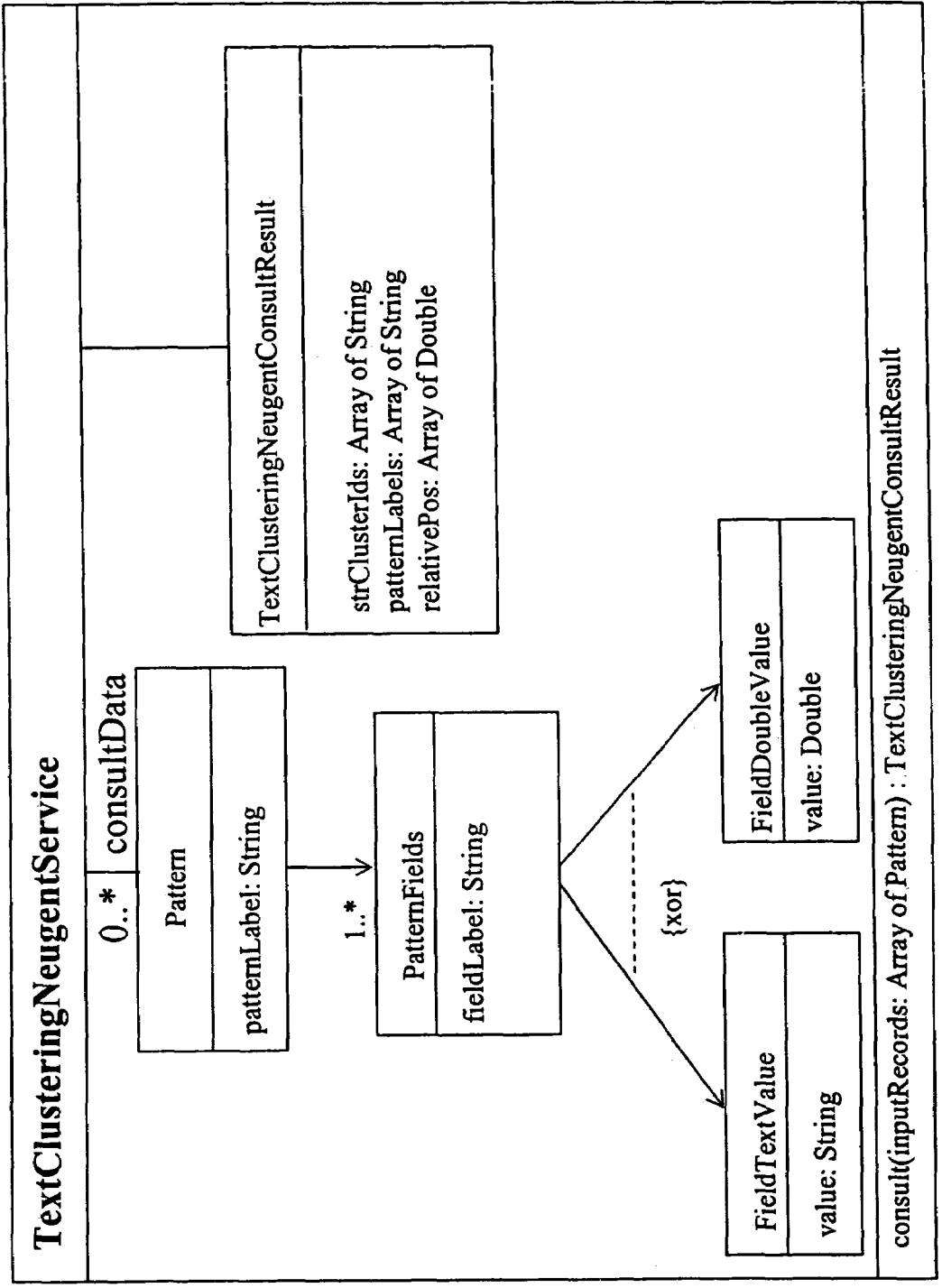
Figure 10F:
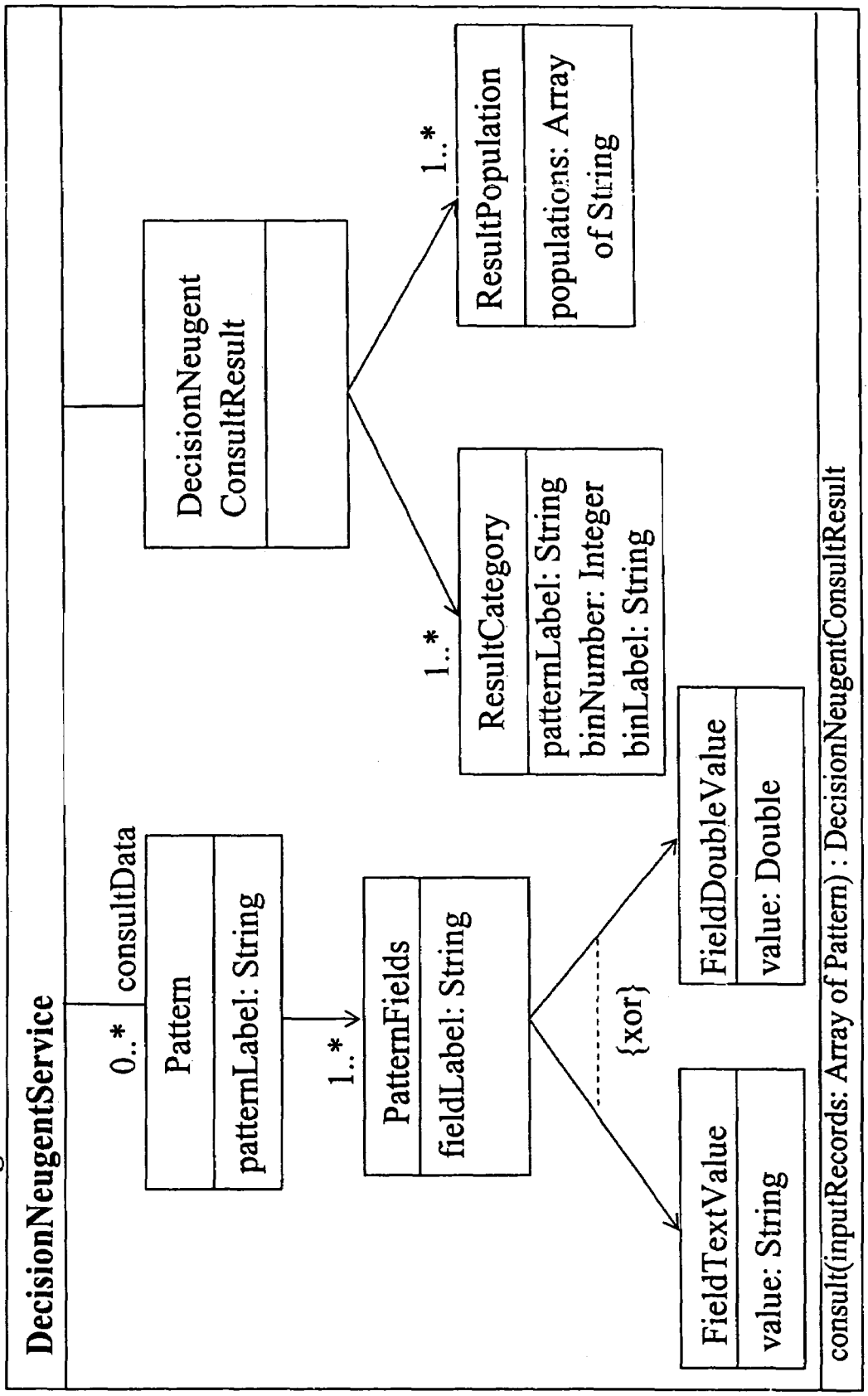

A functional-link net is one type of neural net which can be used to model a functional relationship between input and output. A functional-link net may be used to approximate any scalar function with a vector of inputs, x, and an output y, and therefore is a universal approximator. The structure of a functional-link net with non-linearity fully contained in a functional-link layer is illustrated in FIG. 3. The nodes in the functional-link layer have associated non-linear basis functions. Since non-linearity is fully contained in the functional-link layer, and the rest of the net may be linear, linear training techniques such as regression-based training may be used with a functional-link net structure. Linear training refers to techniques that solves the parameters in the net through linear algebra techniques. Examples of functional-link net methodologies are described in commonly owned U.S. Pat. Nos. 4,979,126, 5,734,796, 6,134,537 and 6,212,509 which are incorporated herein in their entirety by reference.

Some methodologies associated with EventPredictNeugent are described in commonly-owned U.S. Pat. No. 6,327,550 which is incorporated herein by reference.

Additional clustering, neural net, decision tree and other predictive modeling methodologies are described in the following commonly-owned U.S. patent applications, which are also incorporated herein by reference:

Ser. No. 60/374,064, filed Apr. 19, 2002 and entitled PROCESSING MIXED NUMERIC AND/OR NON-NUMERIC DATA;

Ser. No. 60/374,020, filed Apr. 19, 2002 and entitled AUTOMATIC NEURAL-NET MODEL GENERATION AND MAINTENANCE;

Ser. No. 60/374,024, filed Apr. 19, 2002 and entitled VIEWING MULTI-DIMENSIONAL DATA THROUGH HIERARCHICAL VISUALIZATION;

Ser. No. 60/374,041, filed Apr. 19, 2002 and entitled METHOD AND APPARATUS FOR DISCOVERING EVOLUTIONARY CHANGES WITHIN A SYSTEM;

Ser. No. 60/373,977, filed. Apr. 19, 2002 and entitled AUTOMATIC MODEL MAINTENANCE THROUGH LOCAL NETS; and Ser. No. 60/373,780, filed Apr. 19, 2002 and entitled "USING NEURAL NETWORKS FOR DATA MINING". Each Neugent provides the following methods, which are commonly referred to collectively as an "Application Programmer Interface", or "API", and referred to in connection with Web services simply as "services".

Train is a process of providing data (also referred to more specifically as training data patterns) to a Neugent so that the Neugent performs statistical or other data analysis of the training data patters which provides the basis for future predictions. The output of training a Neugent is a model or other data classification mechanism, which becomes the means by which the Neugent recognizes patterns.

Consult is a process of providing new data to a Neugent (also referred to as data for consulting the Neugent) so that the Neugent uses its model, as developed during training, to provide a prediction from the new data.

A Web service enabled implementation of the train and consult methods of the Neugents, according to an exemplary embodiment, is described below, with reference to FIGS. 1B and 5A through 10F. The train and consult methods are made available to client programs through Web services technology. Typically, only data may be passed between a client and a Neugent. Accordingly, the methodologies described in this disclosure place no burden on the client to maintain a predictive model. The complexity of client/server interfaces may be reduced by simplifying protocols and by hiding issues (for example, making them transparent to the user) of platform technology mismatches.

Figure 1B:
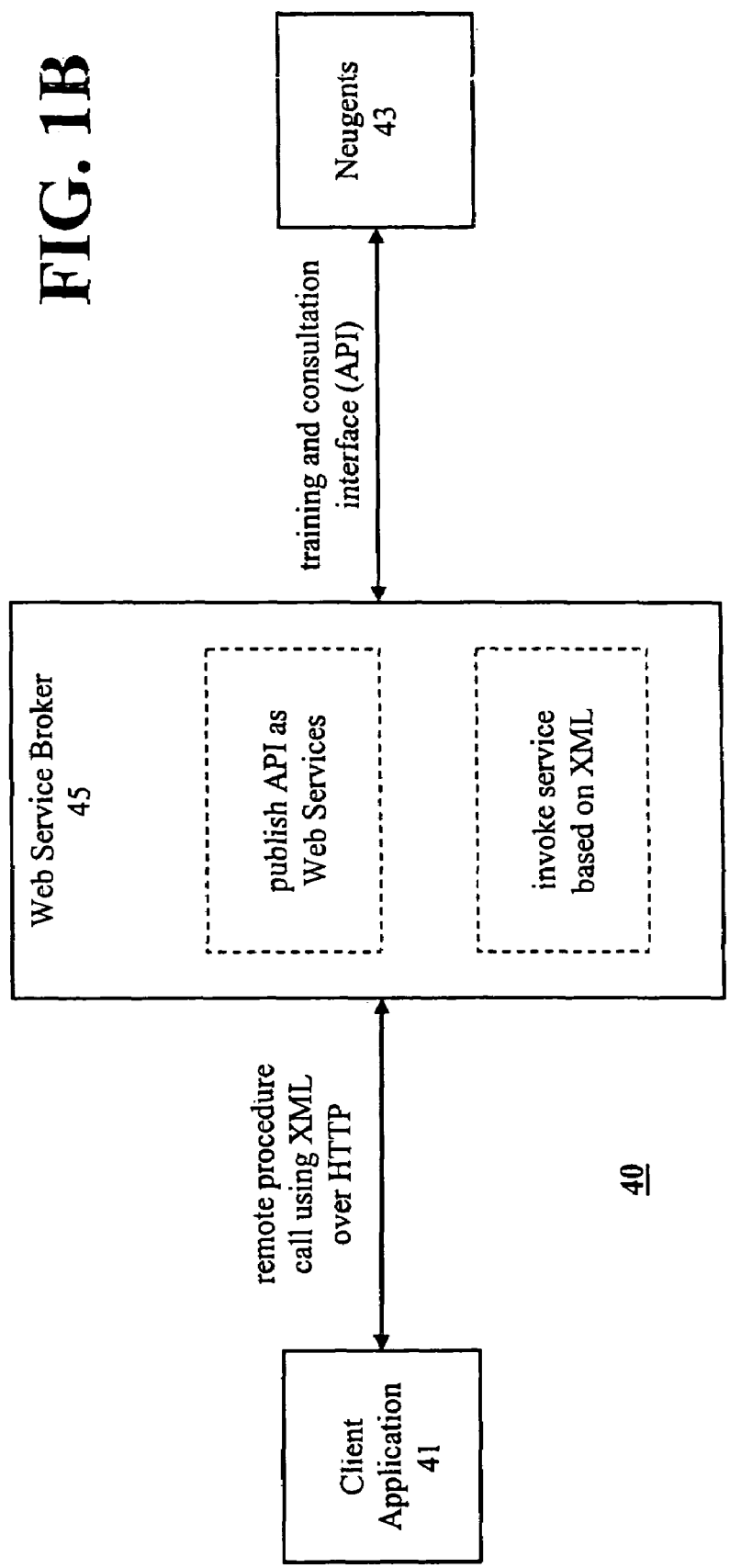
FIG. 1B shows a schematic view of a data mining system, according to another embodiment.

For example, Web services technology may be based on invoking procedures in a remote server (also referred herein as "Web Service Broker" or "WSB"), such as by transmitting an Extended Mark-up Language (XML) document, which is a text document, over the HTTP protocol, as depicted in FIG. 1B. In order for Web Service Broker 45 to invoke the train and consult methods of a Neugent 43, the structure of the XML documents calling the corresponding methods of the Neugent is precisely specified. The training and consultation API of the Neugents preferably is rigorously defined so that they can be invoked by the WSB. In addition, an interface is implemented within each respective Neugents.

Each of the Neugents mentioned above defines its own specification for training and consulting services (see, for example, FIGS. 4A-10F). The common elements of each Neugent interface include input data, train result and consult result.

For both the train and consult services, a collection of data is passed to the Neugent. Data passed to the train service and the consult service may be referred to as training data (also referred herein as "trainData") or consultation data (also referred herein as "consultData"), respectively. In some cases (for example, the ValuePredictNeugent), additional parameters may be passed when training the Neugent, such as to determine the percentage of the training data split between training the model and validating or testing the model. The Neugents typically use numeric data as input. However, the TextClusteringNeugent also accommodates textual (or other non-numeric) data and the DecisionNeugent accommodates alpha-numeric data.

Except for EventPredictNeugent, each Neugent returns an object as a result of a training session. The object provides information about the result of the training session. For ValuePredictNeugent, an object representing the Neugent may be returned as part of the structure of the train result.

For each Neugent type, the Neugent returns an object as a result of a consultation. Neugents may differ, however, with regard to a structure of the consultation return object. See, for example, FIGS. 5A-5K, in which only the TextClusteringNeugent and the ClusteringNeugent return similarly structured objects. The ValuePredictNeugent may return the ValuePredictNeugent object itself as part of the returned consultation object.

The specification of Neugents train and consult services may be mapped to the architecture of the Neugent class (discussed below).

The WSB API Interface is discussed exemplarily below for the ValuePredictNeugent only.

The WSB API can include a number of classes, with the ValuePredictNeugent class including train and consult methods.

For example, the ValuePredictNeugent class may include the following train and consult methods: ValueNeugentTrainResult train(Collection of Pattern trainData, Double validationPercentage, Boolean returnResultFlag); and ValueNeugentConsultResult consult(Collection of Pattern consultData).

The user sets up a collection of data under the Pattern class. The Pattern class is a container for a row of data passed to the train or consult method. After passing the data collection into the train or consult method, a ValueNeugentTrainResult object, or a ValueNeugentConsultResult object is returned.

The ValueNeugentTrainResult class contains the results from the ValuePredictNeugent train method, and may include the following fields (FIG. 4A):

trainStatus indicates a process status when it returns, and is checked in order to determine if the train method returns successful;

modelTrainError indicates an overall training error of a model (for all model outputs);

modelValidationError indicates an overall validation error of the model (for all model outputs);

numberOfData indicates a number of patterns used for training;

trainError indicates for each output in the OFldNList property of the Neugent instance a corresponding training error;

validationError is validation error for each individual target in OFldNList and is the same as modelValidationError when there is only one output;

trainQualityScore indicates for each output in the OFldNList property of the Neugent instance a corresponding training quality score;

validationQualityScore indicates for each output in the OFldNList property of the Neugent instance a validation quality score;

trainResult is a collection consisting of pattern label and model predict values of each target for each pattern;

validationResult is an inner collection consisting of pattern label and model predict values of each target for each pattern;

rawTrainResult is a collection consisting of pattern label and raw values (before clip) of each target for each pattern, and is used for binary output in discrete Neugent;

rawValidationResult is a collection consisting of pattern label and raw values (before clip) of each target for each pattern used for validation, and is used for binary output in discrete Neugent;

originalTrainOutput is a collection consisting of pattern label and original values of each target for each pattern used for training;

originalValidationOutput is a collection consisting of pattern label and original values of each target for each pattern used for validation; and neugentModel is a shortcut to the model that uses the ValueNeugentTrainResult object.

The ValueNeugentConsultResult class contains the results from the ValuePredictNeugent consult method, and may include the following fields (FIG. 4B):

consultError indicates for each output on the OFldNList of the Neugent object a corresponding error, and is empty if the target value is not included on the consult data source;

consultQualityScore indicates for each output on the OFldNList of the Neugent object a corresponding quality score, and is empty if the target value is not included on the consult data source;

consultResult is a collection consisting of pattern label and predict values of each output for each pattern;

originalConsultOutput is a collection consisting of pattern label and original output values for each pattern;

rawConsultResult is a collection consisting of pattern label and binary output values for each pattern, and is used for binary output in discrete Neugent; and neugentObject is a shortcut to a model that uses the ValueNeugentTrainResult object.

Class diagrams for additional exemplary embodiments are shown in FIGS. 5A-5K, 6A-6K, 7A-7G, 8A-8K, 9A-9C and 10A-10F. Similarly named field have similar functionality as described above. In the interest of clarity, a description of the fields in the additional exemplary embodiments is omitted.

The above specific embodiments are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

For example, although some embodiments described herein use a combination of ClusteringNeugent, DecisionNeugent, EventPredictNeugent, TextClusteringNeugent and ValuePredictNeugent methodologies, the matter recited in the appended claims may be practiced a selected subset of these Neugents, with or without other Neugents technologies which use clustering, neural net, decision tree and/or other predictive modeling methodologies.

Additional variations may be apparent to one of ordinary skill in the art from reading the following U.S. provisional applications Nos. 60/374,064, 60/374,020, f60/374,024, 60/374,041, 60/373,977 and 60/373,780, each filed Apr. 19, 2002.

What is claimed is:

1. A data mining system comprising:
   a client machine; and
   a service broker operable to:
      receive a consultation request from the client machine through a computer network, the consultation request associated with data for consulting a Neugent, the Neugent being distinct from the client machine;
      forward the consultation request to the Neugent to invoke a consultation of the Neugent, the Neugent operable to perform a predictive analysis with respect to the data for consulting the Neugent that is associated with the consultation request; and
      forward to the client machine through the computer network a result object returned by the Neugent, the result object comprising a prediction determined by the Neugent with respect to the data for consulting the Neugent.

2. The system of claim 1, wherein the consultation request comprises the data for consulting the Neugent.

3. The system of claim 2, wherein the Neugent is operable to perform the predictive analysis of the data comprised by the consultation request.

4. The system of claim 1, wherein the consultation request comprises identification of a source of the data for consulting the Neugent.

5. The system of claim 4, wherein the Neugent is operable to perform the predictive analysis of input data obtained from the source identified in the consultation request.

6. The system of claim 1, wherein the service broker is operable to:
   receive a training request from the client machine, the training request comprising training data; and
   forward the training request comprising the training data to the Neugent to invoke training of the Neugent with the training data.

7. The system of claim 6, wherein the training request comprises a parameter specifying a ratio by which to split the training data between training the Neugent and testing the Neugent.

8. The system of claim 6, wherein the service broker is operable to forward to the client machine a training result object returned by the Neugent after training of the Neugent.

9. The system of claim 1, wherein the Neugent is operable to:
   group training data patterns into clusters, each cluster corresponding to a group of similar data patterns; and
   predict a probability of membership of an input pattern to a selected group, the data associated with the consultation request comprising the input pattern.

10. The system of claim 1, wherein the Neugent is operable to:
   group training non-numeric patterns into clusters, each cluster corresponding to a group of similar non-numeric patterns; and
   predict a probability of membership of an input non-numeric pattern to a selected group, the data associated with the consultation request comprising the input non-numeric pattern.

11. The system of claim 1, wherein the Neugent is operable to:
   form a cluster model by grouping training data patterns into a plurality of clusters, each cluster corresponding to a group of similar data patterns and determining for each cluster probabilities of transition from the cluster to each of the other clusters; and predict a probability of an event occurring by applying an input pattern to the cluster model, the data associated with the consultation request comprising the input pattern.

12. The system of claim 1, wherein the Neugent is operable to:
form an input-output model associated with a set of training data patterns; and
predict an output value by applying the model to an input pattern, the data associated with the consultation request comprising the input pattern.

13. The system of claim 1, wherein the Neugent is operable to:
form rules associated with corresponding relationships in a set of training data patterns; and
predict an outcome by applying the rules to an input pattern, the data associated with the consultation request comprising the input pattern.

14. The system of claim 1, wherein the Neugent comprises a functional-link net.

15. The system of claim 1, wherein the service broker comprises a remote server.

16. The system of claim 15, wherein the consultation request comprises an Extended Markup Language document.

17. The system of claim 15, wherein the Neugent is server-side.

18. A method for providing to a remote client machine a service to consult a Neugent, comprising:
receiving a consultation request from the remote client machine through a computer network, the consultation request associated with data for consulting the Neugent, the Neugent being distinct from the remote client machine;
forwarding the consultation request to the Neugent to invoke a consultation of the Neugent, the Neugent operable to perform a predictive analysis with respect to the data for consulting the Neugent that is associated with the consultation request; and
forwarding to the remote client machine through the computer network a result object returned by the Neugent, the result object comprising a prediction determined by the Neugent with respect to the data for consulting the Neugent.

19. The method of claim 18, wherein the consultation request comprises the data for consulting the Neugent.

20. The method of claim 19, wherein the Neugent is operable to perform the predictive analysis of the data comprised by the consultation request.

21. The method of claim 18, wherein the consultation request comprises identification of a source of the data for consulting the Neugent.

22. The method of claim 21, wherein the Neugent is operable to perform the predictive analysis of input data obtained from the source identified in the consultation request.

23. The method of claim 18, comprising:
receiving a training request from the remote client machine, the training request comprising training data; and
forwarding the training request comprising the training data to the Neugent to invoke training of the Neugent with the training data.

24. The method of claim 23, wherein the training request comprises a parameter specifying a ratio by which to split the training data between training the Neugent and testing the Neugent.

25. The method of claim 23, comprising forwarding to the remote client machine a training result object returned by the Neugent after training of the Neugent.

26. The method of claim 18, comprising:
grouping, at the Neugent training data patterns into clusters, each cluster corresponding to a group of similar data patterns; and
predicting, at the Neugent, a probability of membership of an input pattern to a selected group, the data associated with the consultation request comprising the input pattern.

27. The method of claim 18, comprising:
grouping, at the Neugent, training non-numeric patterns into clusters, each cluster corresponding to a group of similar non-numeric patterns; and
predicting, at the Neugent, a probability of membership of an input non-numeric pattern to a selected group, the data associated with the consultation request comprising the input non-numeric pattern.

28. The method of claim 18, comprising:
forming, at the Neugent, a cluster model by grouping training data patterns into a plurality of clusters, each cluster corresponding to a group of similar data patterns and determining for each cluster probabilities of transition from the cluster to each of the other clusters; and
predicting, at the Neugent, a probability of an event occurring by applying an input pattern to the cluster model, the data associated with the consultation request comprising the input pattern.

29. The method of claim 18, comprising:
forming, at the Neugent, an input-output model associated with a set of training data patterns; and
predicting, at the Neugent, an output value by applying the model to an input pattern, the data associated with the consultation request comprising the input pattern.

30. The method of claim 18, comprising:
forming, at the Neugent, rules associated with corresponding relationships in a set of training data patterns; and
predicting, at the Neugent, an outcome by applying the rules to an input pattern, the data associated with the consultation request comprising the input pattern.

31. The method of claim 18, wherein the Neugent comprises a functional-link net.

32. The method of claim 18, wherein the method is performed at a remote server.

33. The method of claim 32, wherein the consultation request comprises an Extended Markup Language document.

34. The method of claim 32, wherein the Neugent is server-side.

35. A computer system for providing to a remote client machine a service to consult a Neugent, comprising:
a program storage device readable by the computer system, tangibly embodying a program of instructions; and
a processor operable to execute the program instructions to:
receive a consultation request from the remote client machine through a computer network, the consultation request associated with data for consulting the Neugent, the Neugent being distinct from the remote client machine;

forward the consultation request to the Neugent to invoke a consultation of the Neugent, the Neugent operable to perform a predictive analysis with respect to the data for consulting the Neugent that is associated with the consultation request; and forward to the remote client machine through the computer network a result object returned by the Neugent, the result object comprising a prediction determined by the Neugent with respect to the data for consulting the Neugent.

36. A method for providing to a remote client machine a service to train a Neugent, comprising:

receiving a train request from the remote client machine through a computer network, the train request associated with training data for training the Neugent, the Neugent being distinct from the remote client machine;

forwarding the train request to the Neugent to invoke training of the Neugent, training of the Neugent comprising causing the Neugent to perform a data analysis of the training data; and forwarding to the remote client machine through the computer network a training result object returned by the Neugent, the training result object comprising a data classification mechanism operable to facilitate performance of a predictive analysis by the Neugent.

37. A computer system, comprising:

a program storage device readable by the computer system, tangibly embodying a program of instructions; and a processor operable to execute the program instructions to:

receive a train request from the remote client machine through a computer network the train request associated with training data for training the Neugent, the Neugent being distinct from the remote client machine;

forward the train request to the Neugent to invoke training of the Neugent, training of the Neugent comprising causing the Neugent to perform a data analysis of the training data; and forward to the remote client machine through the computer network a training result object returned by the Neugent, the training result object comprising a data classification mechanism operable to facilitate performance of a predictive analysis by the Neugent.

38. Software for providing to a remote client machine a service to consult a Neugent, the software being embodied in a computer-readable medium and when executed operable to:

receive a consultation request from the remote client machine through a computer network, the consultation request associated with data for consulting the Neugent, the Neugent being distinct from the remote client machine;

forward the consultation request to the Neugent to invoke a consultation of the Neugent, the Neugent operable to perform a predictive analysis with respect to the data for consulting the Neugent that is associated with the consultation request; and forward to the remote client machine through the computer network a result object returned by the Neugent, the result object comprising a prediction determined by the Neugent with respect to the data for consulting the Neugent.

39. Software for providing to a remote client machine a service to train a Neugent, the software being embodied in a computer-readable medium and when executed operable to:

receive a train request from the remote client machine through a computer network the train request associated with training data for training the Neugent, the Neugent being distinct from the remote client machine;

forward the train request to the Neugent to invoke training of the Neugent, training of the Neugent comprising causing the Neugent to perform a data analysis of the training data; and forward to the remote client machine through the computer network a training result object returned by the Neugent, the training result object comprising a data classification mechanism operable to facilitate performance of a predictive analysis by the Neugent.

* * * * *